US011350576B2

(12) United States Patent
Anderson et al.

(10) Patent No.: US 11,350,576 B2
(45) Date of Patent: Jun. 7, 2022

(54) GROWING SYSTEM

(71) Applicant: Living Greens Farm, Inc., Faribault, MN (US)

(72) Inventors: Dana Anderson, Minneapolis, MN (US); Jay Jon Bauer, Webster, MN (US)

(73) Assignee: Living Greens Farm, Inc., Faribault, MN (US)

( * ) Notice: Subject to any disclaimer, the term of this patent is extended or adjusted under 35 U.S.C. 154(b) by 480 days.

(21) Appl. No.: 16/371,969

(22) Filed: Apr. 1, 2019

(65) Prior Publication Data

US 2019/0327906 A1 Oct. 31, 2019

Related U.S. Application Data

(63) Continuation-in-part of application No. 15/809,746, filed on Nov. 10, 2017, now Pat. No. 10,595,468,
(Continued)

(51) Int. Cl.
*A01G 31/06* (2006.01)
*A01G 31/02* (2006.01)
*A01G 7/04* (2006.01)

(52) U.S. Cl.
CPC ............. *A01G 7/045* (2013.01); *A01G 31/02* (2013.01); *A01G 31/06* (2013.01); *Y02P 60/14* (2015.11); *Y02P 60/21* (2015.11)

(58) Field of Classification Search
CPC ........ A01G 31/00; A01G 31/02; A01G 31/06; A01G 7/045
See application file for complete search history.

(56) References Cited

U.S. PATENT DOCUMENTS

| 281,797 A | 7/1883 | Sawyer et al. |
| 3,172,234 A | 3/1965 | Eavis |

(Continued)

FOREIGN PATENT DOCUMENTS

| CN | 202285653 U | 7/2012 |
| CN | 202340515 U | 7/2012 |

(Continued)

OTHER PUBLICATIONS

Office Action, China National Intellectual Property Administration, dated Aug. 2, 2019.
(Continued)

*Primary Examiner* — Thanh Pham
(74) *Attorney, Agent, or Firm* — Hamilton IP Law, PC; Jay R. Hamilton; Charles A. Damschen

(57) ABSTRACT

A growing system and/or plant support structure may include one or more feet supporting at least one or more uprights, on which a plurality of plants and/or grow boards for growing plants may be positioned. A nutrient delivery system may be positioned between opposing uprights to provide nutrient supply to a root zone of plants, which nutrient delivery system may be positioned adjacent each opposing upright in an interior chamber of the plant support structure. A light system may be positioned between two adjacent plant support structures such that it simultaneously provides light to the exterior surface of the two plant support structures. A collapsible light may be positioned adjacent plants and plant support structures for improved access to the plants or plant support structures while allowing variable and controllable light distribution beneficial to control of adjacent plants and plant structures.

10 Claims, 76 Drawing Sheets

Related U.S. Application Data which is a continuation of application No. 14/815,472, filed on Jul. 31, 2015, now Pat. No. 9,814,186.

(60) Provisional application No. 62/819,286, filed on Mar. 15, 2019, provisional application No. 62/731,593, filed on Sep. 14, 2018, provisional application No. 62/727,838, filed on Sep. 6, 2018, provisional application No. 62/674,463, filed on May 21, 2018, provisional application No. 62/651,148, filed on Mar. 31, 2018, provisional application No. 62/174,940, filed on Jun. 12, 2015, provisional application No. 62/050,075, filed on Sep. 12, 2014, provisional application No. 62/032,452, filed on Aug. 1, 2014, provisional application No. 62/031,668, filed on Jul. 31, 2014.

(56) References Cited

U.S. PATENT DOCUMENTS

| | | |
|---|---|---|
| 3,181,273 A | 5/1965 | West et al. |
| 3,667,157 A | 6/1972 | Longhini |
| 3,708,009 A | 1/1973 | Viol et al. |
| 3,729,016 A | 4/1973 | Von Linsowe |
| 3,729,141 A | 4/1973 | Cornelius |
| 3,749,319 A | 7/1973 | Fischer |
| 3,868,787 A | 3/1975 | Wong |
| 3,874,721 A | 4/1975 | Tuggle |
| 3,877,172 A | 4/1975 | Schwab et al. |
| 3,888,041 A | 6/1975 | Bundy et al. |
| 4,006,559 A | 2/1977 | Carlyon, Jr. |
| 4,035,950 A | 7/1977 | Anselm |
| 4,047,327 A | 9/1977 | Tesch |
| 4,052,196 A | 10/1977 | Namy et al. |
| 4,059,922 A | 11/1977 | DiGiacinto |
| 4,075,785 A | 2/1978 | Jones |
| 4,099,669 A | 7/1978 | Cortopassi |
| 4,118,891 A | 10/1978 | Kehl et al. |
| 4,133,141 A | 1/1979 | Lee |
| 4,163,342 A | 8/1979 | Fogg et al. |
| 4,218,847 A | 8/1980 | Leroux |
| 4,244,145 A | 1/1981 | Polacsek |
| 4,255,896 A | 3/1981 | Carl |
| 4,295,607 A | 10/1981 | Noble |
| 4,300,311 A | 11/1981 | Marchant |
| 4,309,844 A | 1/1982 | King et al. |
| 4,329,812 A | 5/1982 | Carlisle |
| 4,332,105 A | 6/1982 | Nir |
| 4,352,460 A | 10/1982 | Purtell |
| 4,419,843 A | 12/1983 | Johnson, Sr. |
| 4,505,068 A | 3/1985 | Kaneko |
| 4,569,150 A | 2/1986 | Carlson et al. |
| 4,584,791 A | 4/1986 | Wolf |
| 4,603,077 A | 7/1986 | Fujimoto et al. |
| 4,658,878 A | 4/1987 | Williams |
| 4,704,818 A | 11/1987 | Cameron |
| 4,713,909 A | 12/1987 | Roper et al. |
| 4,813,176 A | 3/1989 | Takayasu |
| 4,844,109 A | 7/1989 | Navarro |
| 4,869,019 A | 9/1989 | Ehrlich |
| 4,924,623 A | 5/1990 | van Rens |
| 4,937,969 A | 7/1990 | Kawabe et al. |
| 4,965,962 A | 10/1990 | Akagi |
| 4,982,526 A | 1/1991 | Miyachi |
| 5,040,329 A * | 8/1991 | Michaloski ............ A01G 17/02 47/65 |
| 5,042,196 A | 8/1991 | Lukawski |
| 5,076,008 A | 12/1991 | Arroyo |
| 5,077,935 A | 1/1992 | Stoever et al. |
| 5,226,255 A | 7/1993 | Robertson |
| 5,317,834 A | 6/1994 | Anderson |
| 5,394,647 A | 3/1995 | Blackford |
| 5,397,056 A | 3/1995 | Sakatani et al. |
| 5,417,010 A | 5/1995 | Ecer |
| 5,435,098 A | 7/1995 | Koide et al. |
| 5,438,794 A | 8/1995 | Wi |
| 5,560,415 A | 10/1996 | Geissler |
| 5,592,775 A | 1/1997 | Dew |
| 5,724,768 A | 3/1998 | Ammann |
| 5,862,628 A | 1/1999 | Takashima |
| 5,918,416 A | 7/1999 | Ammann |
| 5,937,575 A | 8/1999 | Zobel et al. |
| 6,000,173 A | 12/1999 | Schow et al. |
| 6,006,471 A | 12/1999 | Sun |
| 6,021,602 A | 2/2000 | Orsi |
| 6,061,957 A | 5/2000 | Takashima |
| 6,070,358 A | 6/2000 | Meikle et al. |
| 6,082,044 A | 7/2000 | Sherfield |
| 6,105,309 A | 8/2000 | Takayanagi |
| 6,127,027 A | 10/2000 | Nogami et al. |
| 6,131,832 A | 10/2000 | Murphy |
| 6,219,965 B1 | 4/2001 | Ishikawa et al. |
| 6,237,282 B1 | 5/2001 | Pitts |
| 6,312,139 B1 | 11/2001 | Baker et al. |
| 6,314,675 B1 | 11/2001 | Costa |
| 6,360,482 B1 | 3/2002 | Boyes |
| 6,360,483 B1 | 3/2002 | Sherfield |
| 6,446,386 B1 | 9/2002 | Holloway |
| 6,508,033 B2 | 1/2003 | Hessel et al. |
| 6,578,319 B1 | 6/2003 | Cole et al. |
| 6,612,069 B2 | 9/2003 | Locke et al. |
| 6,615,542 B2 | 9/2003 | Ware |
| 6,698,668 B2 | 3/2004 | Stehling |
| 6,729,807 B1 | 5/2004 | Spittle |
| 6,793,438 B2 | 9/2004 | Anderson |
| 6,807,770 B2 | 10/2004 | Wainwright et al. |
| 6,811,653 B2 | 11/2004 | Huang |
| 7,426,802 B2 | 9/2008 | Umbaugh |
| 8,181,391 B1 * | 5/2012 | Giacomantonio ..... A01G 9/025 47/62 R |
| 8,250,804 B2 * | 8/2012 | Chang .................... A01G 9/025 47/39 |
| 8,533,992 B2 | 9/2013 | Harwood |
| 8,726,568 B2 | 5/2014 | Wilson et al. |
| D713,284 S | 9/2014 | Prinster et al. |
| 8,984,808 B2 | 3/2015 | Daniels et al. |
| D729,115 S | 5/2015 | Prinster et al. |
| 9,282,699 B2 | 3/2016 | Anderson et al. |
| 9,510,524 B2 | 12/2016 | Anderson et al. |
| 9,814,186 B2 | 11/2017 | Anderson et al. |
| 2001/0047617 A1 * | 12/2001 | Blossom ................ A01G 31/02 47/62 R |
| 2002/0088175 A1 | 7/2002 | Locke et al. |
| 2002/0174598 A1 | 11/2002 | Locke et al. |
| 2003/0006323 A1 | 1/2003 | Reid |
| 2003/0089037 A1 | 5/2003 | Ware |
| 2003/0121362 A1 | 7/2003 | Goellner |
| 2003/0150160 A1 | 8/2003 | Anderson |
| 2003/0188477 A1 | 10/2003 | Pasternak et al. |
| 2006/0032115 A1 | 2/2006 | Dool |
| 2006/0032128 A1 * | 2/2006 | Bryan, III ............. A01G 9/023 47/62 R |
| 2006/0053691 A1 | 3/2006 | Harwood et al. |
| 2006/0156624 A1 | 7/2006 | Roy et al. |
| 2008/0000152 A1 * | 1/2008 | Shouse .................. A01G 31/06 47/18 |
| 2008/0110086 A1 | 5/2008 | Julia |
| 2008/0295400 A1 | 12/2008 | Harwood et al. |
| 2009/0272029 A1 | 11/2009 | Aiking et al. |
| 2010/0095584 A1 | 4/2010 | Huet et al. |
| 2010/0095586 A1 * | 4/2010 | Sichello ............... E04F 13/0801 47/65.9 |
| 2010/0175318 A1 * | 7/2010 | Ahmadi ................ F21V 33/008 47/66.6 |
| 2010/0193707 A1 | 8/2010 | Yamada et al. |
| 2011/0016785 A1 | 1/2011 | Yamada et al. |
| 2011/0107667 A1 | 5/2011 | Laurence et al. |
| 2011/0146146 A1 | 6/2011 | Harwood |
| 2011/0258925 A1 | 10/2011 | Baker |
| 2011/0283614 A1 | 11/2011 | Jaensch |
| 2011/0289839 A1 | 12/2011 | Cronk et al. |
| 2012/0005957 A1 | 1/2012 | Downs |

(56) References Cited

U.S. PATENT DOCUMENTS

| | | | |
|---|---|---|---|
| 2012/0085026 A1* | 4/2012 | Morris | A01G 31/06 47/62 A |
| 2012/0227320 A1* | 9/2012 | Dos Santos | A01G 27/005 47/79 |
| 2013/0031834 A1 | 2/2013 | Mosca | |
| 2013/0160362 A1 | 6/2013 | Daas et al. | |
| 2013/0180172 A1 | 7/2013 | Silverberg | |
| 2013/0188340 A1* | 7/2013 | Richards | A45B 3/04 362/183 |
| 2013/0255150 A1* | 10/2013 | Karpinski | F21V 9/20 47/58.1 LS |
| 2013/0340337 A1 | 12/2013 | Kuo et al. | |
| 2014/0026482 A1 | 1/2014 | Nell, Jr. | |
| 2014/0047765 A1 | 2/2014 | Wescott et al. | |
| 2014/0096446 A1 | 4/2014 | Daniels et al. | |
| 2014/0137472 A1* | 5/2014 | Anderson | A01G 9/249 47/62 A |
| 2015/0102137 A1 | 4/2015 | Anderson et al. | |
| 2016/0029582 A1 | 2/2016 | Anderson et al. | |

FOREIGN PATENT DOCUMENTS

| | | |
|---|---|---|
| CN | 103250583 A | 8/2013 |
| CN | 103563685 A | 2/2014 |
| CN | 103636482 A | 3/2014 |
| CN | 203692043 U | 7/2014 |
| JP | 1986282025 A | 12/1986 |
| JP | 05146231 | 6/1993 |
| JP | H0568440 U | 9/1993 |
| JP | 07034696 B2 | 4/1995 |
| JP | 07327520 A | 12/1995 |
| JP | 409154417 | 6/1997 |
| JP | 2014076013 A | 5/2014 |
| SU | 1531929 A1 | 12/1989 |
| TW | M450203 U1 | 4/2013 |
| TW | 201404292 A | 2/2014 |
| WO | 2007049962 A1 | 5/2007 |
| WO | 2009053533 A1 | 4/2009 |
| WO | 2009059620 A1 | 5/2009 |
| WO | 2013177701 A1 | 12/2013 |
| WO | 2013185136 | 11/2014 |

OTHER PUBLICATIONS

Office Action, The China National Intellectual Property Administration, dated May 7, 2020.
European Patent Office, Partial Supplementary European Search Report, dated Feb. 19, 2018, Application 15827332.6-1011 / 3174381 PCT/US2015043277 for Living Greens Farm, Inc.
Japanese Patent Office, Office Action, dated Mar. 21, 2017, JP application 2015-516273 based on PCT/US2013/045003.
Search Report Written Opinion for PCT/US2013/045003, dated Oct. 28, 2013.
Search Report and Written Opinion for PCT/US2013/032492, dated May 30, 2013.
Search Report Written Opinion for PCT/US2015/043277, dated Sep. 30, 2015.
PCT/US2015038124_International_Search_Report_and_Written_Opinion, dated Sep. 30, 2015.

* cited by examiner

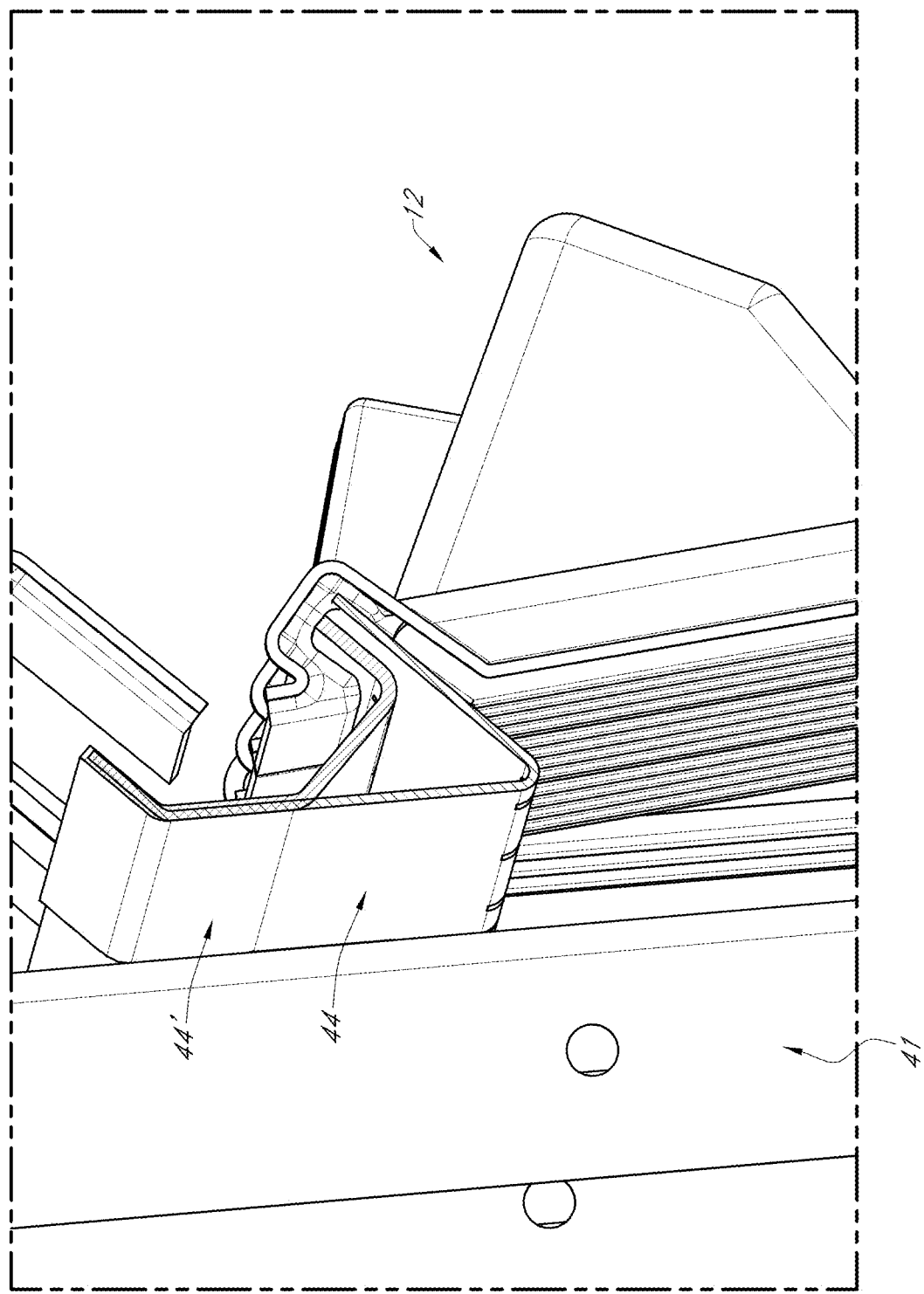

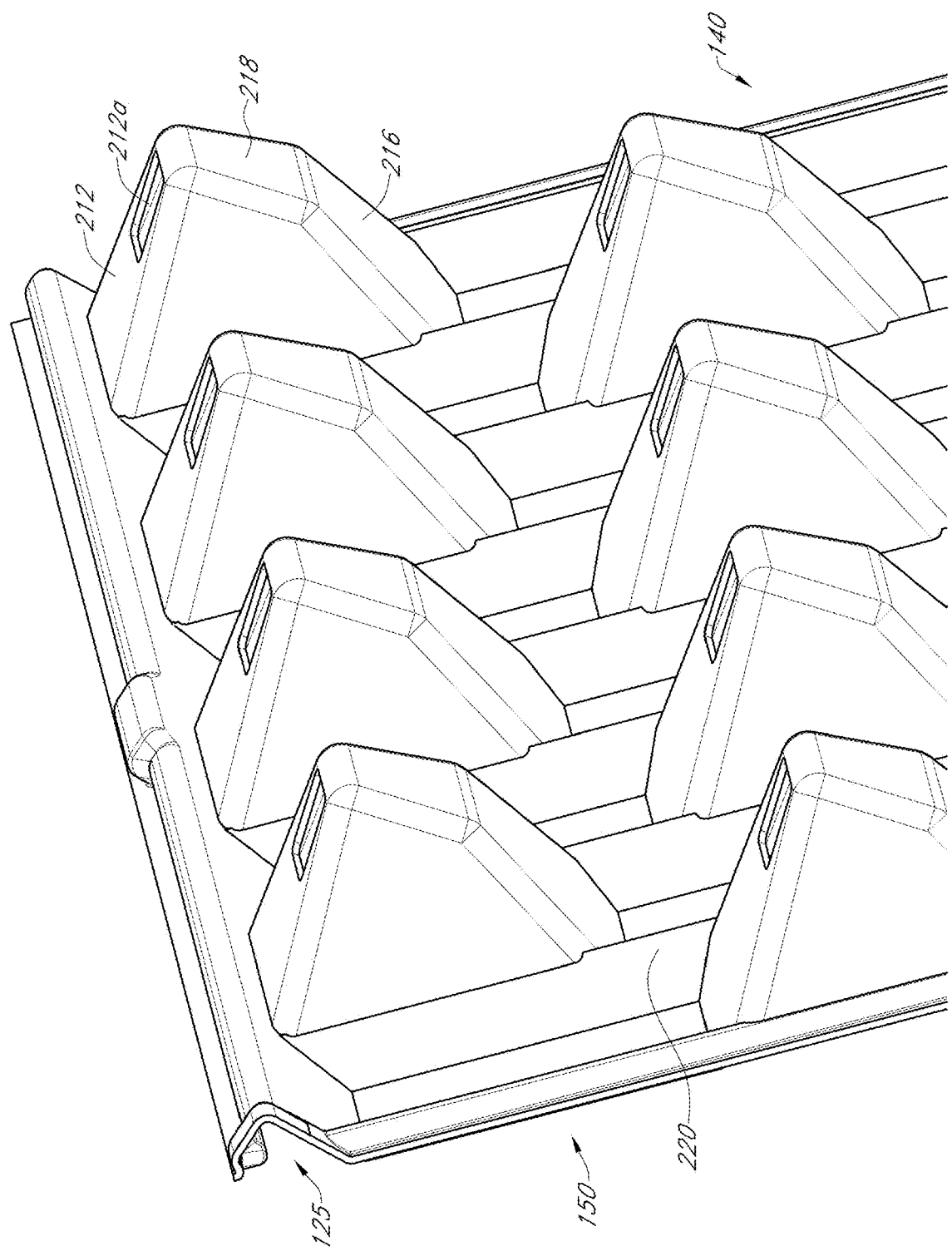

GROWING SYSTEM

CROSS REFERENCE TO RELATED APPLICATIONS

This utility patent application is a continuation-in-part of and claims priority from non-provisional U.S. patent application Ser. No. 15/809,746, which application was a continuation of and claims priority from non-provisional patent application Ser. No. 14/815,472 filed on Jul. 31, 2015 (issued as U.S. Pat. No. 9,814,186 on Nov. 14, 2017), which claimed the priority of provisional U.S. patent application Ser. Nos. 62/031,668 filed on Jul. 31, 2014; 62/032,452 filed on Aug. 1, 2014; 62/050,075 filed on Sep. 12, 2014; and 62/174,940 filed on Jun. 12, 2015; and the current utility patent application claims priority from provisional U.S. patent application Nos. 62/651,148 filed on Mar. 31, 2018; 62/674,463 filed on May 21, 2018; 62/727,838 filed on Sep. 6, 2018; 62/731,593 filed on Sep. 14, 2018; and 62/819,286 filed on Mar. 15, 2019, all of which are incorporated by reference herein in their entireties.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

FIELD

The present invention relates generally to agriculture, and more specifically to aeroponic methods and apparatuses.

BRIEF DESCRIPTION OF DRAWINGS

The accompanying drawings, which are incorporated in and constitute a part of this specification, illustrate embodiments and together with the description, serve to explain the principles of the methods and systems.

FIG. 29B is a perspective view showing two embodiments of an intermediate rail overlaid with one another.

FIG. 44B provides a detailed view of a left side of a top portion of the grow board shown in FIGS. 43A-44A.

DESCRIPTION OF INVENTION

Figure 1:
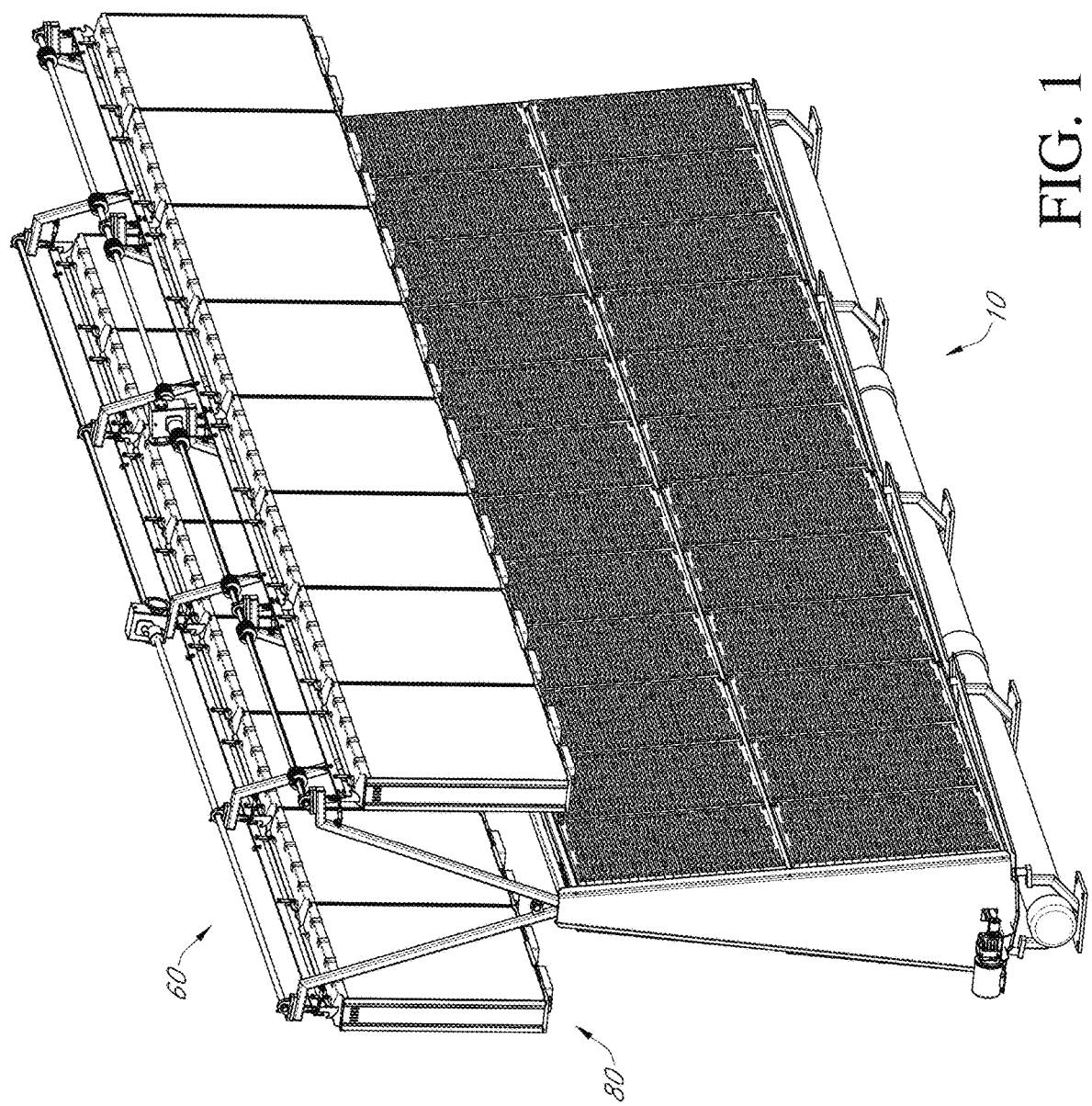
FIG. 1 provides a perspective view of various aspects of a growing system.

| Element Description | Element Number |
| --- | --- |
| Growing system | 10 |
| Grow board | 12 |
| Plant support structure | 14 |
| Aisle | 16 |
| Grow media plug | 17a |
| Foot | 20 |
| Tab | 21 |
| Base | 22 |
| Track | 23 |
| Angled member | 24 |
| Upright member | 25 |
| Gutter | 26 |
| Lateral member | 28 |
| Tray | 30 |
| Trough | 32 |
| Aperture | 32a |
| Lip | 34 |
| Side pane | 36 |
| Skirt | 38 |
| Board frame | 40 |
| Upright | 41 |
| Upright base | 41a |
| Bottom rail | 42 |
| Cross member | 43 |
| Intermediate rail | 44, 44' |
| Upper lip | 44a, 44a' |
| Lower lip | 44b, 44b' |
| Drain | 44c, 44c' |
| Vertical portion | 44d' |
| Angled portion | 44e' |
| Adapter bracket | 45 |
| Top rail | 46 |
| Pan | 47 |
| Pan top lip | 47a |
| Pan bottom lip | 47b |
| Cap | 48 |
| Guide | 48a |
| Wing | 48b |
| Nutrient delivery system | 50 |
| Channel | 51 |
| Guide | 52 |
| Mast | 53 |
| Nutrient supply outlet | 53a |
| Motor | 54 |
| Coupler | 55 |
| Base member | 56 |
| Sensor | 57 |
| Light support | 60 |
| Extension | 61 |
| Distal tab | 61a |
| Keeper | 62 |
| Motor | 63 |
| Bar | 64 |
| Inner peak | 65 |
| Spool | 66 |
| Valley | 67 |
| Connector | 68 |
| Cross support | 69a |
| Length support | 69b |
| Safety lock | 70 |
| Latch | 72 |
| Actuator | 74 |
| Light system | 80 |
| Support frame | 80a |
| Void | 80b |
| Air conduit | 81 |
| Panel | 82 |
| Upper panel | 82a |
| Lower panel | 82b |
| Light source | 83 |
| Top bar | 84 |
| Light cover | 85 |
| Electronics | 86 |
| Collection member | 90 |
| Trolley | 100 |
| Trolley base | 102 |
| Trolley upright | 104 |

-continued

DESCRIPTION OF INVENTION

| Element Description | Element Number |
|---|---|
| Trolley wheel | 106 |
| Track wheel | 106a |
| Indent | 125 |
| Right side | 140 |
| Left side | 150 |
| Grow board | 200 |
| Projection | 210 |
| Top surface | 212 |
| Aperture | 212a |
| Side surface | 214 |
| Bottom surface | 216 |
| Intermediate surface | 218 |
| Ridge | 220 |
| Planar surface | 222 |
| Bottom Lip | 224 |

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description. Corresponding terms may be used interchangeably when referring to generalities of configuration and/or corresponding components, aspects, features, functionality, methods and/or materials of construction, etc. those terms.

It is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance.

A first illustrative embodiment of a growing system 10 and plant support structure 14 is shown in perspective in FIG. 1, wherein a plurality of grow boards 12 are shown engaged with a board frame 40. It is anticipated that in an aspect of a growing system 10 disclosed and claimed herein is that it may be used in agriculture. For example, the growing system 10 may be incorporated with various aeroponic agriculture systems, including but not limited to the various apparatuses and methods disclosed in U.S. patent application Ser. No. 13/914,243, which is incorporated by reference herein in its entirety. Accordingly, the board frame 40 may be configured such that a plurality of grow boards 12 may be simultaneously engaged with the board frame 40. Without limitation, the specific grow board 12, 200 used with any embodiment of a growing system 10 may be any suitable grow board 12, 200 for the particular application of the growing system 10, including but not limited to those disclosed in U.S. patent application Ser. No. 14/752,462, which is incorporated by reference herein in its entirety.

Generally, it is contemplated that in an aspect of a growing system 10 a plurality of plants may be positioned adjacent one or more grow boards 12 such that a nutrient delivery system 50 may provide nutrient supply to a root portion of the plants from an interior side of the grow board 12, 200. Furthermore, it is contemplated that a light system 80 and/or ventilation system may provide light and/or carbon dioxide to a leaf/stem portion of the plants from an exterior side of the grow board 12, 200. Generally, as used herein, the terms "interior side," "interior surface," "interior chamber," and "interior" of a growing system 10 or component thereof may constitute the surface generally facing the root portion of a plant, which generally may be between adjacent uprights 41 from the vantage shown in FIGS. 4 and 12, and the terms "exterior side," "exterior surface," "exterior chamber," and "exterior" of a growing system 10 or component thereof may constitute the surface generally facing the portion of the plant other than the roots thereof, which generally may be outside adjacent uprights 41 from the vantage shown in FIGS. 4 and 12. In many applications the interior of a growing system 10 or component thereof may be oriented toward a nutrient supply and/or nutrient delivery system 50, and an exterior of a growing system 10 or component thereof may be oriented away from a nutrient supply and/or nutrient delivery system 50.

Figure 6:
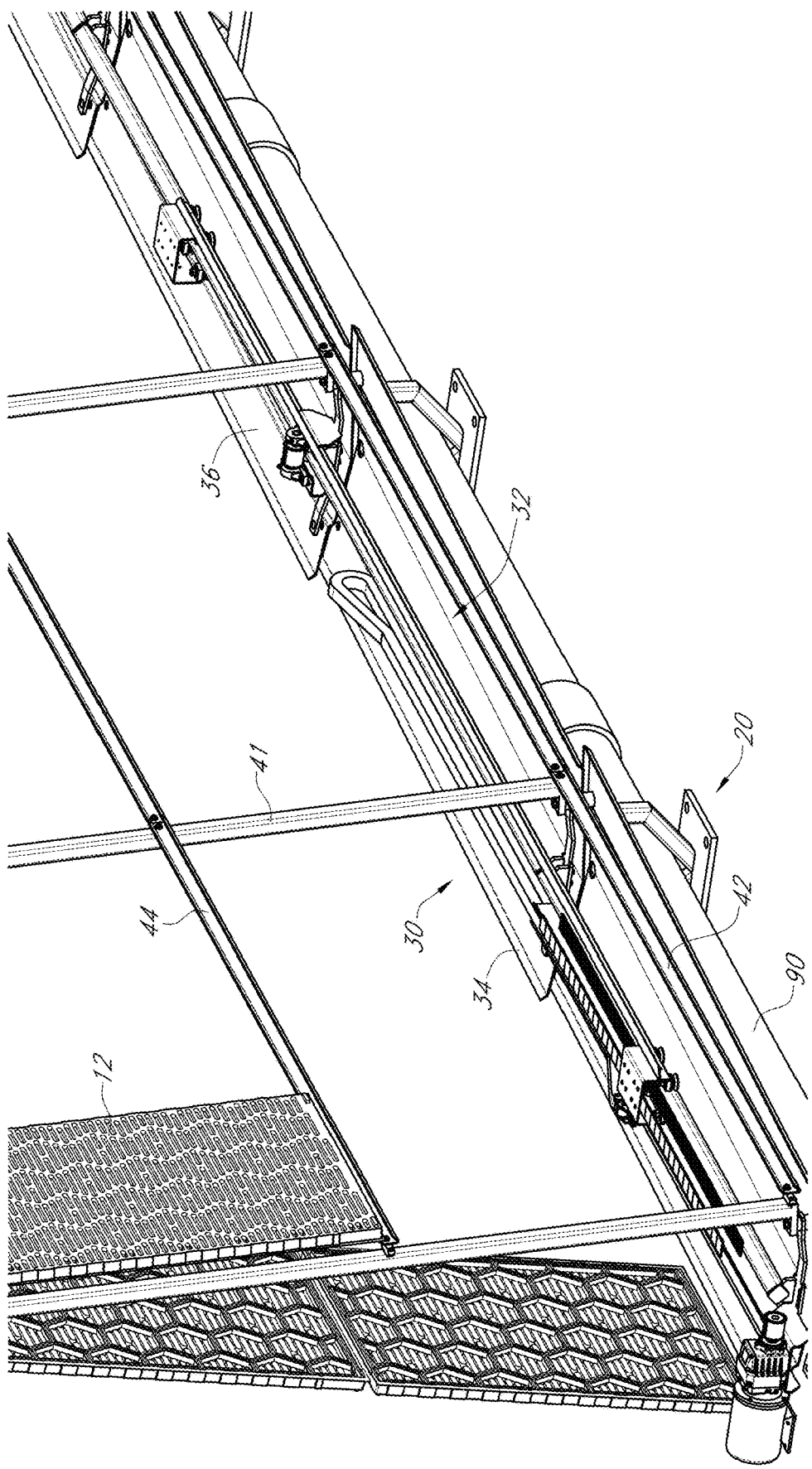
FIG. 6 provides a perspective view of a lower portion of the growing system shown in FIGS. 1-5.
Figure 7:
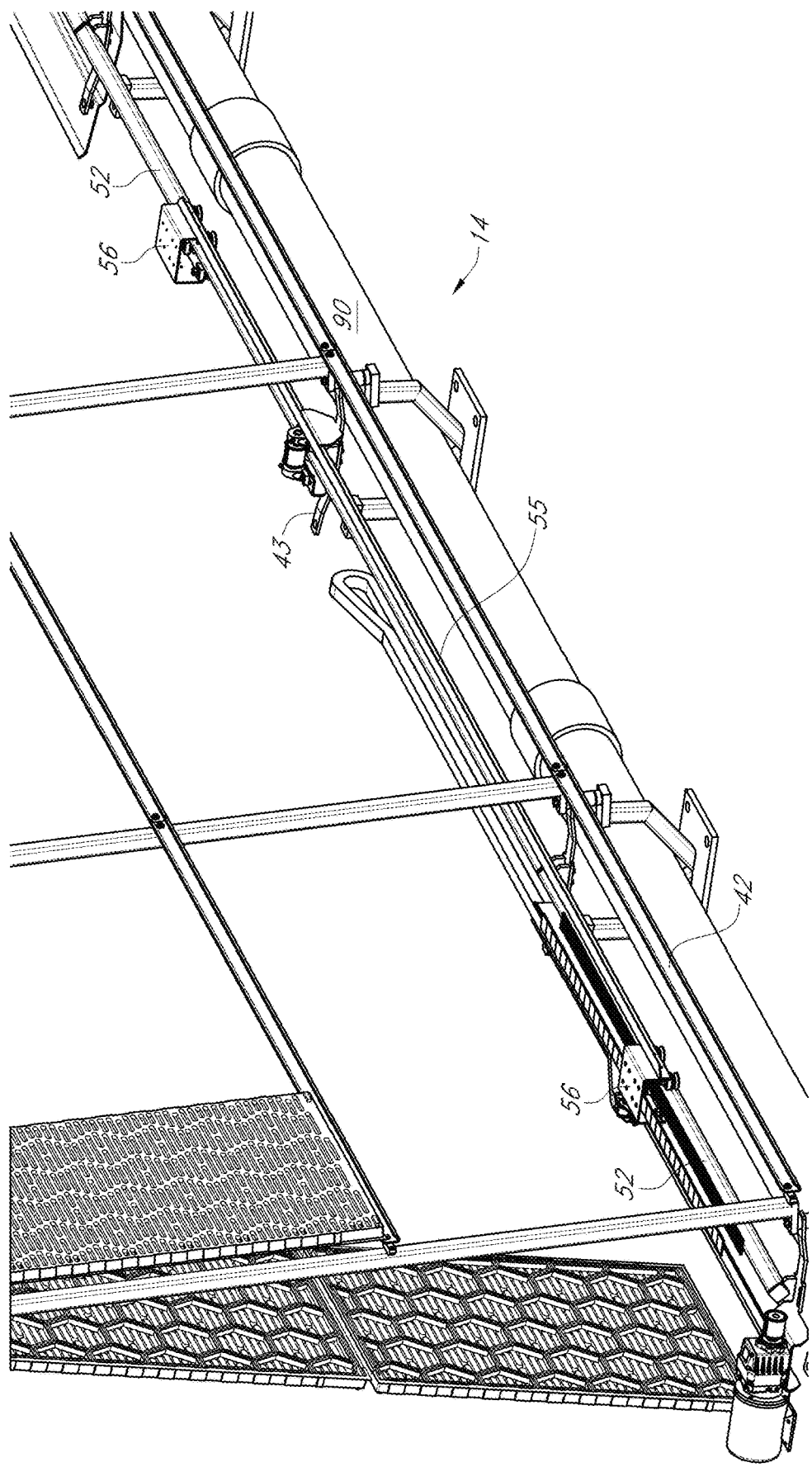
FIG. 7 provides another perspective view of a lower portion of the growing system shown in FIGS. 1-6.
Figure 23A:
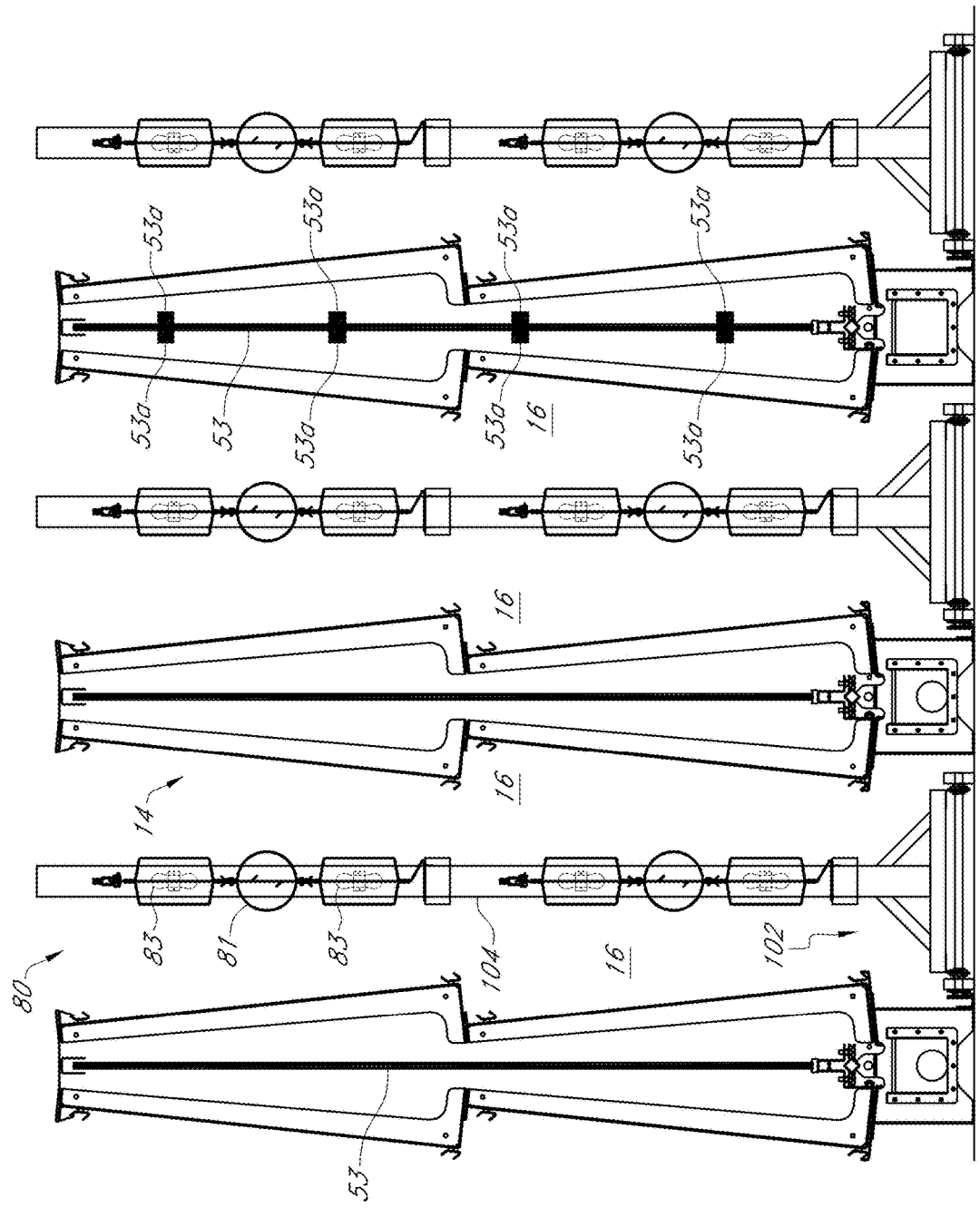
FIG. 23A provides an end view of a growing system with a horizontally moveable light system positioned in an aisle.

An aspect of a nutrient delivery system 50 may include a guide 52 along which one or more base members 56 may travel, wherein a coupler 55 may engage one base member 56 with another, as shown in FIGS. 6 & 7. A motor 54 may be employed to provide the motive force to one or more base members 56. A nutrient supply outlet 53a may be engaged with one or more of the base members 56 via a mast 53, which mast 53 may be configured as a generally vertical pipe and/or tube having various spray nozzles thereon. The rightmost plant support structure 14 shown in FIG. 23A is depicted having a mast 53 and various nutrient supply outlets 53a positioned along the height of the mast 53. Generally, in an aspect all or a portion of the nutrient supply outlet 53a may be configured as a nozzle. However, other nutrient supply outlets 53a and/or nutrient delivery systems 50 may be used with the growing system 10 disclosed herein, and the specific nutrient delivery system 50, structures, and/or methods employed to deliver nutrient supply to a plant in no way limits the scope of the present disclosure unless so indicated in the following claims. Only the rightmost plant support structure 14 in FIG. 23A is shown with a nutrient delivery system 50 having a nutrient supply outlet 53a for purposes of clarity. However, it is contemplated that each plant support structure 14 may employ a corresponding nutrient delivery system 50 on the interior thereof, and that each nutrient delivery system 50 may be comprised of at least one nutrient supply outlet 53a without limitation unless so indicated in the following claims.

Figure 19B:
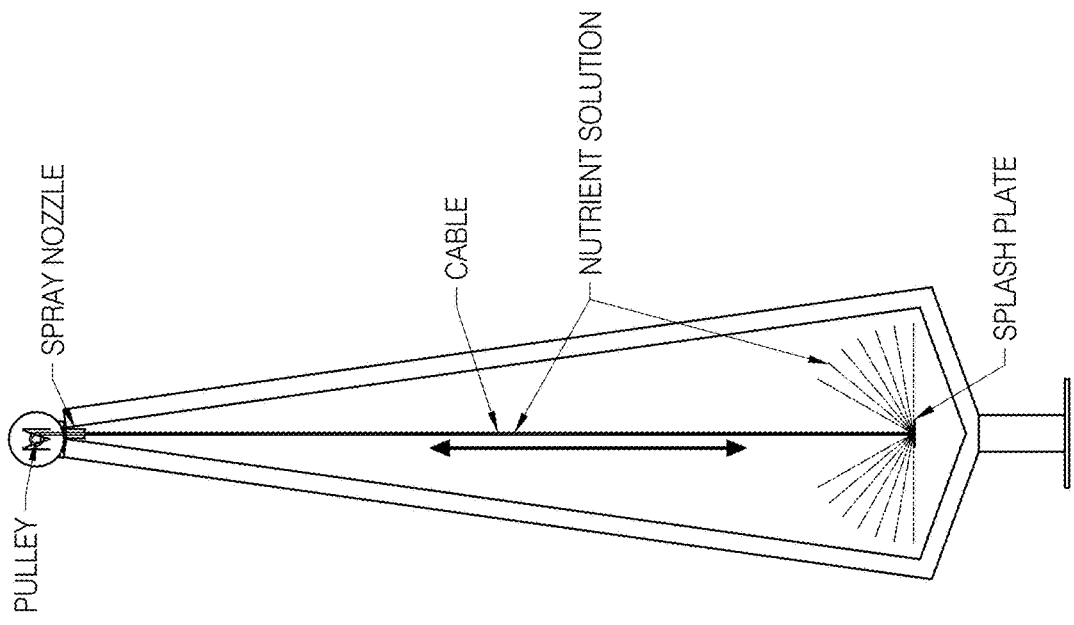
FIG. 19B provides a schematic end view of another nutrient supply system.
Figure 19A:
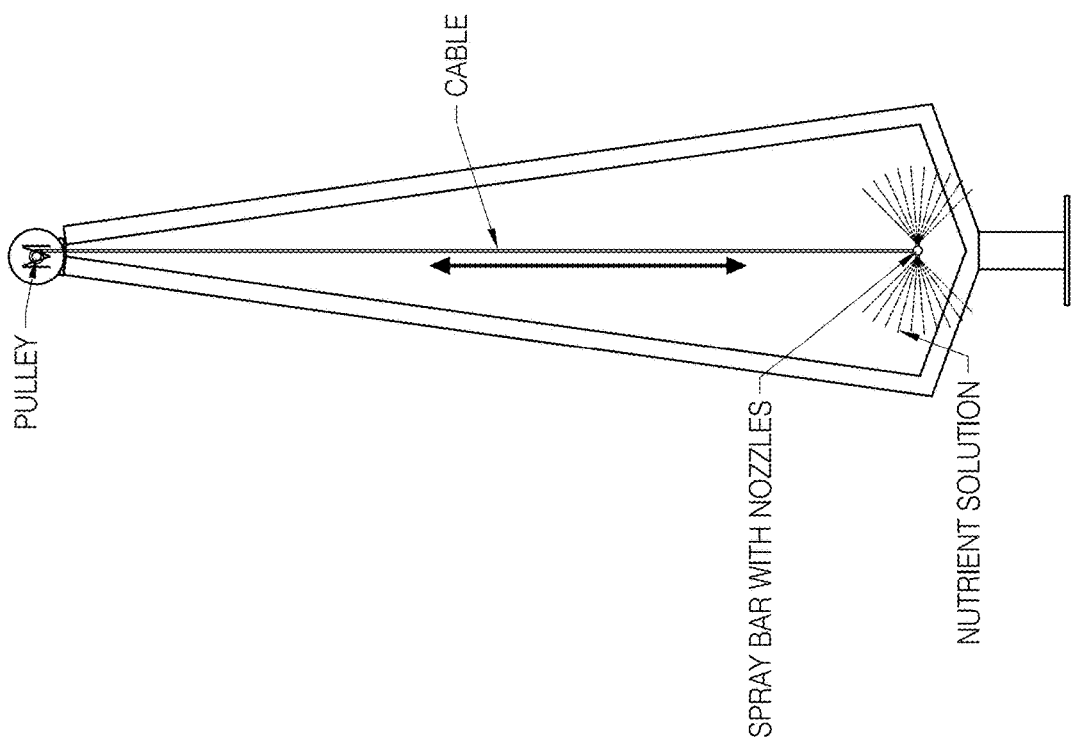
FIG. 19A provides a schematic end view of a nutrient supply system.

Generally, it is contemplated that it may be advantageous for a nutrient delivery system 50 to be configured so that a given nozzle and/or nutrient supply outlet 53a may provide nutrient supply to an area greater than the spray pattern of that given nozzle and/or nutrient supply outlet 53a. Such configurations may include, but are not limited to, horizontally moving masts 53, spray bars, nozzles, and/or nutrient supply outlets 53a, vertically moving masts 53, spray bars, nozzles, and/or nutrient supply outlets 53a, moving plant support structures and/or portions thereof, moving splash and/or deflector plates, and/or combinations thereof. For example, FIG. 19A shows various aspects of a nutrient delivery system 50 employing a vertically moveable nozzle(s), whereas FIG. 19B shows various aspects of a nutrient delivery system 50 employing a vertically moveable splash plate. In an aspect, the splash plate may serve to reduce the particle size of the nutrient supply to a suitable size for optimal plant growth. Other such methods and structures are disclosed in U.S. patent application Ser. No. 13/914,243, and will therefore not be described in further detail herein for purposes of brevity.

One aspect of a growing system 10 may include at least one foot 20 to provide a structural base for various components of the growing system 10, which may generally include a plant support structure 14. In an aspect of a foot 20, the foot 20 may include a base 22 with two angled members 24 extending therefrom, and corresponding upright members 25 extending from the respective angled members 24, which is shown clearly at least in FIGS. 4 & 5. Such a configuration may reduce the actual floor space required for a growing system 10 and may provide an open space having a predetermined height from the floor adjacent either side of the growing system 10. In a configuration wherein multiple growing systems 10 are positioned adjacent one another in rows, this configuration may allow a vehicle designed traverse the space between rows (which space between rows of growing systems 10 may be referred to herein as aisles 16) to have a wider wheelbase than may otherwise be possible.

Figure 2:
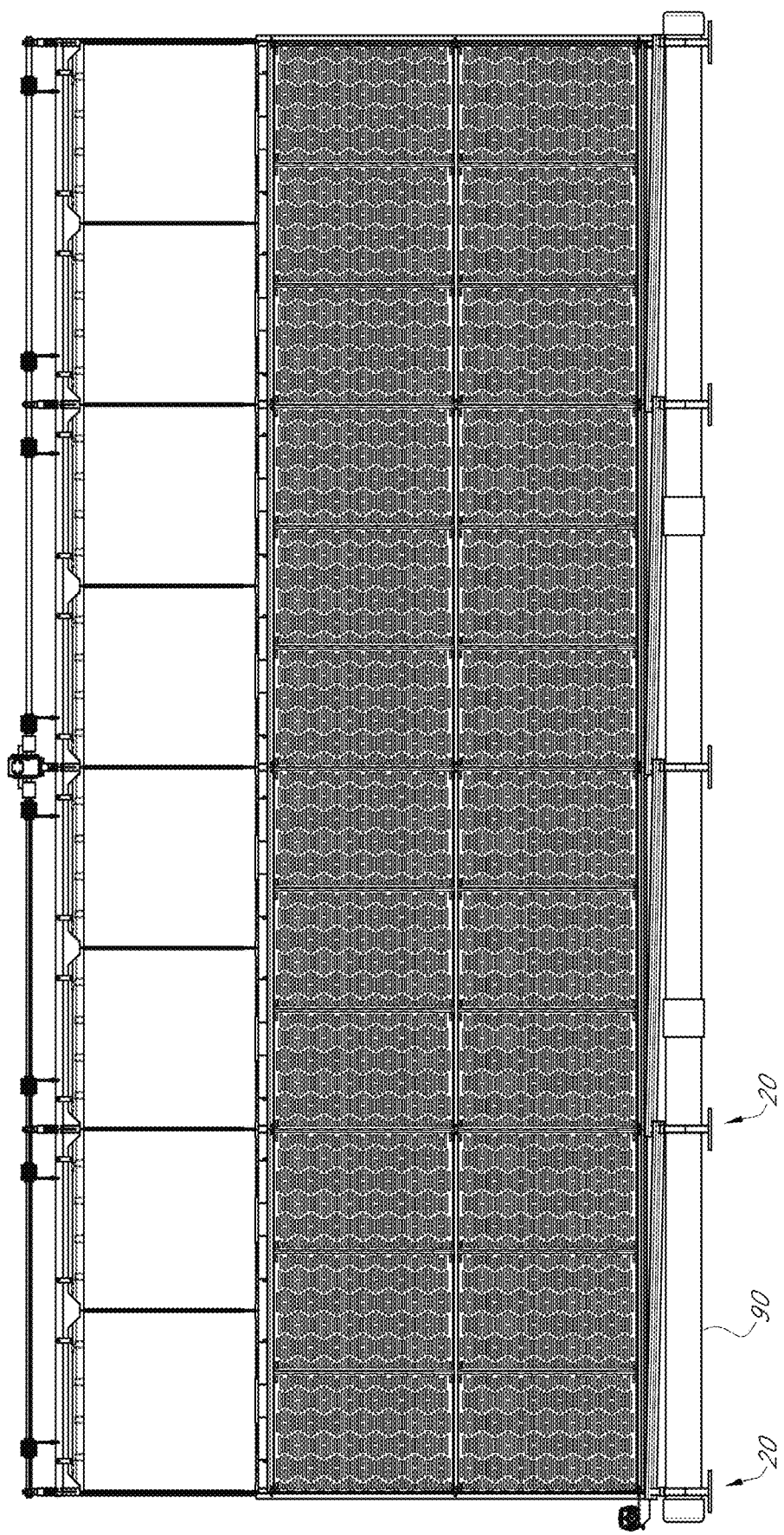
FIG. 2 provides a side view of the growing system shown in FIG. 1.

One or more trays 30 may be engaged with a foot 20 and/or adjacent feet 20 directly and/or via one or more adapter brackets 45. A tray 30 may be formed with two side panes 36 angled downward to a central trough 32. The low end of the trough 32 may be formed with an aperture 32a therein, as shown clearly at least in FIGS. 5 & 6. A lip 34 may be formed around the periphery of the tray 30. Nutrient supply not absorbed by the plants may drain into the trays 30 and flow via gravity to the aperture 32a, which may be in fluid communication with a collection member 90 (one aspect of which may be formed as a tube). A single growing system 10 and/or plant support structure 14 may be formed with a plurality of trays 30 each draining into a common collection member 90. Each tray 30 may be similarly angled to provide a gravity drain, as shown at least in FIGS. 1 & 2. Using a plurality of trays 30 along the length of the growing system 10 and/or plant support structure 14 may require less of a total vertical difference between the high end of a tray 30 and the low end thereof than if a single long tray 30 is used.

From the collection member 90, the nutrient supply may be filtered/treated/adjusted and/or recycled to the nutrient delivery system 50. One or more growing systems 10 may share a common collection member 90 without limitation unless so indicated in the following claims, or each growing system 10 may have a dedicated collection member 90. Accordingly, other collection members 90 may be used with the growing system 10 disclosed herein, and the specific collection member 90, structures, and/or methods employed to collect, recycle, treat, and/or adjust nutrient supply in no way limits the scope of the present disclosure unless so indicated in the following claims. Various such methods and structures are disclosed in U.S. patent application Ser. No. 13/914,243, and will therefore not be described in further detail herein for purposes of brevity.

In one aspect of a board frame 40, an upright 41 may extend from each upright member 25 of a foot 20 in a generally vertically angled direction such that corresponding uprights 41 may form an acute angle with respect to one another. The bottom end of each upright 41 may be engaged with the distal end of each upright member 25 and/or an adapter bracket 45 engaged with each upright member 41. Additionally, a cross member 43 may be engaged with either upright member 25 on a foot 20 as shown at least in FIG. 7. A bottom rail 42 may extend from the bottom end of one upright 41 to the bottom end of the adjacent upright 41. The bottom rail 42 may at least serve to support one or more grow boards 12 as discussed in further detail below. An intermediate rail 44 may extend from a position between the two ends of one upright 41 to a corresponding position on an adjacent upright 41. The intermediate rail 44 may at least serve to support one or more grow boards 12 as discussed in further detail below. A top rail 46 may extend from the top end of one upright 41 to the top end of an adjacent upright 41.

Figure 8:
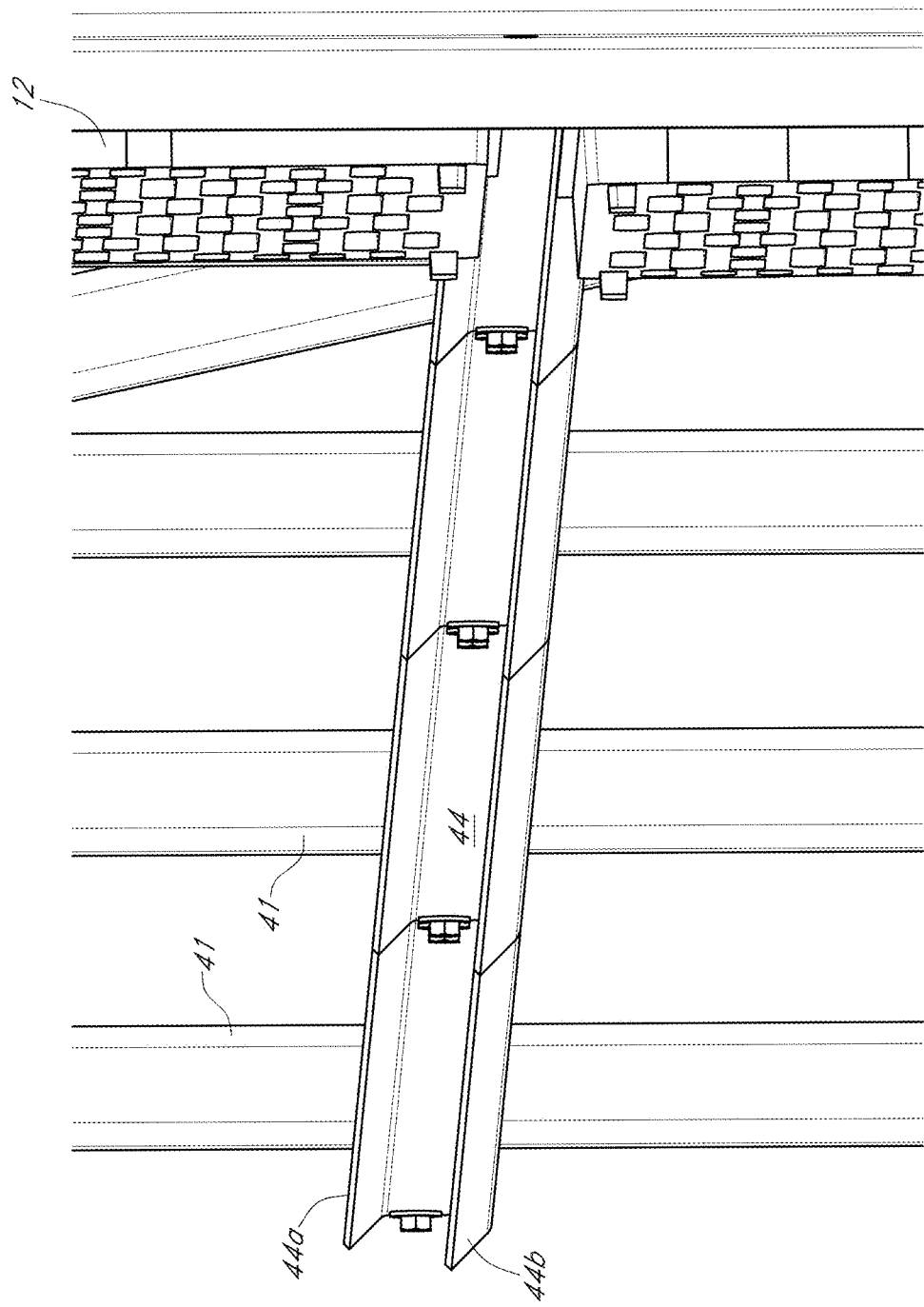
FIG. 8 provides a perspective view of an intermediate portion of the growing system shown in FIGS. 1-7.
Figure 9:
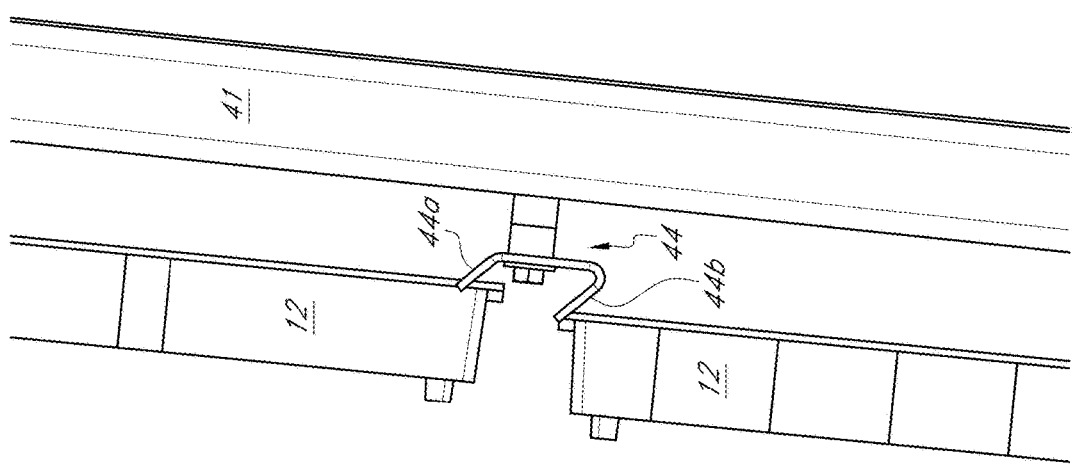
FIG. 9 provides an end view of the intermediate portion shown in FIG. 8.
Figure 10:
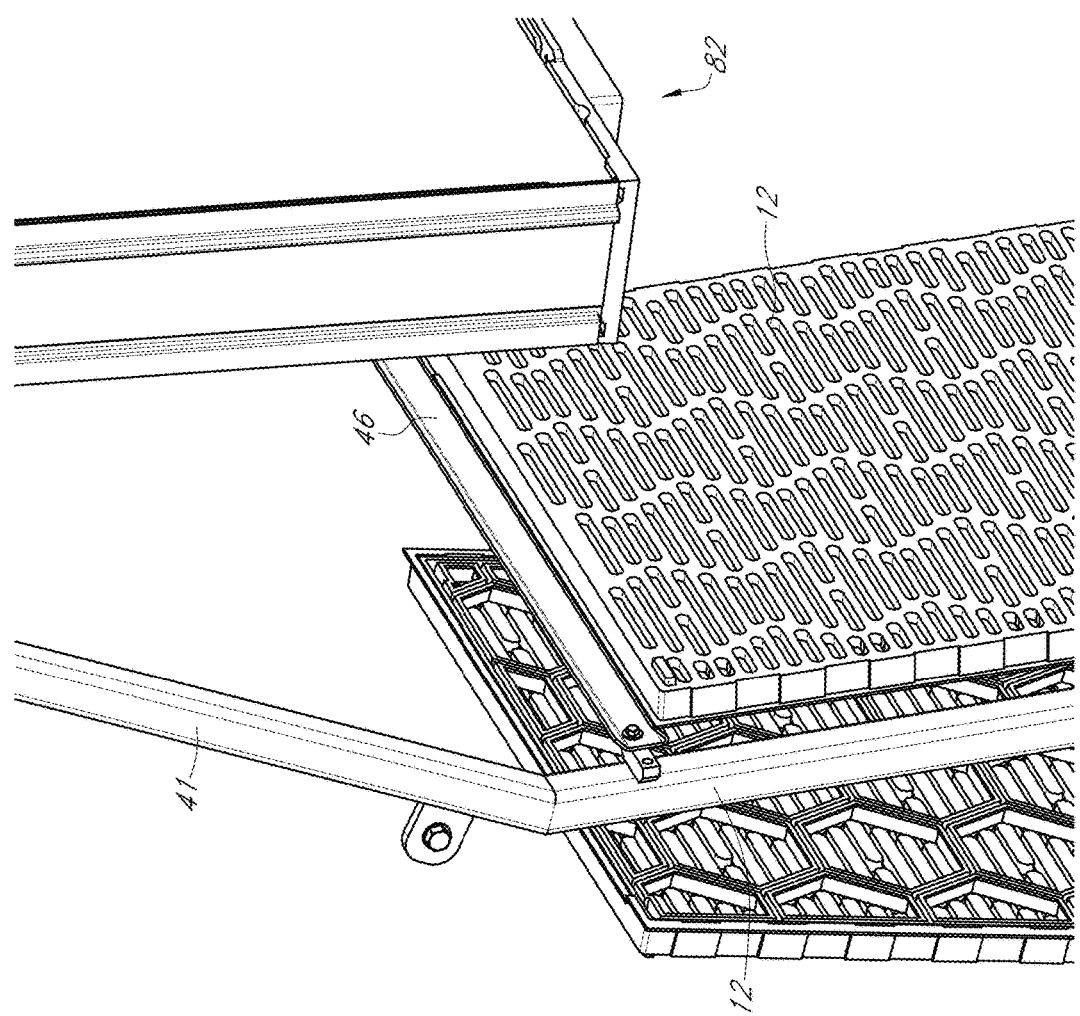
FIG. 10 provides a perspective view of a top portion of the growing system shown in FIGS. 1-9.

As shown at least in FIGS. 8 & 9, the rails 42, 44, 46 may be formed with an upper lip 44a and a lower lip 44b. The lips 44a, 44b may be configured such that nutrient supply directed toward the interior surface of a grow board 12, 200 does not reach the exterior surface of the grow board 12, 200, or such that a reduced portion of the nutrient supply reaches the exterior surface of the grow board 12, 200. In an aspect of such a configuration, the upper lip 44a may extend beyond the lower edge of a grow board 12, 200 positioned adjacent the upper lip 44a and the lower lip 44b may be configured such that a flap on the upper edge of a grow board 12, 200 positioned adjacent the lower lip 44b fits over a portion of the lower lip 44b. This configuration may allow the grow board 12, 200 to be supported by the lower lip 44b via the engagement between the lower lip 44b and the upper edge of a grow board 12, 200 (e.g., the grow board 12, 200 may hang from the lower lip 44b and a bottom portion of the grow board 12, 200 may rest against the upper lip 44a). However, any suitable structure and/or method designed to mitigate and/or prevent nutrient supply from passing from the interior surface of a grow board 12, 200 to the exterior surface thereof may be used with the growing system 10 without limitation unless so indicated in the following claims, as may any suitable structure and/or method designed to support one or more grow boards 12.

The various elements of a foot 20, tray 30, and/or board frame 40 may be separately formed and later engaged with one another, via, for example, mechanical fasteners, chemical adhesives, and/or combinations thereof without limitation unless so indicated in the following claims. Alternatively, some and/or all of the elements may be integrally formed with one another without limitation unless so indicated in the following claims. These elements may be constructed of any material suitable for the particular application thereof, including but not limited to polymers, plastics, metals and their alloys, natural materials, and/or combinations thereof. The various elements of a foot 20, tray 30, and/or board frame 40 may be configured to provide a system with a predetermined load-bearing capacity for support of one or more grow boards 12 having a plurality of plants positioned thereon of various weights. Accordingly, the scope of the present disclosure is in no way limited by specific weight, capacity, and/or size of any of the elements of the growing system 10 unless so indicated in the following claims.

Figure 3:
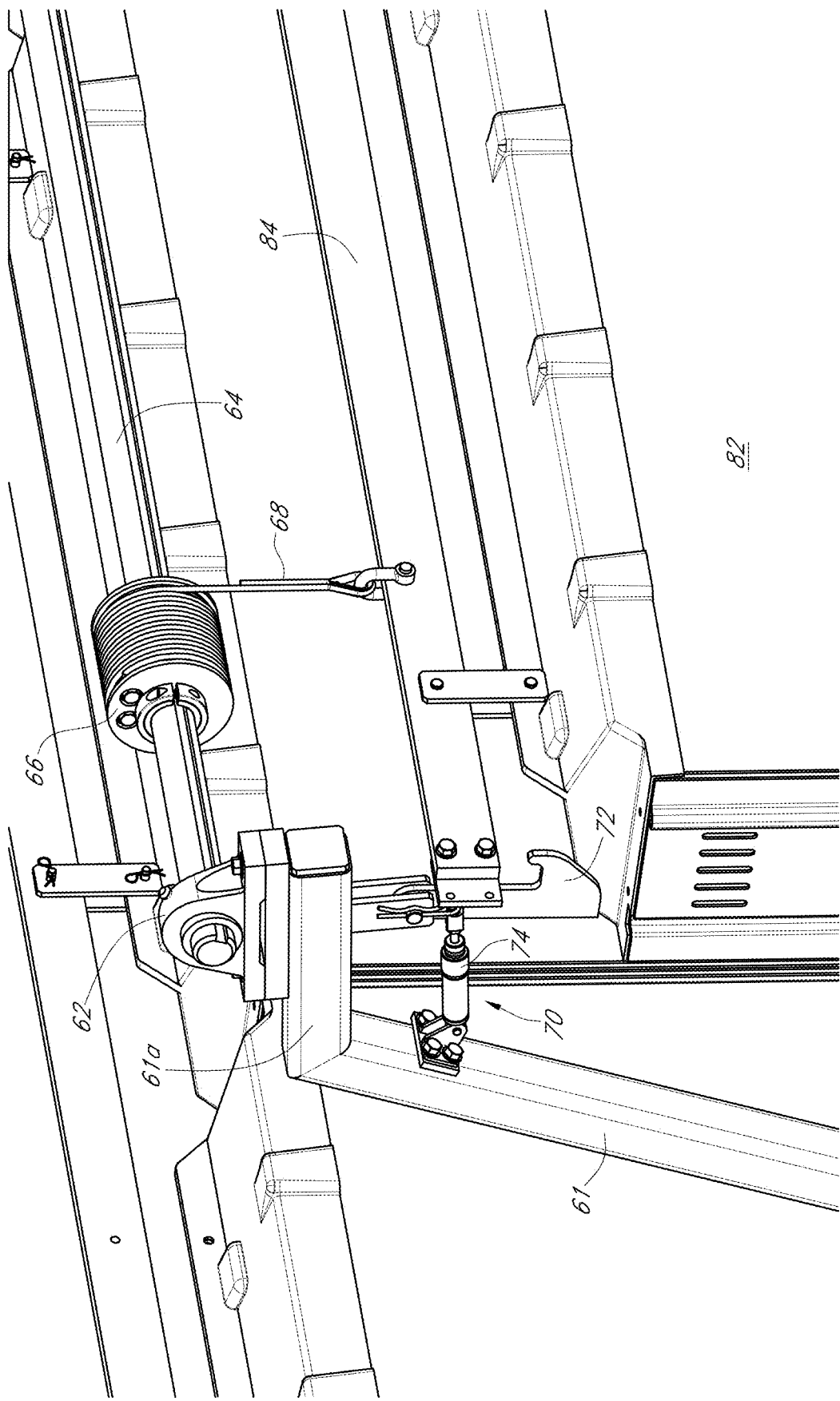
FIG. 3 provides a detailed view of an upper portion of the growing system shown in FIGS. 1 & 2.
Figure 4:
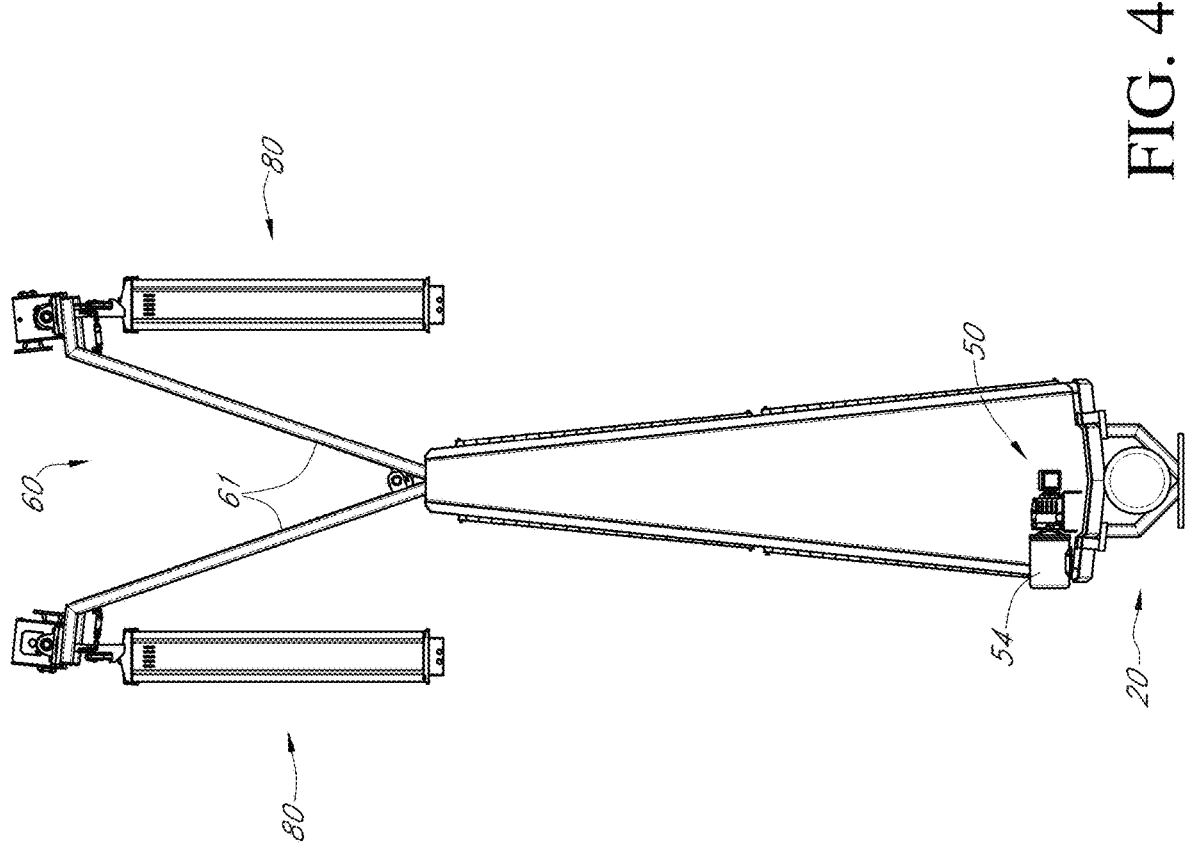
FIG. 4 provides an end view of the growing system shown in FIGS. 1-3.
Figure 5:
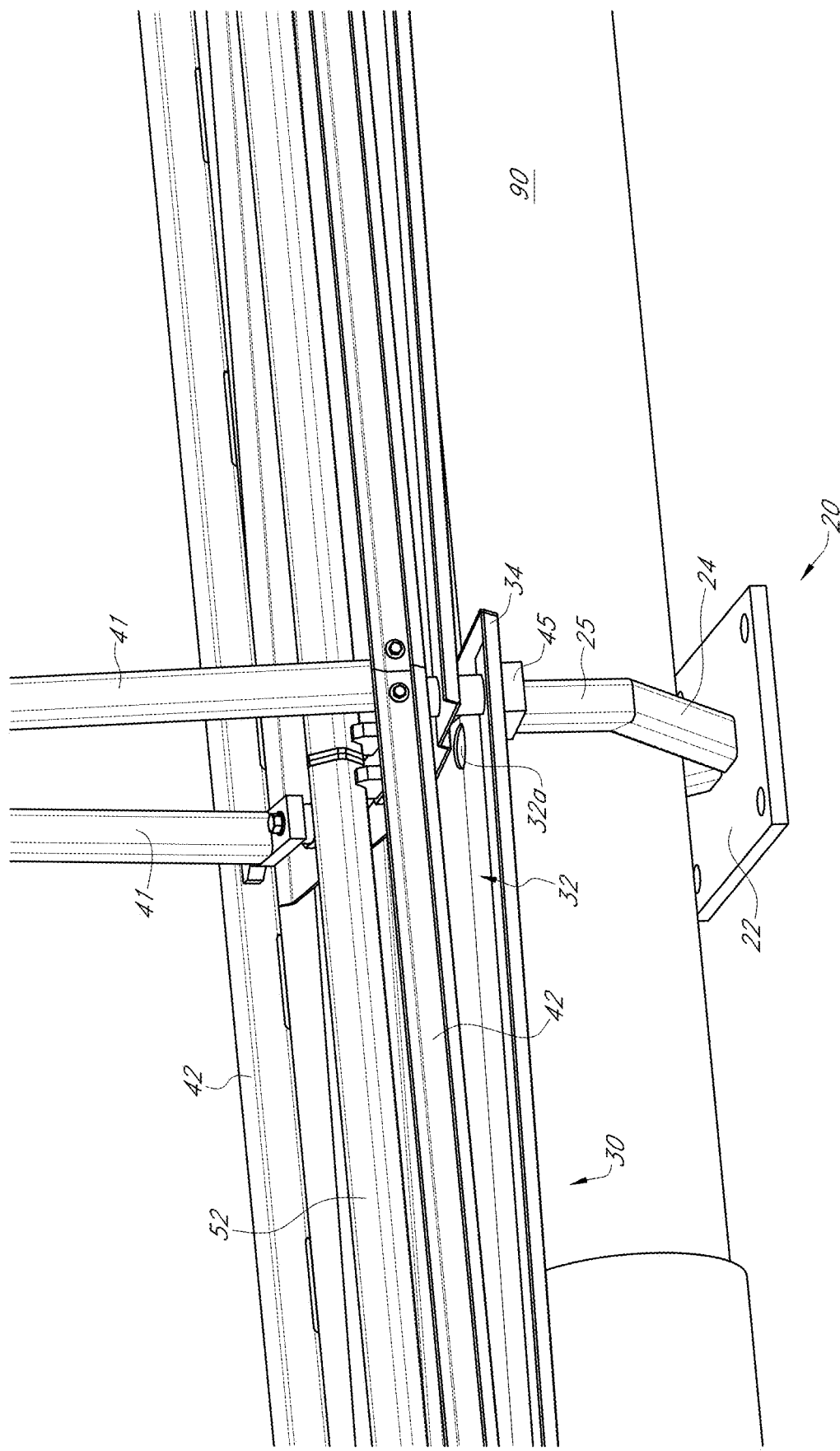
FIG. 5 provides a detailed view of a lower portion of the growing system shown in FIGS. 1-4.

In an aspect of the growing system 10, a light support 60 may be engaged with the board frame 40 adjacent the upper ends of the uprights 41. Generally, the light support 60 may serve to support, move, and/or adjust one or more light systems 80 and/or air conduits 81. Referring specifically to FIGS. 3 and 4, an aspect of a light support system 60 may include one or more extensions 61 extending upward from the board frame 40 at an angle with respect thereto. The distal end of each extension may be configured as a distal tab 61a. A keeper 62 may be engaged with one or more distal tabs 61a along a specific length of the light support 60. In an aspect, a keeper 62 may be configured with a rotational bearing therein, but the scope of the present disclosure is not so limited unless so indicated in the following claims.

A bar 64 may be pivotally engaged with one or more keepers 62 such that the bar 64 may rotate with respect to a keeper 62. A bar 64 may be engaged with a spool 66 such that the spool 66 may rotate with the bar 64. A first end of a connector 68 may be engaged with the spool 66 and a second end thereof may be engaged with a top bar 84 of a light system 80. In an aspect, the connector 68 may be formed as a flexible cable, such that when the bar 64 rotates in a first direction, a portion of the connector 68 wraps around the spool 66 and the light system 80 moves upward with respect to the board frame 40, and when the bar 64 rotates in the opposite direction, a portion of the connector 68 unwraps from the spool 66 and the light system 80 moves downward with respect to the board frame 40. In this manner, the light and/or air flow experienced by plants at different heights on a given plant support structure 14 may be adjustable.

Referring now specifically to FIG. 3, a safety lock 70 may be employed in a growing system 10 having a light system 80 that may move vertically with respect to the board frame 40. An actuator 74 may be engaged with one of the extensions 61 at a first end of the actuator 74, and a second end of the actuator 74 may be engaged with a latch 72 such that the actuator 74 may cause the latch 72 to prevent the light system 80 from moving downward with respect to the board frame 40 through a mechanical engagement between the latch 72 and a portion of the light system 80. It is contemplated that a safety lock 70 may be configured such that the latch 72 prevents downward movement of the light system 70 when one or more persons are positioned under the light system 80, and/or other potentially dangerous situations (e.g., power outages). However, any suitable structure and/or method may be used to prevent unwanted downward movement of the light system 80 with respect to a board frame 40 without limitation unless so indicated in the following claims.

In other aspects of a plant support structure 14 shown in FIGS. 11-17B, the overall height of the plant support structure 14 may be variable and/or modular. As shown, multiple uprights 41 may be engaged with one another on either side of the plant support structure 14 via the top of one upright 41 and an upright base 41a configured adjacent the bottom of another upright 41. Accordingly, multiple uprights 41 may be vertically oriented/engaged with respect to one another.

Figure 11:
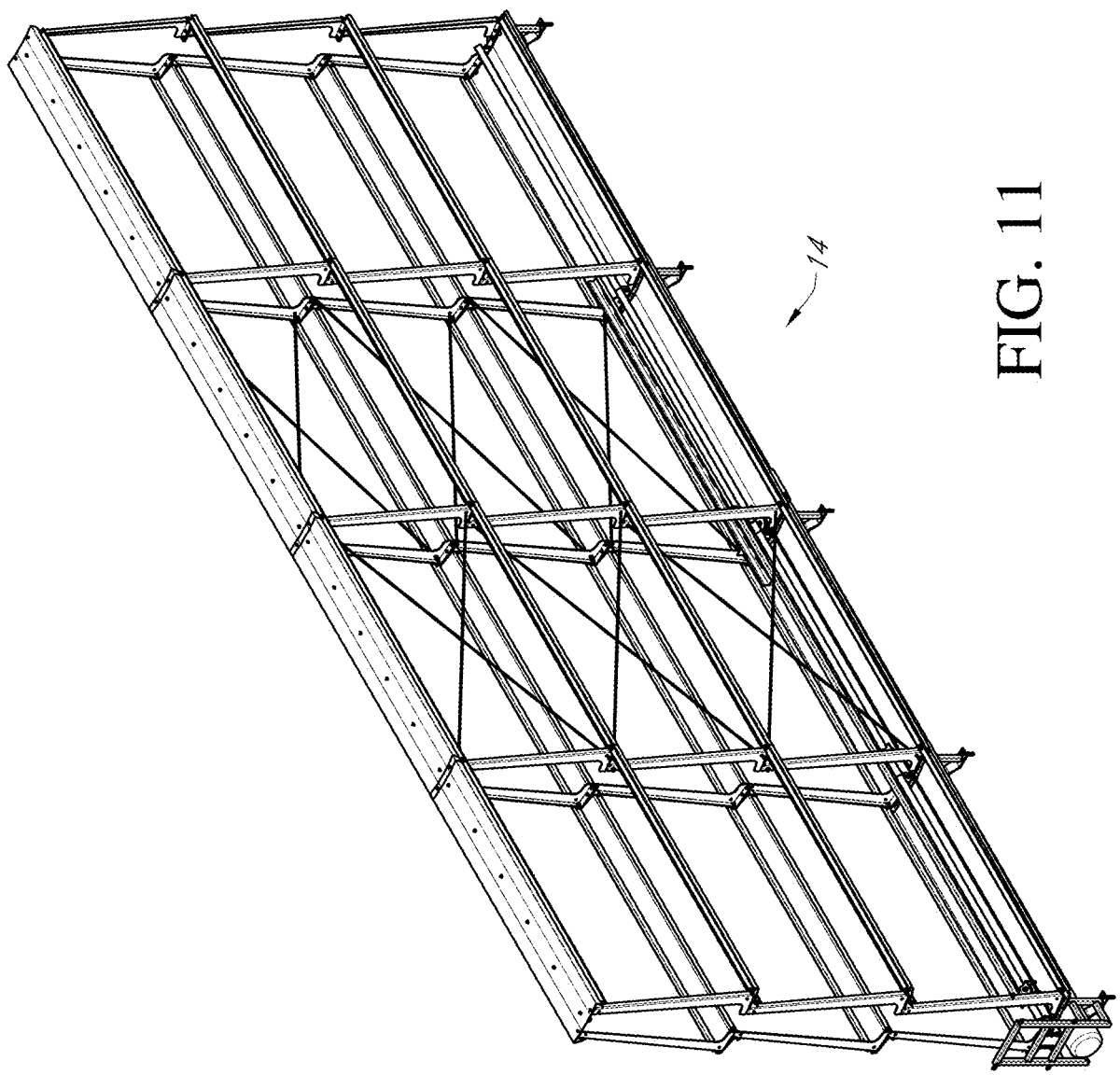
FIG. 11 provides a perspective view of another plant support structure.
Figure 12:
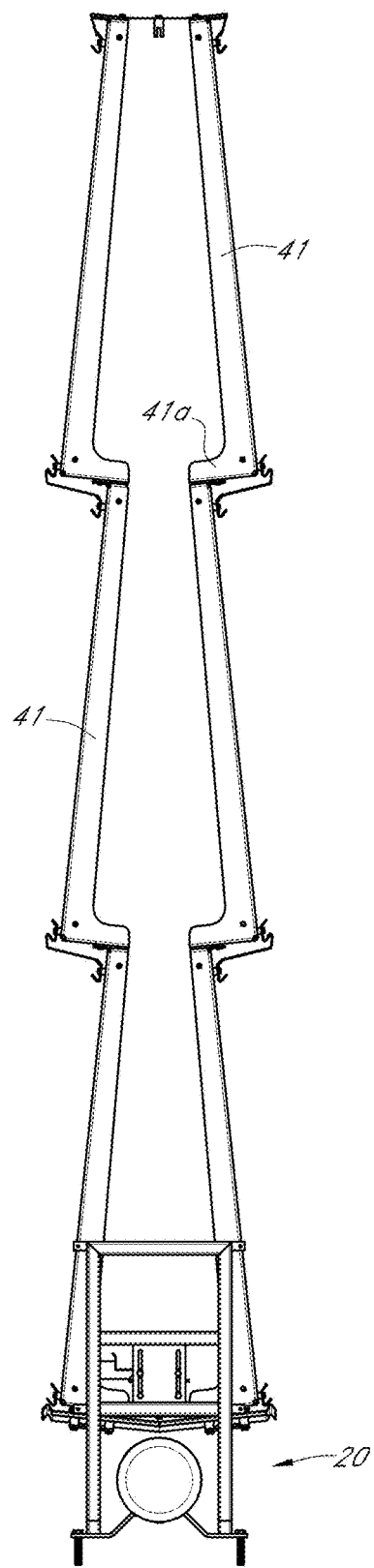
FIG. 12 provides an end view of the plant support structure shown in FIG. 11.
Figure 13:
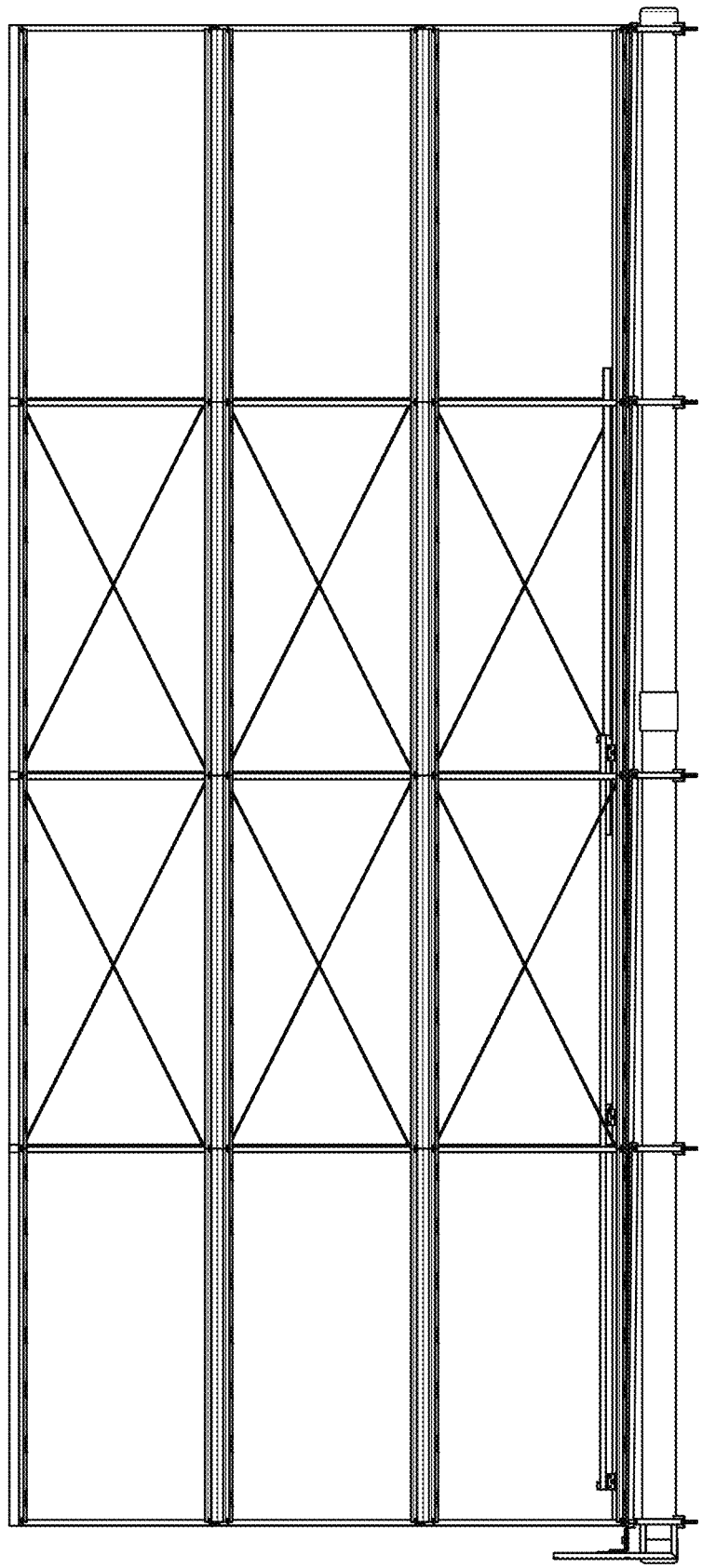
FIG. 13 provides a side view of the plant support structure shown in FIGS. 11 & 12.
Figure 14:
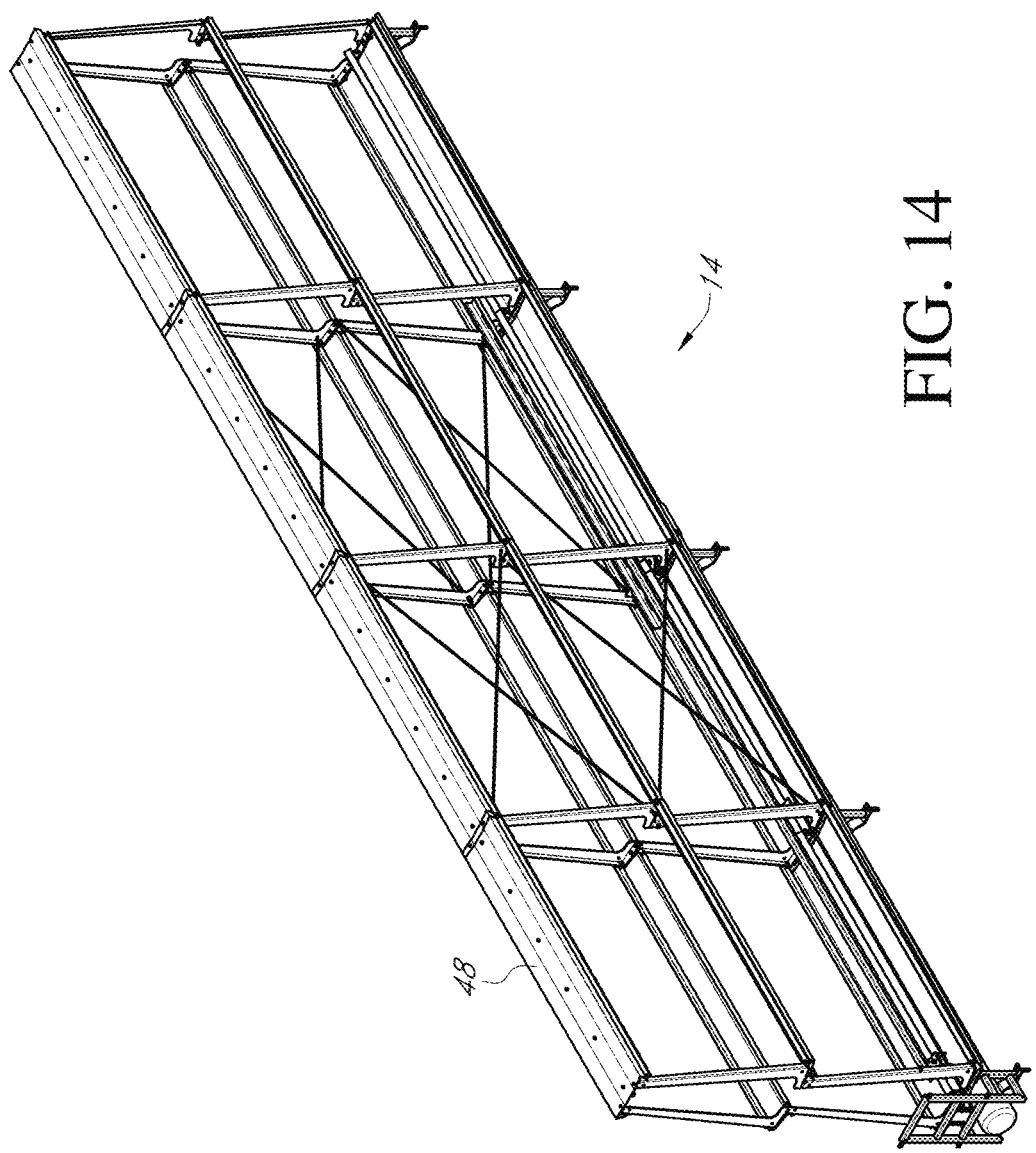
FIG. 14 provides a perspective view of another plant support structure.
Figure 15:
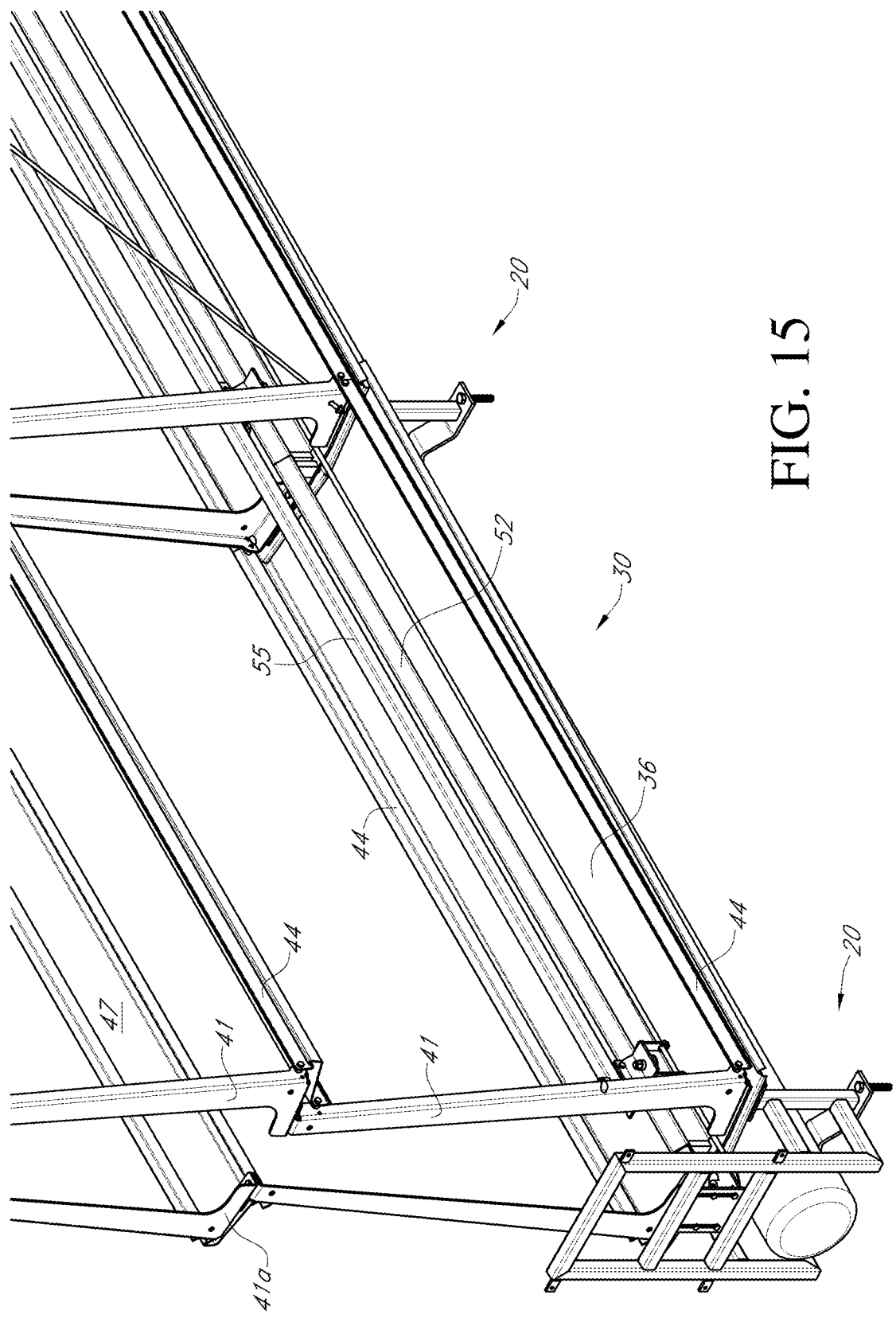
FIG. 15 provides a detailed view of a lower portion of a plant support structure like those shown in FIGS. 11-14.

The specific dimensions and/or configuration of the upright 41 may vary from one embodiment of the plant support structure 14 to the next, but it is contemplated that in some aspects it may be beneficial for the height of an upright 41 to be approximately four feet, such that the plant support structure shown in FIGS. 11-13 may be approximately twelve feet in height, and that shown in FIG. 14 may be approximately eight feet in height. However, in other aspects of the plant support structure 14, the height thereof may be different, greater, or less than those pictured herein without limitation unless so indicated in the following claims. That is, one, two, three, or more uprights 41 may be stacked atop one another without limitation and independent of the height of the individual uprights 41 unless so indicated in the following claims. Additionally, the specific dimensions and/or configuration of the upright base 41 and/or the engagement between the top end of a first upright 41 and the upright base 41a of a second upright 41 positioned above the first upright 41 may vary. For example, in an aspect of the plant support structure 14 the position of the upright base 41 of a first upright 41 positioned on top of a second upright 41 may be moved inward with respect to the second upright 41 so that the distance between corresponding uprights 41 on a higher tier may be less than the distance between corresponding uprights 41 below those on a top tier. Such a configuration may improve light distribution if the growing system 10 is configured for use in a controlled environment utilizing sunlight. However, the scope of the present disclosure is in no way limited by the relative dimensions of any components of the board frame 40 with respect to one another unless so indicated in the following claims.

The plant support structure 14 may include one or more feet 20 adjacent the base thereof along the length of the plant support structure 14 to support various elements of the plant support structure 14. The foot 20 may be configured similarly to that shown in FIGS. 1-10, it may be configured as shown in FIGS. 11, 12, and 14, or it may be differently configured depending on the application of the plant support structure 14. Accordingly, the specific dimensions, shape, orientation, and/or configuration of the structure for supporting a plant support structure 14 in no way limits the scope of the present disclosure unless so indicated in the following claims.

One or more trays 30 as previously described for aspects of the growing system 10 pictured in FIGS. 1-10 may be positioned adjacent the feet 20. The trays 30 may be angled as previously described such that each tray 30 drains into a collection member 90, also as previously described. Alternatively, other structures and/or methods may be used to ensure run-off nutrient supply from the plant root zone is collected with a minimal amount passing from the interior surface of a grow board 12, 200 to the exterior surface thereof without limitation unless so indicated in the following claims. Furthermore, the specific configuration of the tray 30 (e.g., the shape and dimensions of the trough 32, lip 34, side pane 36, etc.) in no way limits the scope of the present disclosure unless so indicated in the following claims.

As previously described for the aspects of a growing system 10 shown in FIGS. 1-10, a nutrient delivery system 50 may be engaged with a portion of the plant support structure 14. In one embodiment, the nutrient delivery system 50 may be configured in a manner similar to that as previously described. In another aspect of a nutrient delivery system 50, the motor 54 may be oriented such that the axis of rotation of the power delivery member of the motor 54 is vertical, which may provide space savings for certain applications of the plant support structure 14.

It is contemplated that an aspect of the growing system may employ a light system 80. Depending on the height of the plant support structure 14, it may be advantageous to configure the light system 80 such that it is moveable in the horizontal dimension. It is contemplated that the light system 80 may move during use such that a light system 80 of a given length may provide light to plants positioned on a plant support structure 14 of a greater length than the light system 80. However, hanging light systems 80 and/or other vertically moving light systems 80 may be used without limitation unless so indicated in the following claims. Additionally, an air conduit 81 and/or an air supply mechanism may be engaged with the light system 80 to provide air circulation and/or high-carbon-dioxide-concentration air to plants. One such aspect of a light system 80 is shown in FIG. 22 and described in further detail below. It is contemplated that a horizontally mobile light system 80 may be positioned between two adjacent plant support structures 14 (and/or growing systems 10) oriented in rows, such that a single light support system 80 may provide light to an exterior side of two adjacent plant support structures 14. One such light system 80 is shown in FIGS. 23A-23C and described in further detail below.

The configuration of the plant support structure 14 may allow for more even light distribution along a specific height of upright 41 than in prior art configurations. For example, if the height of each upright 41 is four feet, and the upright 41 positioned above another upright 41 is the same dimensions and in the same vertically oriented plane, then the only variation of light is along four feet of height even though the plant support structure 14 is eight feet high. In the prior art, an eight-foot-high plant support structure 14 would have incurred light variation along its entire height. Accordingly, an aspect of a growing system 10 shown in FIGS. 11-17B may allow for more even light distribution, and therefore more even plant growth when compared to prior art plant support structures 14. Additionally, the light system 80 may be configured to mimic the shape of the plant support structure 14 along its length. That is, the light system 80 may be configured such that certain light sources are horizontally misaligned from other light sources such that each light source in a given light system 80 is approximately the same distance from an upright 41 along the height of the upright 41. As shown in FIG. 12, this may require angling portions of the light system 80 at angles equal or nearly equal to the angle of each upright 41.

Figure 16:
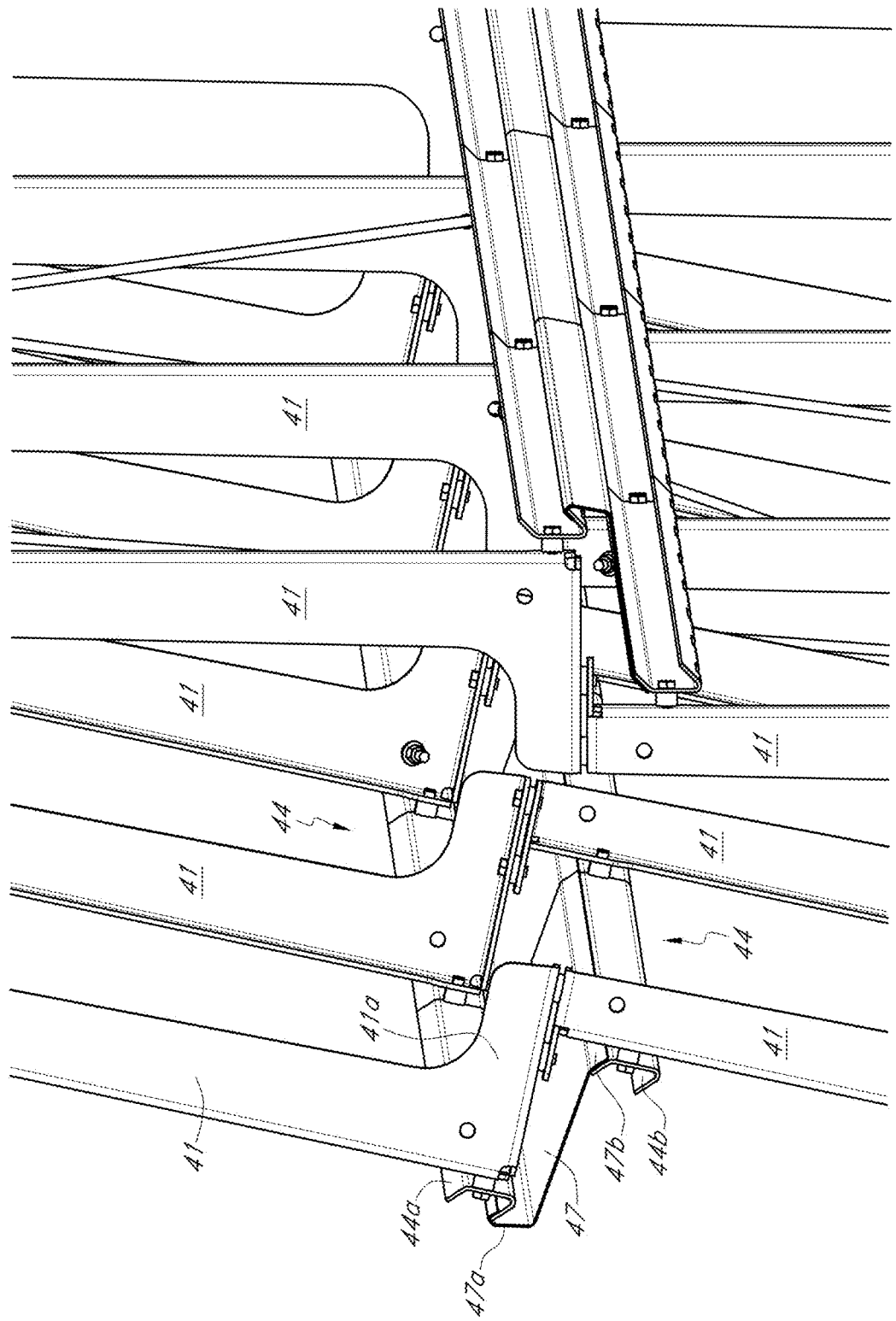
FIG. 16 provides a detailed view of a portion of a plant support structure like those shown in FIGS. 11-15.
Figure 17A:
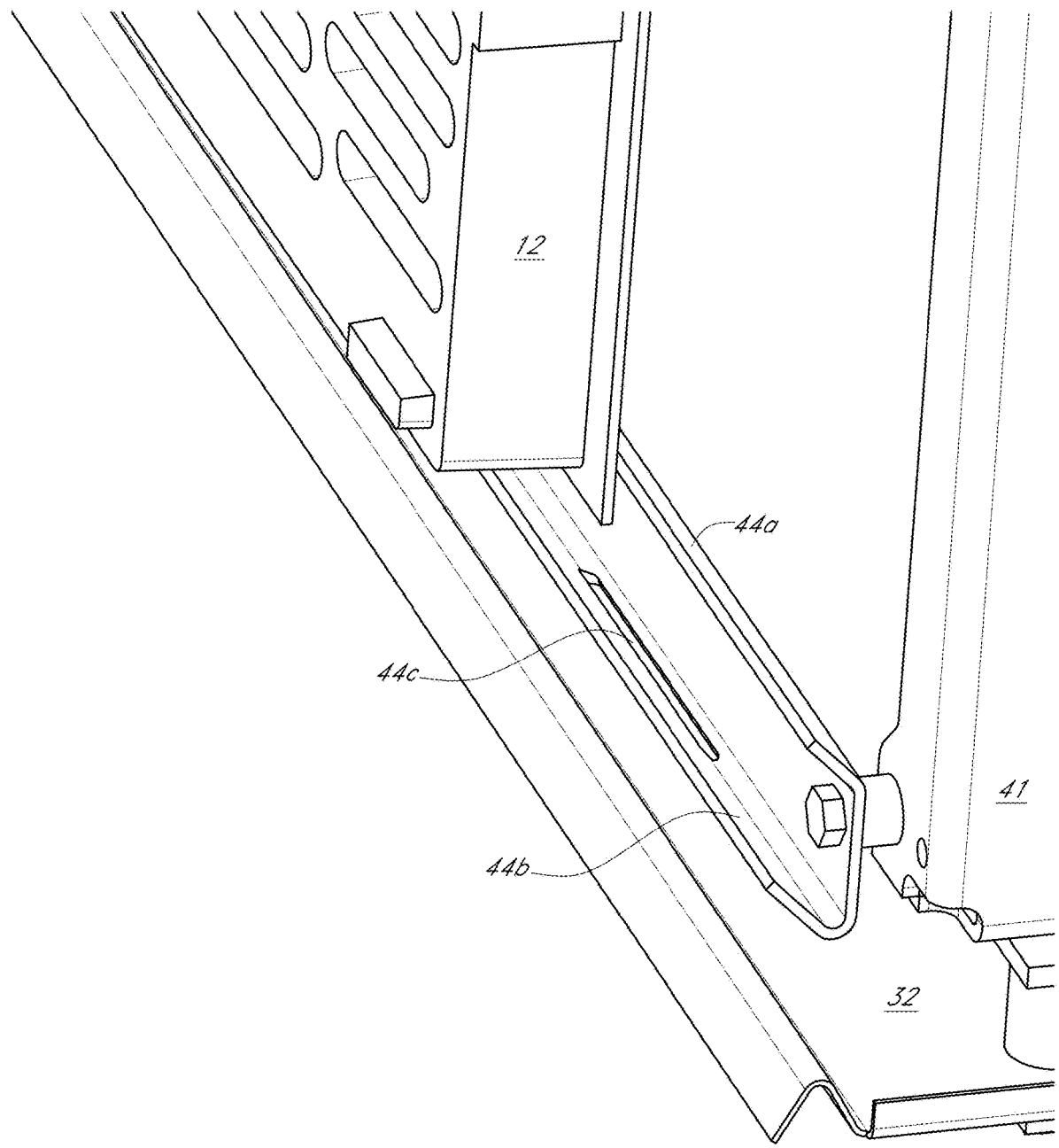
FIG. 17A provides a detailed view of a grow board engaged with a rail adjacent a bottom edge of the grow board.
Figure 17B:
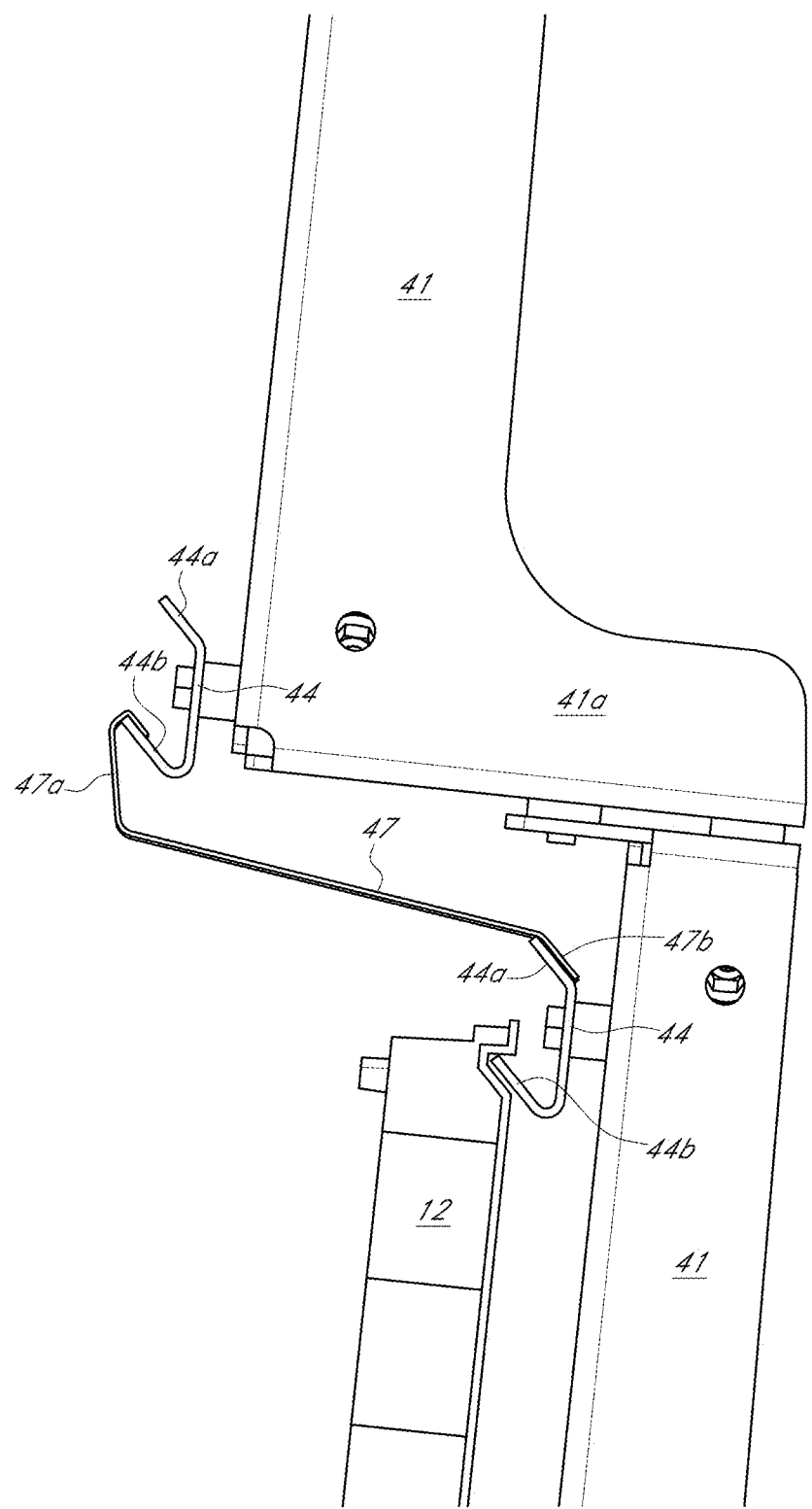
FIG. 17B provides a detailed view of a grow board engaged with a rail adjacent a top edge of the grow board.
Figure 17C:
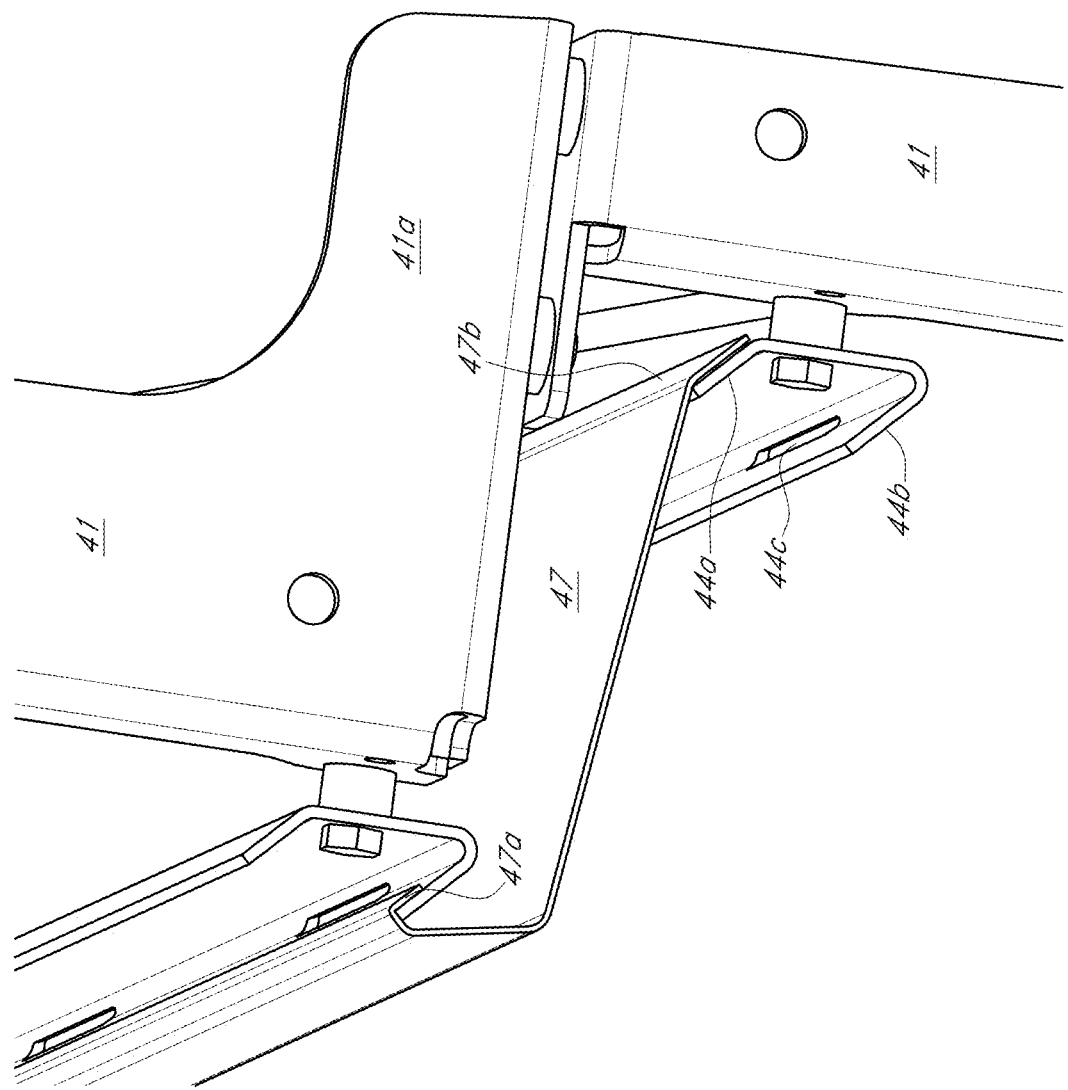
FIG. 17C provides a detailed view of a pan and two adjacent intermediate rails.

As shown in FIGS. 16 and 17B, a pan 47 may be engaged with two intermediate rails 44 on adjacent uprights 41, wherein a first upright 41 is positioned above a second upright 41. The intermediate rail 44 on the first upright 41 may be positioned adjacent the bottom thereof (e.g., by the upright base 41a). The intermediate rail 44 on the second upright 41 may be positioned adjacent the top thereof. Accordingly, the intermediate rails 44 may be both vertically and horizontally displaced from one another. The intermediate rails 44 may be configured with an upper lip 44a and a lower lip 44b to prevent and/or mitigate egress of nutrient supply from an area on the interior side of a grow board 12, 200 to an area on the exterior side thereof. However, the intermediate rails may be differently configured without limitation unless so indicated in the following claims.

Referring specifically to FIG. 17B, an aspect of the pan 47 may include a pan top lip 47a that may be configured to engage and exterior surface of the lower lip 44b of the intermediate rail 44 positioned adjacent the bottom of the first upright 41. The pan 47 may also include a pan bottom lip 47b that may be configured to engage an interior surface of the upper lip 44a of the intermediate rail 44 positioned adjacent the top of the second upright 41. Such a configuration prevents all or nearly all nutrient supply from leaking out of the interior chamber of the plant support structure 14 (i.e., from an area on the interior surface of a grow board 12, 200 to an area on the exterior side thereof).

Each intermediate rail 44 may be formed with one or more drains 44c along its length, which drains 44c may be positioned adjacent the proximal end of each lower lip 44b. This configuration, in combination with the pan 47, ensures that nutrient supply that may be positioned in an intermediate rail 44 above another grow board 12, 200 can easily pass through the drains 44c in that intermediate rail 44 and down the pan 47 and over the pan bottom lip 47b and eventually to the tray 30 without passing from the interior chamber of the plant support structure 14 to the exterior thereof, and without contacting any plants other than those for which the nutrient supply was intended. Other configurations for intermediate rails 44 and/or pans 47 may be used to mitigate nutrient supply moving from the interior of the plant support structure 14 to the exterior thereof, and/or to prevent overexposure to nutrient supply may be used without limitation unless so indicated in the following claims. Additionally, any structure and/or method designed to mitigate nutrient supply moving from the interior of the plant support structure 14 to the exterior thereof, and/or to prevent over exposure to nutrient supply may be used without limitation unless so indicated in the following claims.

As shown, the grow board 12, 200 may be engaged with the bottom lip 44b of an intermediate rail 44, such that the weight of the grow board 12, 200 may be largely supported by the intermediate rail 44. With reference to FIG. 17B, a catch (not shown) may be molded into the top edge of the grow board 12, 200 adjacent the channel shown engaged with the bottom lip 44b to prevent unwanted disengagement between the grow board 12, 200 and the intermediate rail 44. Additionally, the lateral edges of the grow board 12, 200 may be configured to overlap and/or mate with adjacent grow boards 12 (e.g., in a shingling fashion, male-to-female fit, tongue and groove, etc.) such that the likelihood of nutrient supply passing from the interior of the plant support structure 14 to the exterior between the side edges of adjacent grow boards 12 is mitigated and/or eliminated.

Figure 18:
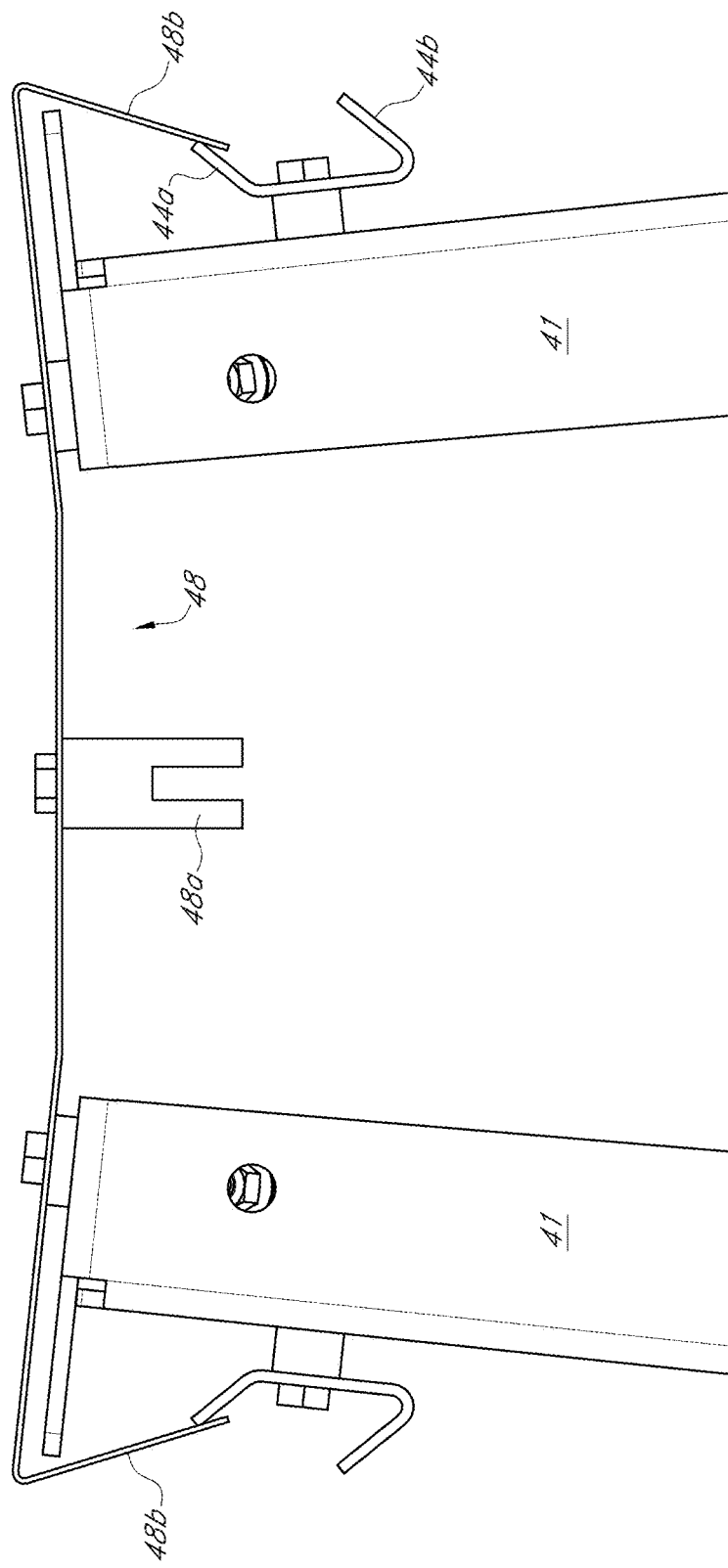
FIG. 18 provides a detailed view of various aspects of a board frame adjacent the top end thereof.

A detailed end view of various aspects of a board frame 40 near the cap 48 is shown in FIG. 18. Generally, the cap 48 may be configured to engage the top portions of two adjacent uprights 41 to as to prevent or mitigate the egress of nutrient supply from the interior of the plant support structure 14 to the exterior thereof. The cap 48 may comprise one or more wings 48*b*, which may be configured to extend downward past the top portion of an upright 41 and engage the upper lip 44*a* of the uppermost intermediate rail 44. The wing 48*b* may engage the upper lip 44*a* on the exterior surface thereof, or in another aspect the wing 48*b* may be configured to engage the upper lip 44*a* on an interior surface thereof.

In certain aspects of a nutrient delivery system 50, the nutrient delivery system 50 may include one or more masts 53 (shown for the nutrient delivery system 50 pictured in FIG. 23A) extending upward from one or more base members 56. One or more nozzles and/or nutrient supply outlets 53*a* may be positioned along the length of the mast 53. Depending on the height of a mast 53, it may be desirable to mitigate unwanted bending and/or other movement of the mast 53 at a topmost, distal end of the mast 53. In such circumstances, the cap 48 may comprise a guide 48*a* on an interior surface of the cap 48. The guide 48*a* may be configured such that the topmost, distal end of a mast 53 may slideably engage a slot formed in the guide 48*a*. In an aspect, the guide 48*a* may mitigate and/or prevent unwanted movement of the mast 53 with respect to the board frame 40 in a first direction (e.g., a direction parallel to the width of a board frame 40) and allow movement of the mast 53 with respect to the board frame 40 in a second direction (e.g., in a direction parallel to the length of a board frame 40).

Figure 20A:
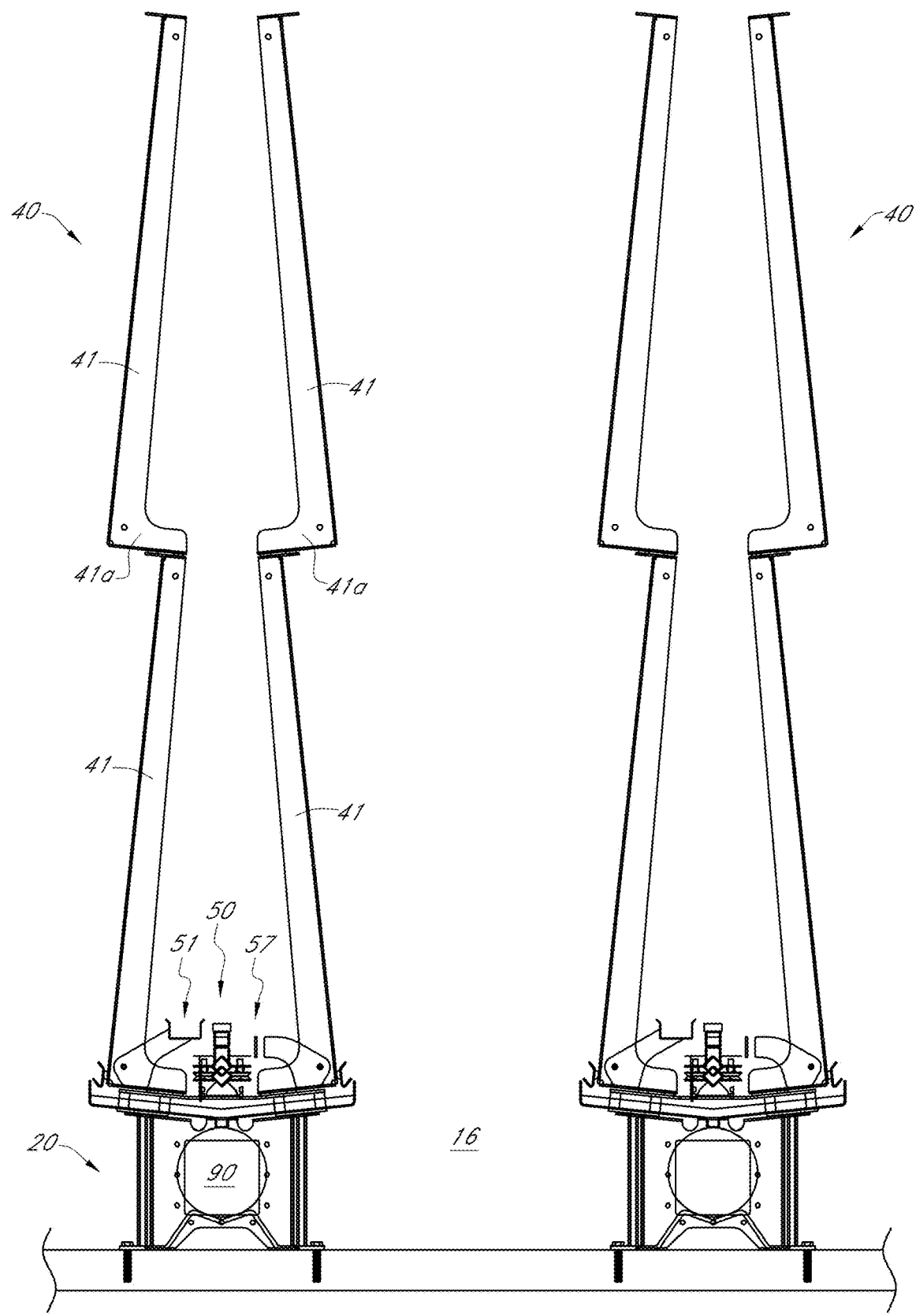
FIG. 20A provides an end view of two growing system positioned adjacent one another.
Figure 20B:
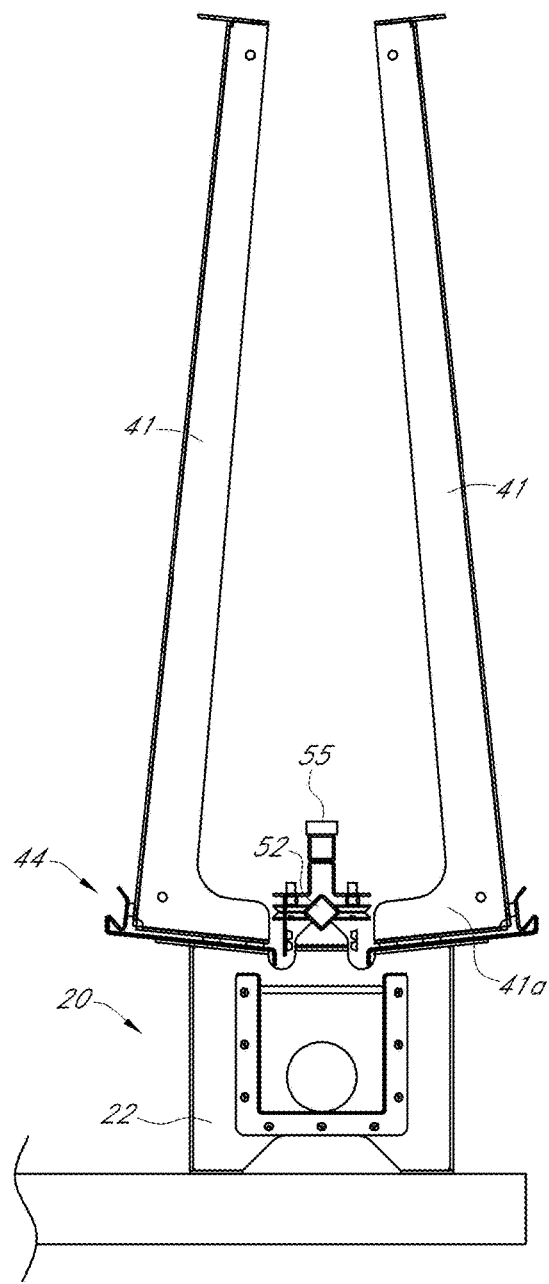
FIG. 20B provides a detailed end view of a growing system adjacent a foot of the growing system.
Figure 20C:
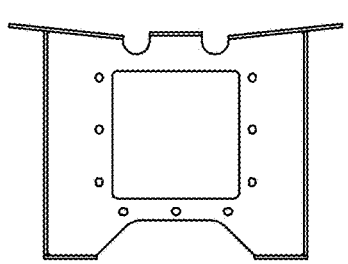
FIG. 20C provides a detailed view of a portion of the foot shown in FIG. 20B FIG. 20D provides a detailed view of another portion of the foot shown in FIGS. 20B & 20C.
Figure 20D:
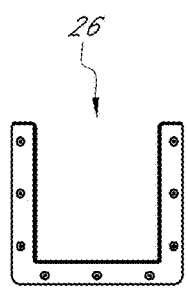
FIG. 20E provides a detailed perspective view of the foot shown in FIGS. 20B-20D.

An end view of two plant support structures 14 (and/or growing systems 10) positioned adjacent one another to form rows is shown in FIG. 20A. It is contemplated that such an arrangement may be an efficient use of floor space in a building (e.g., warehouse, greenhouse, etc.). This arrangement may allow for access between adjacent plant support structures 14 (via an aisle 16 formed between the adjacent plant support structures 14) for various tasks, including but not limited to positioning grow boards 12 on the plant support and/or removal of same, maintenance, providing light to plants, harvesting plants, and/or providing air circulation to plants. In an aspect, the top ends of adjacent uprights 41 between rows may be spaced from one another by approximately 33 inches, but in other aspects the top ends of adjacent uprights 41 may be spaced from one another by greater than 34 inches and in still other aspects the top ends of adjacent uprights 41 may be spaced from one another by less than 33 inches without limitation unless so indicated in the following claims.

Other aspects of a foot 20 and collection member 90 are shown in FIGS. 20B-20E. It is contemplated that feet 20 so configured may be positioned along the length of a plant support structure 14 in a manner similar to that shown in FIGS. 2, 6, 7, 11, 13, & 14. However, other spacing and/or configurations of feet 20 may be used without limitation unless so indicated in the following claims. The foot 20 may be formed with a base 22 having a an exterior surface that is substantially planar, and one or more feet 20 and/or bases 22 thereof may be mechanically engaged with one another via one or more lateral members 28, which is clearly shown at least in FIG. 20E. The lateral members 28 may be engaged with a foot 20 and/or base 22 via any suitable structure and/or method, including but not limited to mechanical fasteners, chemical adhesives, welding, and/or combinations thereof without limitation unless so indicated in the following claims.

One or more tabs 21 may be angled with respect to a planar exterior surface of the foot 20. The tabs 21 may be configured such that one or more upright bases 41*a* may be engaged with the foot 20 at a tab 21. The tabs 21 may also be configured such that one or more trays 30 may be engaged with the foot 20 at the tabs 21. Additionally, one or more tabs 21 may be configured such that a portion of the nutrient delivery system 50 (e.g., a channel 52 and/or a guide 52, etc.) may be engaged with one or more feet 20 via one or more tabs 21. The engagement between a foot 20 and upright 40, between a foot 20 and a tray 30, and/or between a foot 20 and/or a portion of the nutrient delivery system 50 may be via any suitable structure and/or method, including but not limited to mechanical fasteners, chemical adhesives, welding, and/or combinations thereof without limitation unless so indicated in the following claims. It an aspect, the foot 20 and/or base 22 may be integrally formed with the tabs 21, and the foot 20 and/or base 22 may be cut from a plate of material (e.g., a metallic sheet) after which the tabs 21 may be bent with respect to a planar exterior surface of the foot 20 and/or base 22. However, the scope of the present disclosure is in no way limited by the specific fabrication method used for the foot 20 and/or any other components of the plant support structure 14 and/or grow board 12, 200 unless so indicated in the following claims.

Figure 20E:
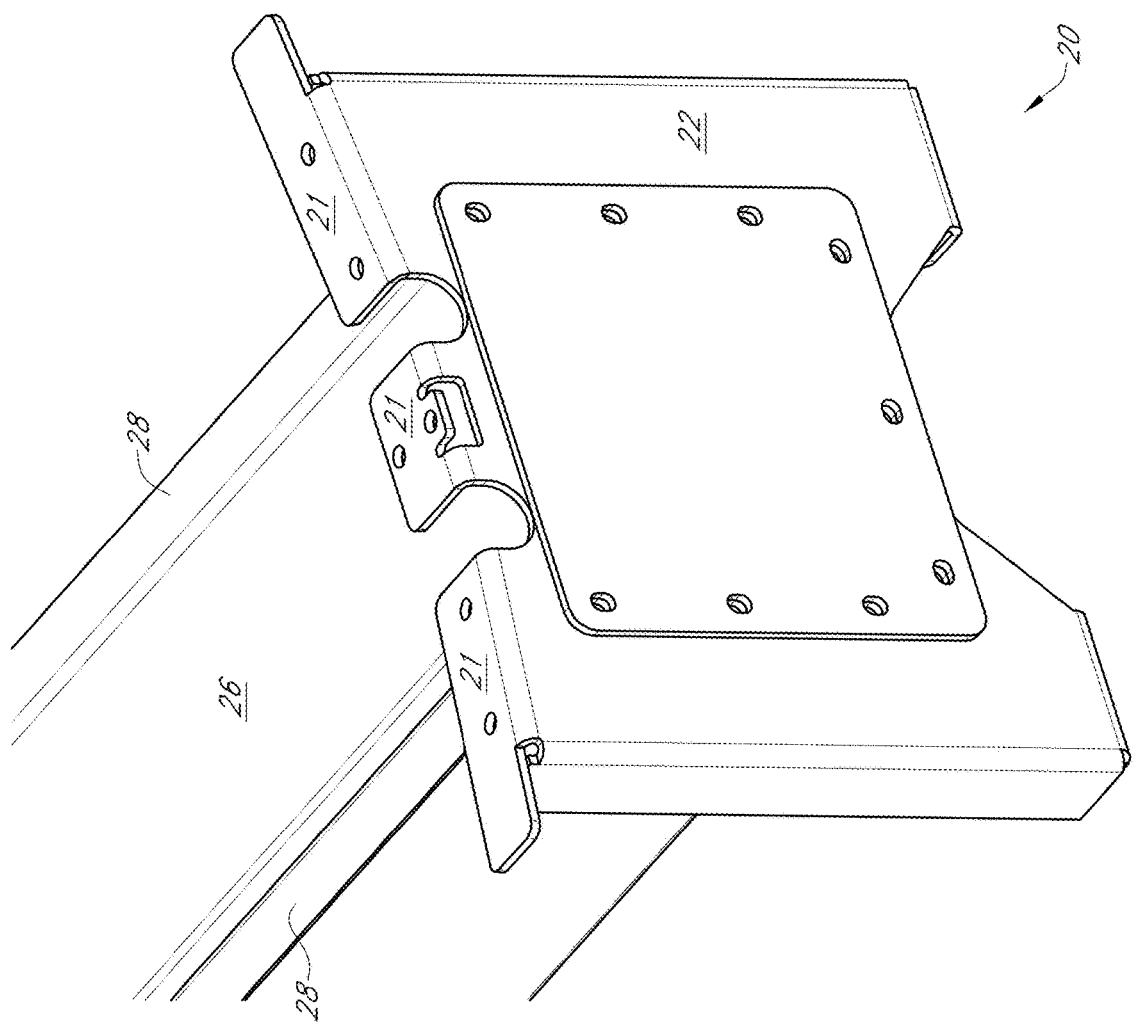

Still referring to FIG. 20E, a gutter 26 may be positioned between adjacent lateral members 28. The gutter 26 may be engaged with a first foot 20 at one end of the gutter 28 and with a second foot 20 at another end of the gutter 28. In an aspect of a gutter 28, the gutter 28 may function as a type of collection member 90 for nutrient supply as previously described herein. That is, nutrient supply that runs off the roots of plants positioned on the plant support structure 14 may drain from trays 30 into a gutter 28, from where the nutrient supply may be cleaned and/or otherwise treated and recycled to the nutrient delivery system 50. Additionally, the gutter 26 may be configured to allow a portion of a nutrient delivery system 50 to be positioned therein, which may eliminate the need for a guide 52 and/or other components of the nutrient delivery system 50. In such an aspect, one or more base members 56 may be configured with wheels thereon such that the base members 56 may move along the length of the gutter 26. One or more masts 53 may be engaged with each base member 56 as in other aspects of a growing system previously described herein.

Figure 21A:
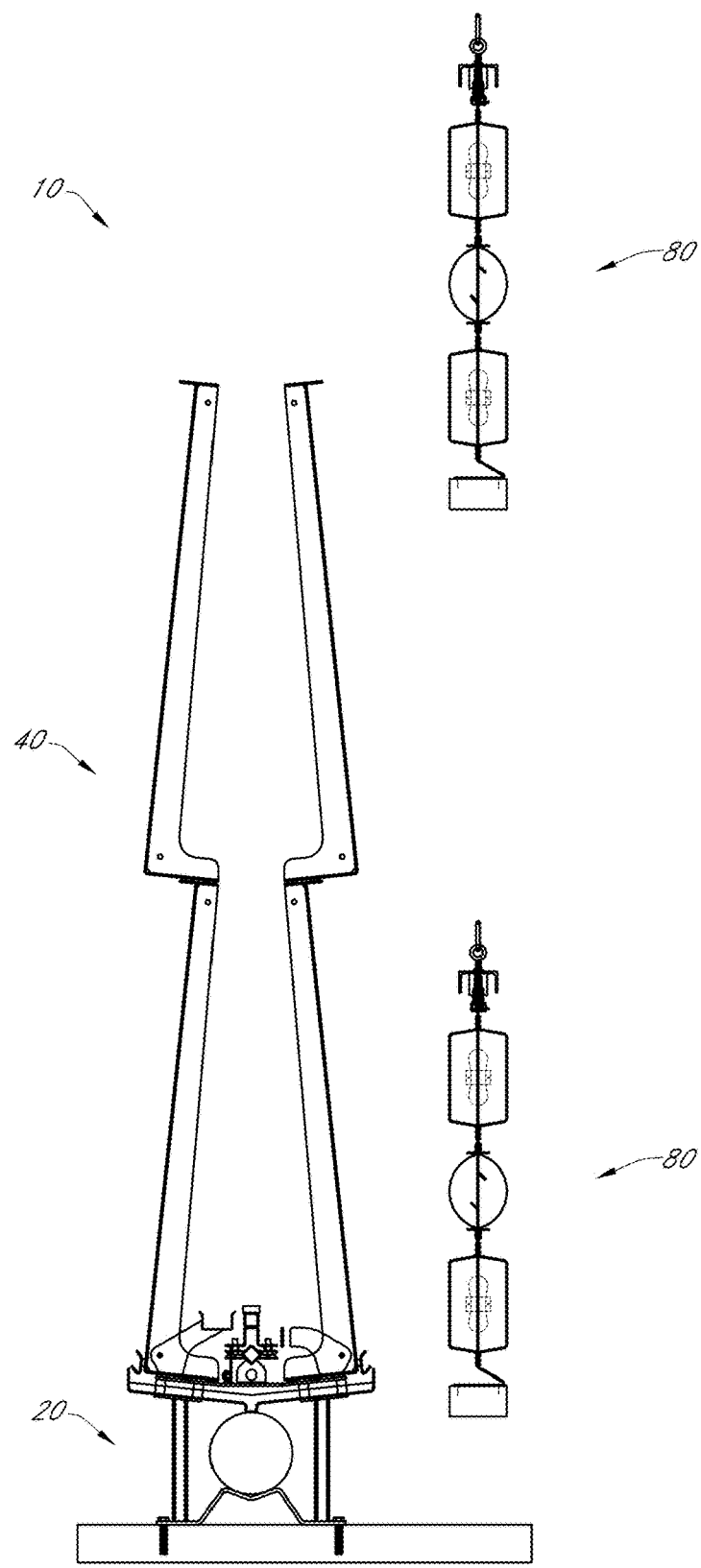
FIG. 21A provides an end view of a growing system with a light system positioned adjacent a plant support structure.
Figure 21B:
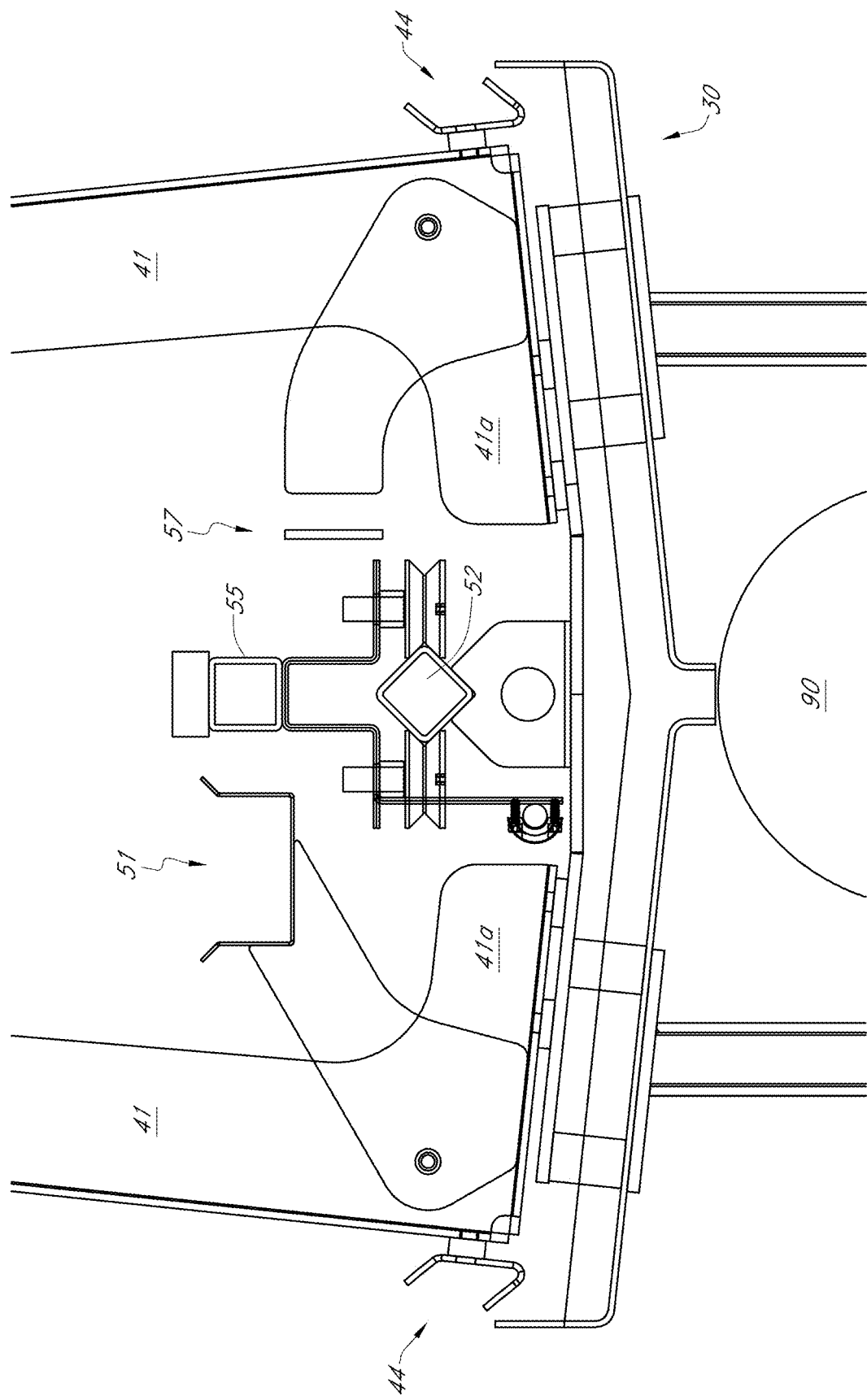
FIG. 21B provides a detailed view of a portion of the foot shown in FIG. 21A.

An end view of a growing system 10 with a vertically moveable light system 80 is shown in FIG. 21A, and FIG. 21B provides a detailed view of a portion of the growing system 10 adjacent the interface of a foot 20 and board frame 40. Referring specifically to FIG. 21A, the light system 80 is shown in an aspect of an uppermost position of the light system 80 and a lowermost position thereof. It is contemplated that moving the light system 80 to the uppermost position may provide access to aisles 16. The position of the light system 80 may be adjusted via any suitable method and/or structure without limitation unless so indicated in the following claims. In an aspect, the light system 80 may be suspended from the ceiling of a structure via one or more cables that may be connected to a rotatable rod for lowering and/or raising the light system 80. However, the scope of the present disclosure is not limited by the specific structure and/or method for moving the light system 80 unless so indicated in the following claims.

Referring now to FIG. 21B, which provides a detailed view of a portion of a growing system 10 adjacent an interface between a foot 20 and a board frame 40, a channel 51 and one or more sensors 57 may be engaged with one or more feet 20. It is contemplated that the channel 51 may be configured to support and/or otherwise engage a fluid conduit (not shown) used to provide nutrient supply to the root zone of plants positioned on the plant support structure 14 and/or other conduit required for a nutrient delivery system 50 (including but not limited to electrical wiring and/or components). Such a channel 51 may be especially useful in aspects of a nutrient delivery system 50 operating in a reciprocating and/or otherwise moveable manner. Additionally, one or more sensors 57 may be especially useful in a nutrient delivery system 50 so configured as a sensor 57 may be configured to cause a motor engaged with a portion of the nutrient delivery system 50 to reverse and/or otherwise control an aspect of the nutrient delivery system 50 and/or affect the operation thereof. Redundant sensors 57 may be positioned adjacent one another in the event of failure.

A guide 52 may be configured to have a square cross-sectional shape and may be angled as shown in FIG. 21B. In an aspect, the nutrient delivery system 50 may be configured such that one or more wheels may engage the vertices of the guide 52 oriented at the sides thereof. A coupler 55 may extend along a portion of the length of a plant support structure 14 to mechanically engage one base 56 with another base 56 as previously described for other plant support structures 14.

Figure 22A:
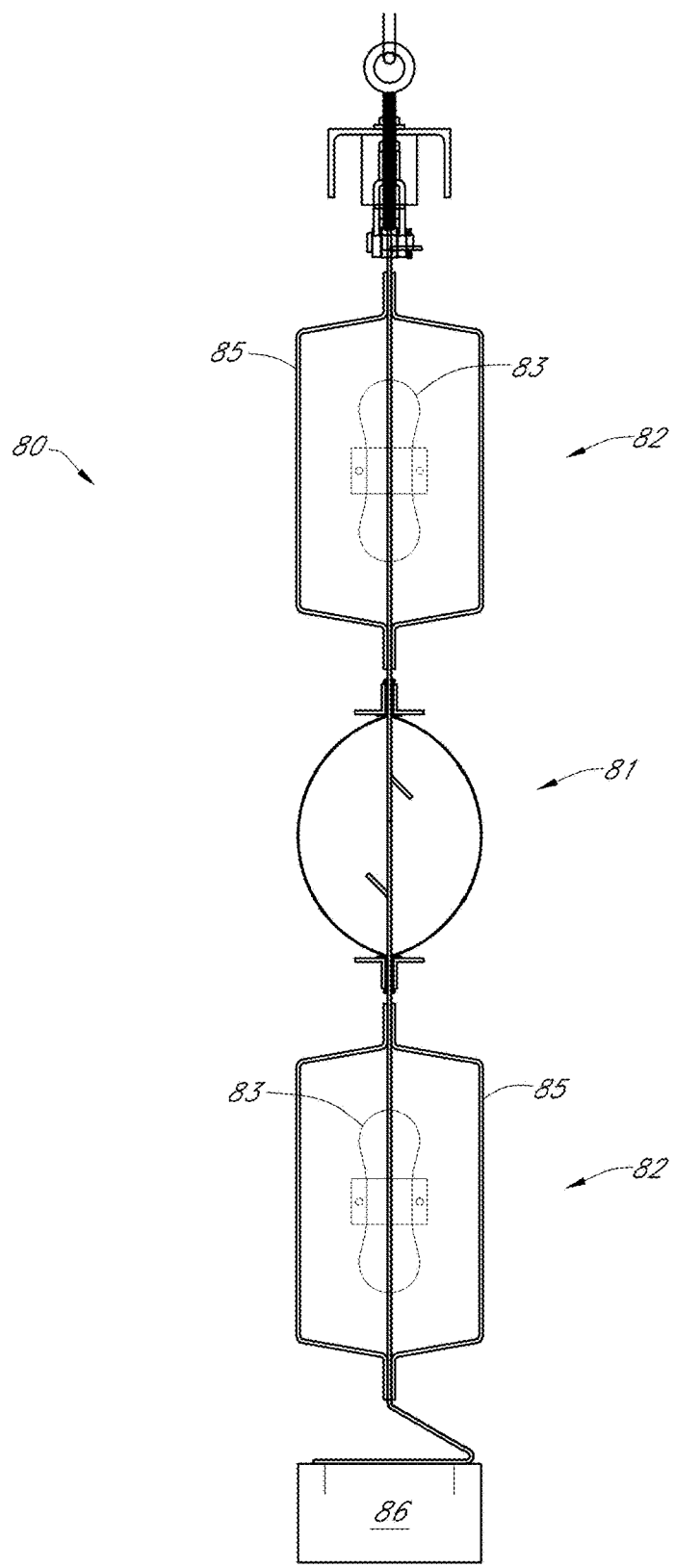
FIG. 22A provides an end view of the light system shown in FIG. 21A.
Figure 22B:
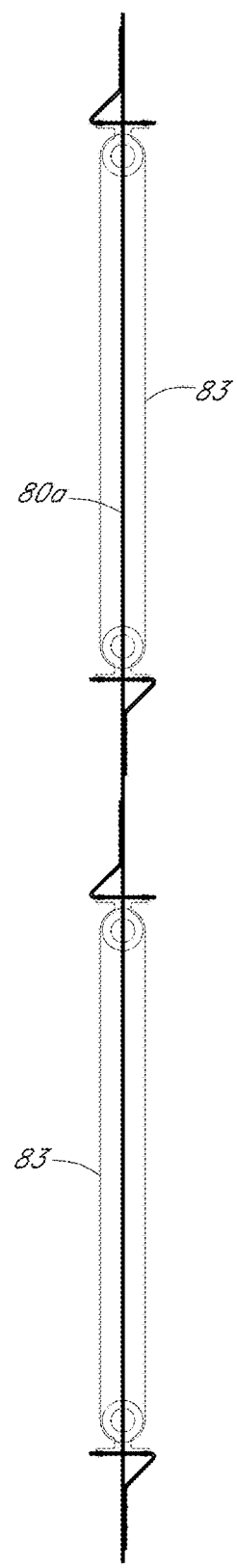
FIG. 22B provides a top view of a portion of the light system shown in FIG. 22A.
Figure 22C:
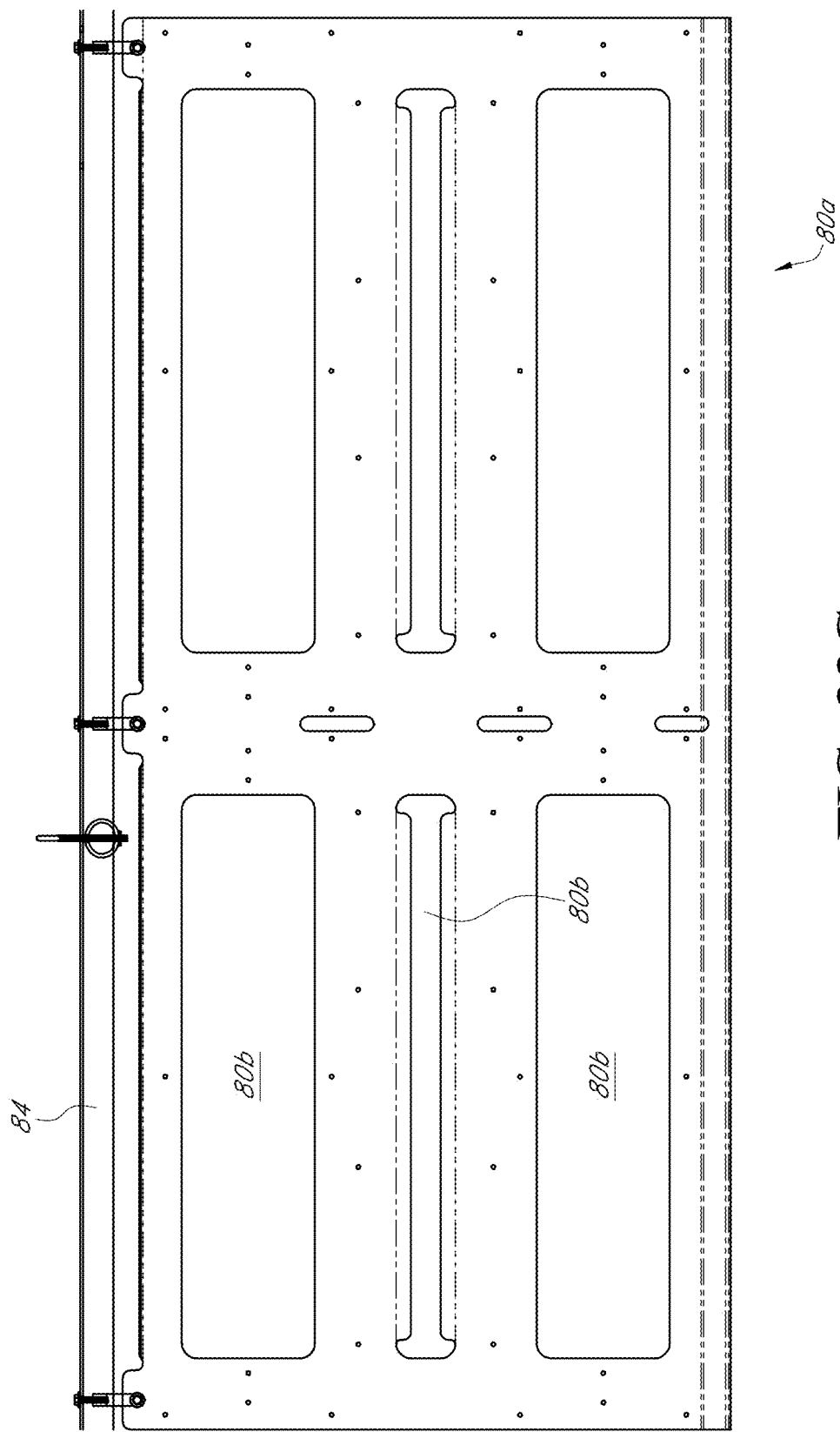
FIG. 22C provides a side view of a portion of the light system shown in FIGS. 22A & 22B.
Figure 22D:
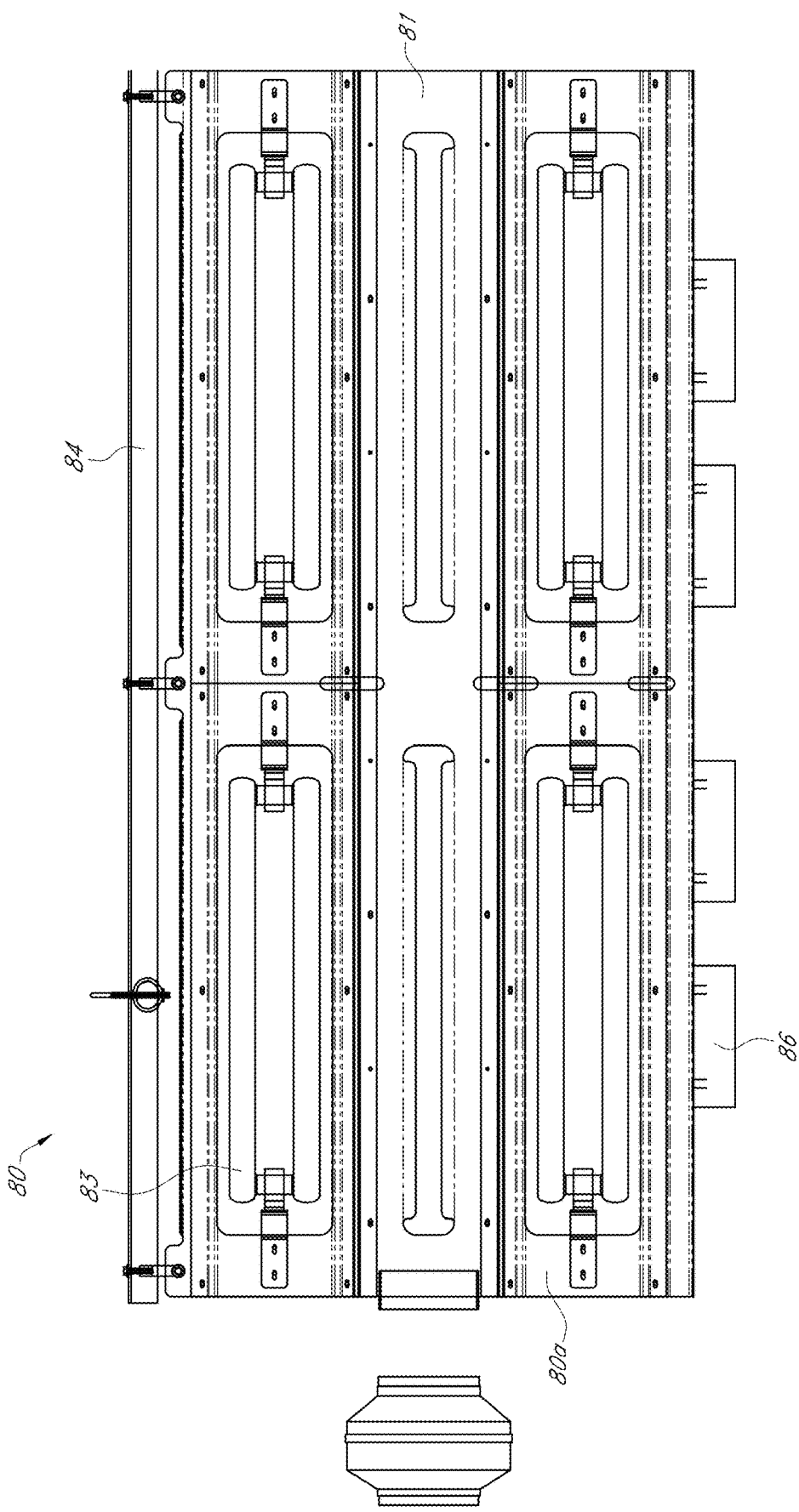
FIG. 22D provides another side view of a portion of the light system shown in FIGS. 22A-22C.
Figure 23B:
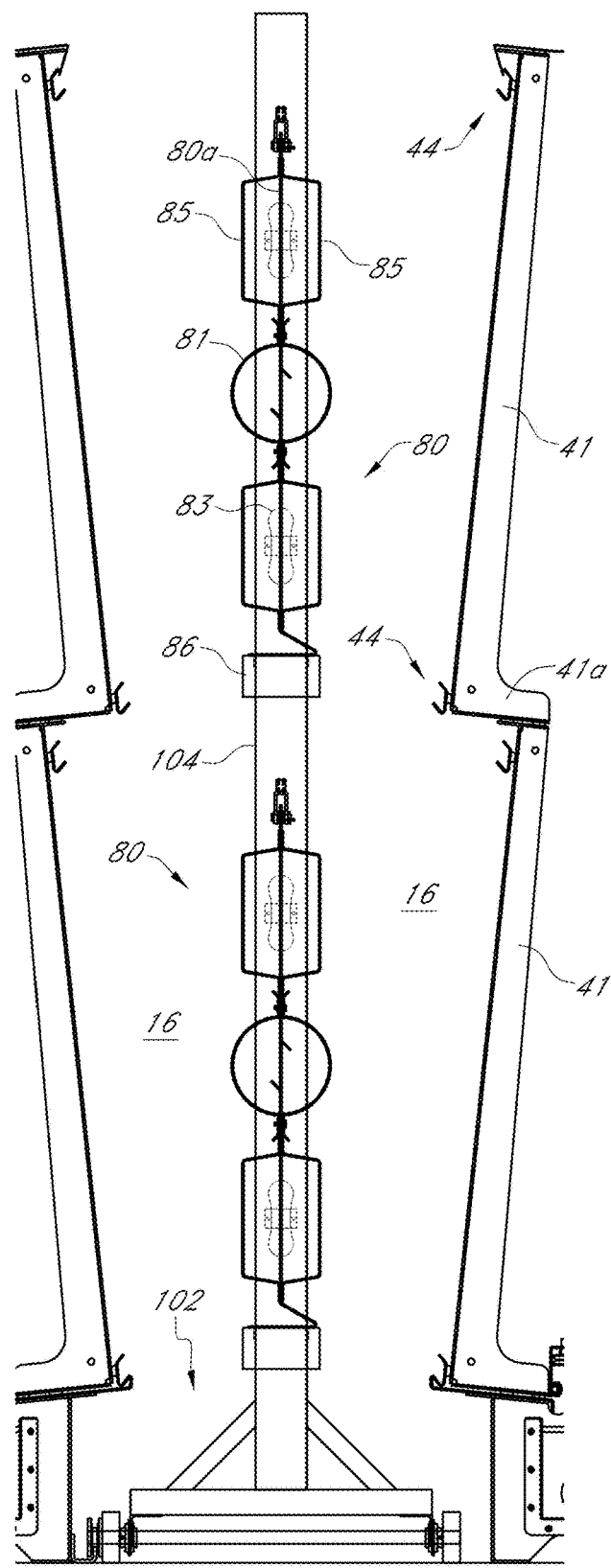
FIG. 23B provides a detailed view of one aisle and light system from FIG. 23A.
Figure 23C:
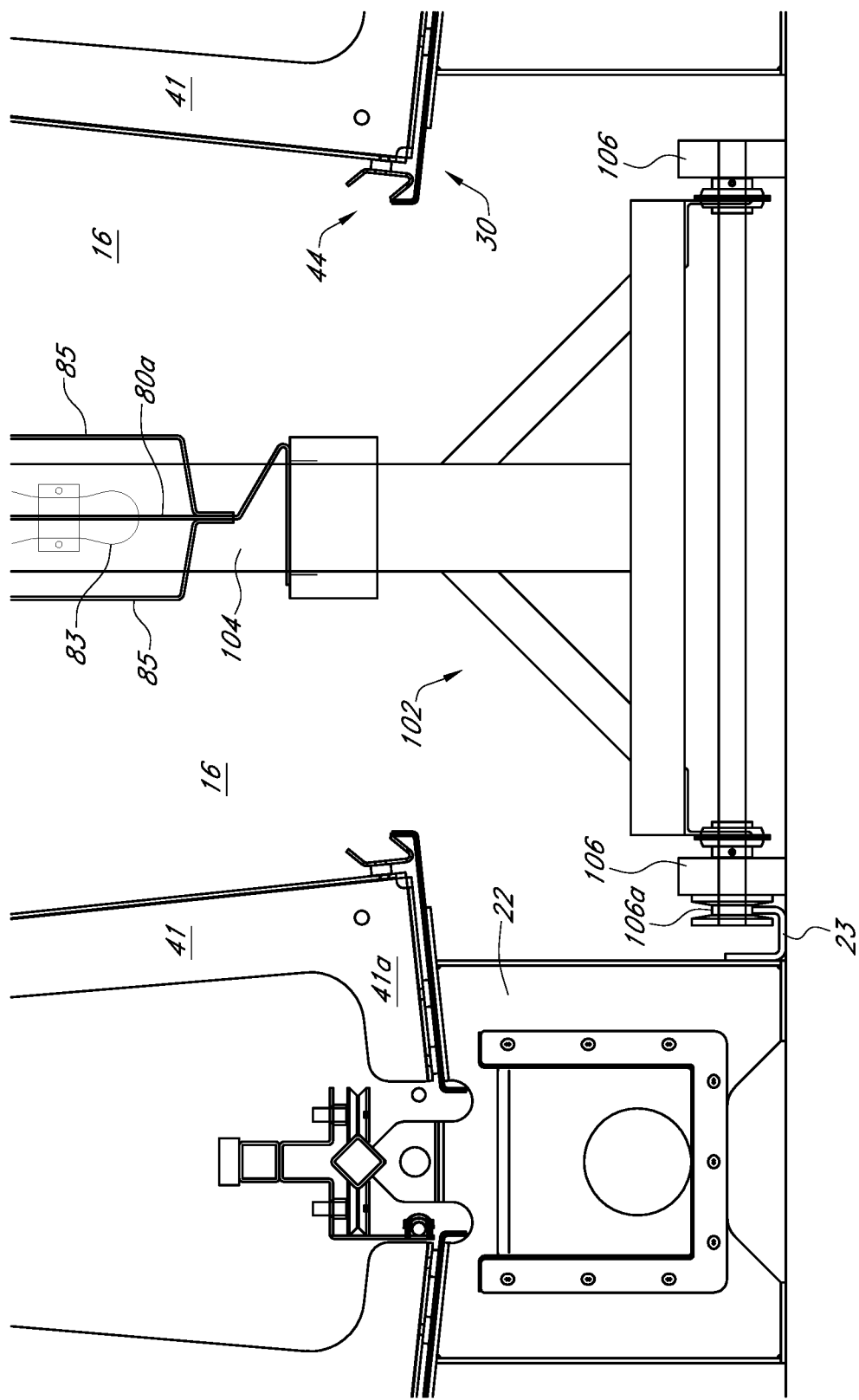
FIG. 23C provides a detailed view of a bottom portion of the aisle and light system from FIGS. 23A &23B.

A cross-sectional end view of a light system 80 employing an integrated air conduit 81 is shown in FIG. 22A and a side view thereof is shown in FIG. 22D. The air conduit 81 may be in fluid communication with a supply source (not shown) for air, carbon dioxide, and/or air having a relatively high concentration of carbon dioxide. It is contemplated that in an aspect such a supply source may be configured as an HVAC system, wherein various characteristics (including but not limited to temperature, pressure, humidity, etc.) of the air supply may be controlled. In an aspect, the light system 80 may be configured such that the air conduit 81 is flanked on the top and bottom thereof by a top panel 82 and a bottom panel 82. However, other configurations may be used in accordance with the present disclosure without limitation unless so indicated in the following claims. For example, in an aspect of a light system 80 employing one or more LED and/or metal halide light sources 83, the air conduit 81 may positioned along one or more borders of a panel 82. Each panel 82 may be configured with at least one light source 83, which light source 83 may partially or fully enclosed in a light cover 85. Electronics 86 in electrical communication with one or more light sources 83 may be positioned at the bottom of the light system 80. However, the position of the electronics 86 in communication with one or more light sources 83 in no way limits the scope of the present disclosure unless so indicated in the following claims.

A top view of the light system 80 from FIG. 22A is provided in FIG. 22B, wherein the light covers 85 and air conduit 81 have been removed for clarity. As shown, one or more light sources 83 may be engaged with a support frame 80*a*. A side view of the support frame 80*a* from the light system 80 shown in FIGS. 22A & 22B is shown in FIG. 22C. The support frame 80*a* may be configured with one or more voids 80*b* therein to accommodate one or more light sources 83 and/or to accommodate an air conduit 81 and/or portion thereof. The support frame 80*a* may be engaged with a top bar 84.

It is contemplated that a light system 80 configured such as that shown in FIGS. 22A-22D may provide light and increased air and/or carbon dioxide flow to plants positioned adjacent the light system 80. An air and/or carbon dioxide source may be fluidly engaged with the air conduit 81 such that air and/or carbon dioxide flow exits the air conduit 81 in a direction toward one or more plants positioned adjacent the light system 80 via one or more apertures formed in the air conduit 81. The optimal air and/or carbon dioxide flow characteristics (e.g., pressure, velocity, volumetric flow rate, etc.) will vary at least depending on the type of plant, and are therefore in no way limiting to the scope of the present disclosure unless so indicated in the following claims. A light system 80 so configured may be moved vertically at various intervals and/or at various times to provide equal average light and air and/or carbon dioxide flow to plants at various heights in a manner illustrated by the configuration of a plant support structure 14 and light system 80 shown in FIG. 21A.

An end view of three plant support structures 14 arranged in three rows and three light systems 80 positioned adjacent the three plant support structures 14 (two of which light systems 80 are positioned in two corresponding aisles 16) is shown in FIG. 23A. In an aspect of the growing system 10 shown in FIGS. 23A-23C, the light system 80 may be configured to move horizontally with respect to one or more plant support structures 14 within an aisle 16. Such a configuration may be especially useful in growing systems 10 having plant support structures 14 configured to have a relatively large height (e.g., including but not limited to plant support structures 14 having more than two tiers of uprights 41).

The light system 80 may be engaged with a trolley 100, wherein the trolley may comprise a trolley upright 104 and a trolley base 102, which trolley is greater detail in FIGS. 23B & 23C. The trolley upright 104 may extend upward from the trolley base 102. The trolley base 102 may be configured to move across a flooring structure via one or more trolley wheels 106. One of the trolley wheels 106 may be engaged with a track wheel 106*a*. A track 23 may be engaged with one or more feet 20 along a length of the plant support structure 14. The track wheel 106*a* may engage a portion of the track 23 such that the trolley 100 (and consequently the light system 80) is prevented from moving laterally within an aisle 16 but is allowed to move along the length thereof. Other structures and/or methods may be used to prevent unwanted movement of a trolley 100 and/or light system 80 with respect to a plant support structure 14 without limitation unless so indicated in the following claims.

The light system 80 may be engaged with the trolley 100 at the trolley upright 104. A trolley upright 104 may be configured as a vertical beam, wherein one trolley upright 104 may be positioned on either side of a light system 80. The light system 80 may comprise an integrated air conduit 81 as previously described for other aspects of a growing system 10. It is contemplated that a light system 80 configured such as that shown in FIGS. 23A-23C may provide light and increased air and/or carbon dioxide flow to plants positioned adjacent the light system 80. An air and/or carbon dioxide source may be fluidly engaged with the air conduit 81 such that air and/or carbon dioxide flow exits the air conduit 81 in a direction toward one or more plants positioned adjacent the light system 80 via one or more apertures formed in the air conduit 81. The optimal air and/or carbon dioxide flow characteristics (e.g., pressure, velocity, volumetric flow rate, etc.) will vary at least depending on the type of plant, and are therefore in no way limiting to the scope of the present disclosure unless so indicated in the following claims. A light system 80 so configured may be moved horizontally at various intervals and/or at various times to provide equal average light and air and/or carbon dioxide flow to plants at various positions along the length of the plant support structure 14. In this manner, the length of the trolley 100 and/or light system 80 need not be equal to the length of the plant support structure 14. It is contemplated that the length of the trolley 100 and/or light system 80 may be less than that of the plant support structure 14, and further contemplated that in some applications the length of the trolley 100 and/or light system 80 may be equal to half that of the plant support structure 14. However, the scope of the present disclosure is in no way limited by the ratio of the length of the trolley 100 and/or light system 80 with respect to the plant support structure 14 unless so indicated in the following claims.

It should be noted that the various growing systems 10, plant support structures 14, and/or board frames 40 disclosed herein may be configured for use with modular grow boards 12. That is, as previously stated, the growing system 10, plant support structure 14, and/or board frame 40 may be configured such that a plurality of grow boards 12 may be simultaneously engaged with the board frame 40. Without limitation, the specific grow board 12, 200 used with any embodiment of a growing system 10 may be any suitable grow board 12, 200 for the particular application of the growing system 10, including but not limited to those disclosed in U.S. patent application Ser. No. 14/752,462 unless otherwise indicated in the following claims.

Figure 24A:
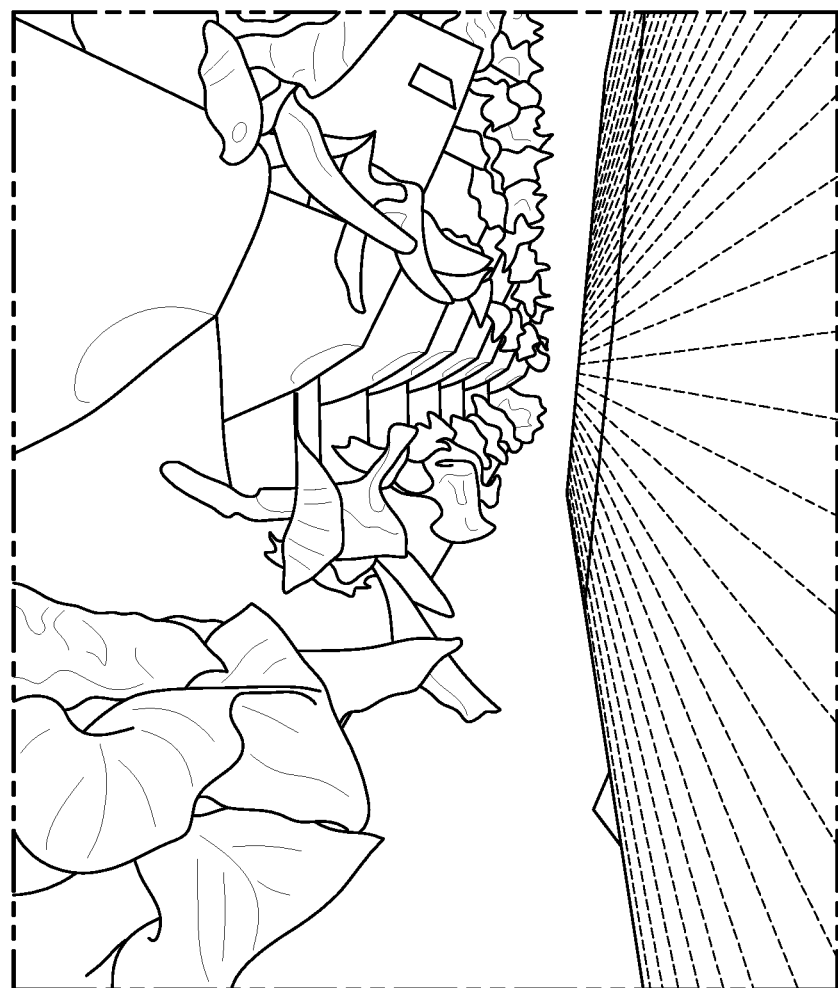
FIGS. 24A & 24B provide a view of a telescoping light fixture that may allow for a variable distance in the horizontal and/or vertical dimension between the light fixture and an adjacent plant, grow board, and/or support structure.
Figure 24B:
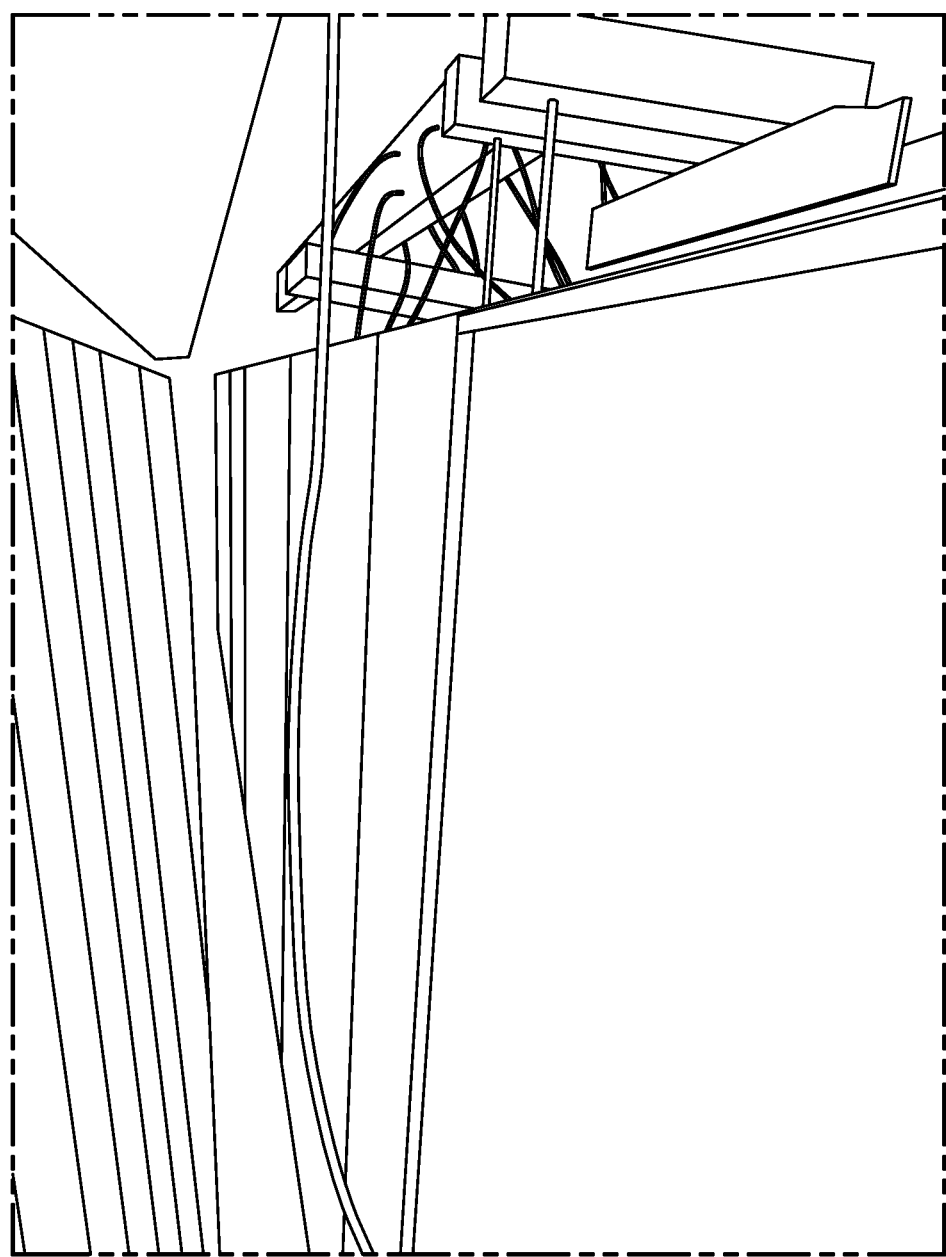
Figure 25:
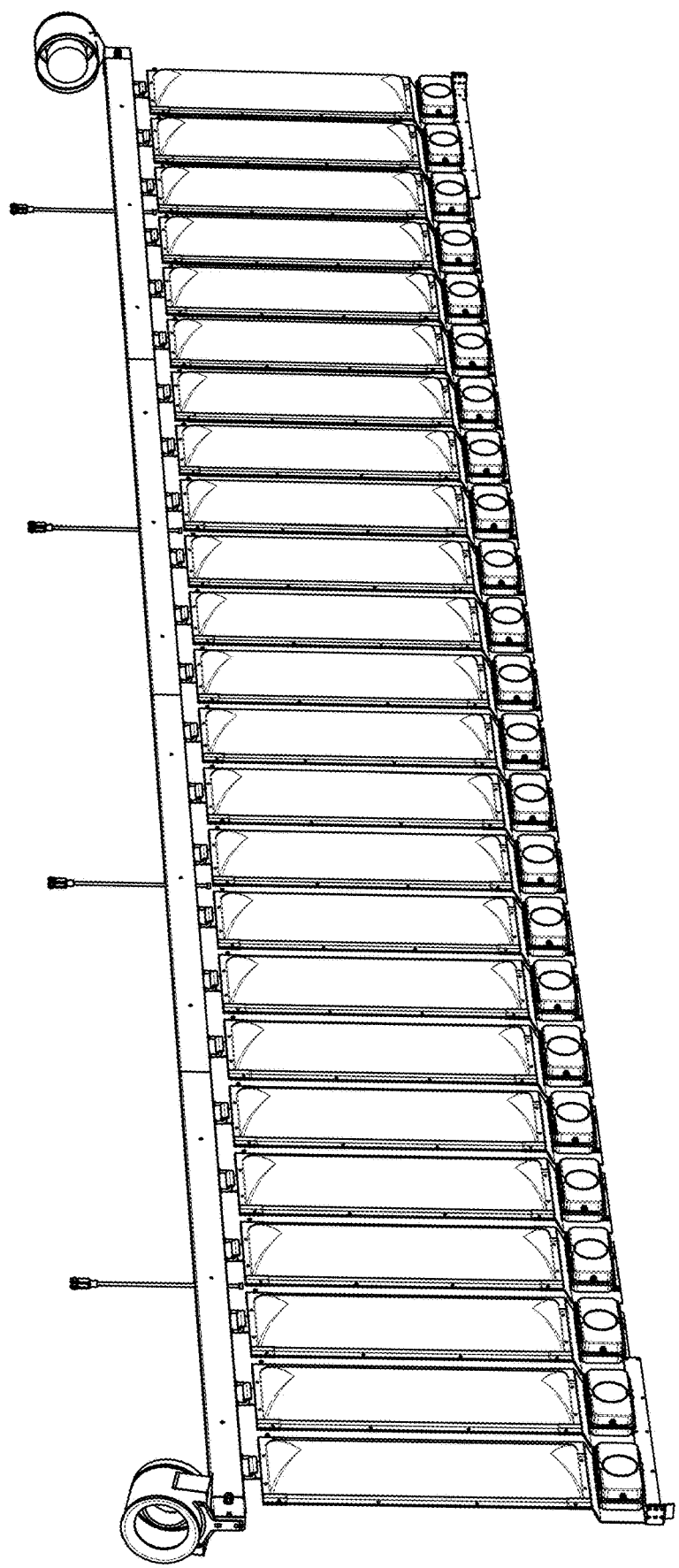
FIG. 25 provides a side schematic view of another embodiment of a light fixture that may be used with the present disclosure.

Referring now to FIGS. 24A & 24B, as the plants mature, it may be beneficial to ensure the distance between the light system 80 and the plants is constant or relatively constant, which may prevent burning and/or discoloring of the plant leaves. Accordingly, the light system 80 as shown in FIGS. 24A & 24B is configured to expand and contract in the horizontal dimension. This light system 80 may be configured to expand and contract and/or move in the horizontal dimension. The ability to expend and contract the light system 80 in the horizontal dimension may be accomplished via one or more telescoping mechanisms positioned between two adjacent LED panels 82, wherein each of the LED panels 82 may be configured with a plurality of LEDs (each of which may serve as a light source 83) emitting light in a direction away from the panel 82. In one application, each LED may be a 0.35 W LED. Extending the telescoping mechanism may increase the distance between the LED panels 82 (thereby decreasing the distance between either LED panel 82 and the associated plants) and retracting the telescoping mechanism may decrease the distance between the LED panels 82 (thereby increasing the distance between either LED panel 82 and the associated plants). Although telescoping mechanisms for varying these distance are disclosed and discussed herein, the scope of the present disclosure is not so limited unless otherwise indicated in the following claims, and may extend to any suitable structure and/or method for varying these distances in a controllable manner, such as rails and slides, screws, wheels and tracks, etc.

Due to the inverse square law, positioning a light system 80 in close proximity to a plant increases intensity and accelerates the growth rate of the plants. The ability to expand and contract the light system 80 both improves the quality of the plant and allows optimal light levels to be managed throughout the life cycle of the plant to ensure no leaves are burned.

One of the objects of this telescoping light system 80 is to provide a lighting system 80 at is adapted to be supported between floor and ceiling surfaces, wherein the lighting system 80 is situated between adjacent vertical grow boards.

Another object of this telescoping light system 80 is to provide a two-sided light system 80 wherein light is emitted from both sides of a panel 82 when covered with LED film, wherein one side of the panel 80 emits light outward therefrom in the opposite direction of the adjacent side of the panel 82.

Another object of this telescoping light fixture is to provide a lighting system 80 that may expand and contract moving the light source 83 on either side of the panel 82 closer or further away from the plants associated with that side of the panel 82.

Another object of the invention is that the top of the fixture may be wider than the bottom of the fixture to allow the panels to provide uniform light cover to a-frame plant stands.

Another object of this telescoping light system 80 is to provide a light system 80 supported between two vertical surfaces, wherein the light system 80 is electrically connected to controls that allow a user to move the light system 80 vertically.

Another object of this telescoping light system 80 is it have an air conduit 81 incorporated into or engaged with the light system 80 where one or more fans may be positioned on either end of the air conduit 81 and may be configured to provide an air flow to plants adjacent the light fixture 80. The air conduit 81 may have a plurality of apertures therein to allow air from an internal portion of the air conduit 81 to reach the plants.

In another aspect of a telescoping light system 80, fans (oscillating or stationary), blowers, or other air-handling devices may be engaged with the light fixture 80 or other structural component associated with the growing system 10 to provide directed airflow. In one application, the fan, blower, or other air handling device may be configured to direct airflow to a plurality of rows of plants and may use on or more fluid conduits configured as socks, ducts, or other structures.

Figure 26:
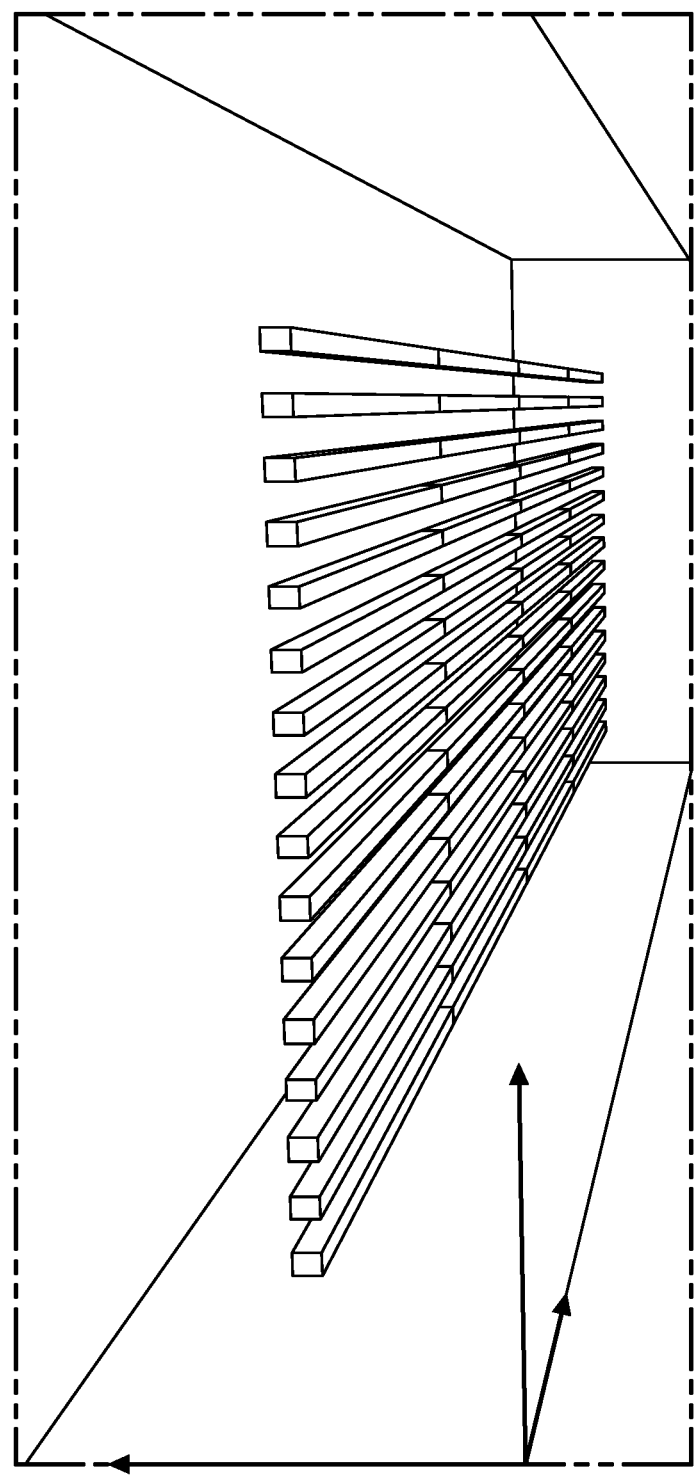
FIG. 26 provide a view of a collapsing light fixture that may allow for improved light distribution, transmission and access to an adjacent plant, grow board, and/or support structure.

Referring now to FIG. 26, which provides another illustrative embodiment of an LED light system 80, the LED light system 80 show therein may be referred to as an inter-lighting design, wherein the light system 80 may be comprised of multiple light bars or segments. When in the retracted position, the light bars may be collapsed upon each other thereby reducing the overall vertical height of the light system 80 and providing additional access to adjacent plants, grow board 12, 200, and/or plant support structure 14. When in the extended position, the light bars may be moved away from one another (as shown in FIG. 26) for deployment to extend the area to which the light system 80 may provide light.

In another aspect, in the extended position, the user may control how many and which specific lights bars or segments are extended for coverage, thereby allowing variable deployment of the light system 80 from the aisle 16 to an adjacent plant, grow board 12, 200, and/or plant support structure 14 for a preference to improved light distribution and transmission to an adjacent plant, grow board 12, 200, and/or plant support structure 14.

Figure 27:
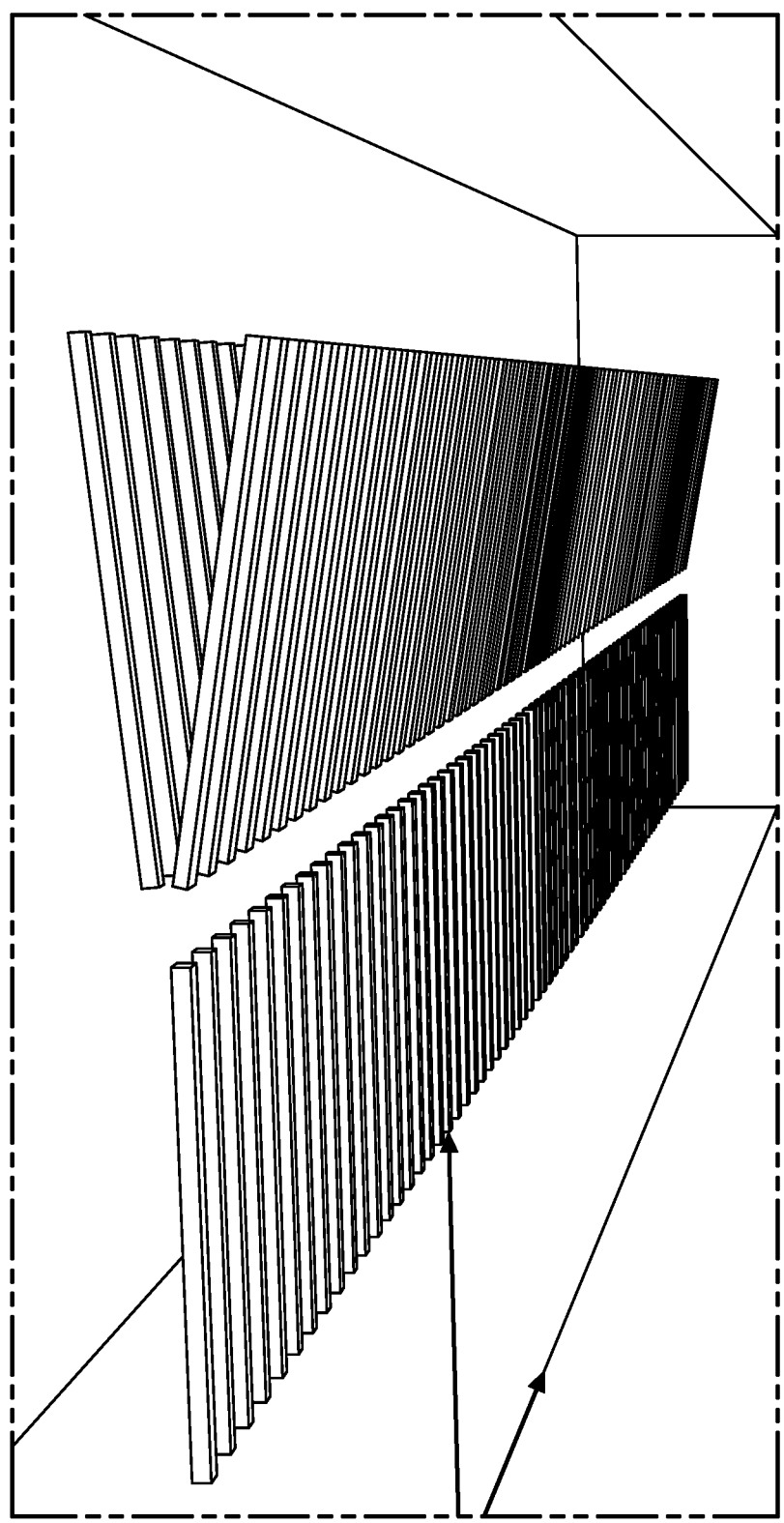
FIG. 27 illustrates a "Y" type configuration of a light fixture that may allow for improved light distribution, transmission and access to an adjacent plant, grow board, and/or support structure.

Another illustrative embodiment of an LED light system 80 is shown in FIG. 27. This illustrative embodiment may be configured as a Y-shaped light system 80. This light system 80 may allow for improved light distribution, transmission, and access to an adjacent plant, grow board 12, 200, and/or plant support structure 14. As shown in FIG. 27 the light bars or segments may be deployed in a Y-shaped arrangement wherein the telescope design may be vertically mounted with offsetting light bars. That is, the lower portion of the light system 80 shown in FIG. 27 may be raised and retracted into the upper portion, and/or the individual light bars or segments may be collapsible in the horizontal dimension. Additionally, angle between the upper arms may be varied as needed for a particular growing system 10 application or method. Generally, it is contemplated that this configuration of a light system 80 may be especially advantageous for use with angled board frames 40 such as those described herein because the distance between the light source 83 and the adjacent plants may be relatively constant along the height of the light system 80.

Figure 28A:
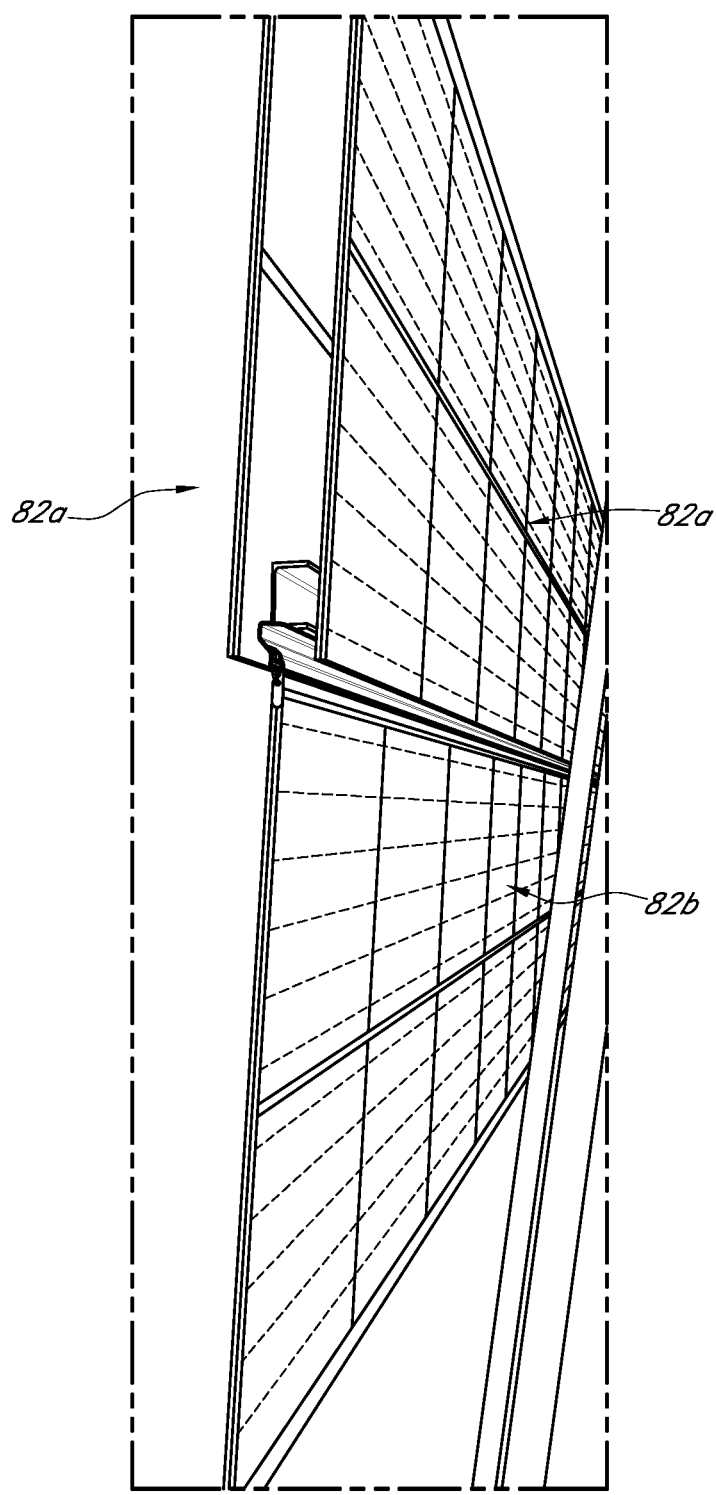
FIG. 28A is a perspective view of another light fixture that may be used with a growing system.
Figure 28B:
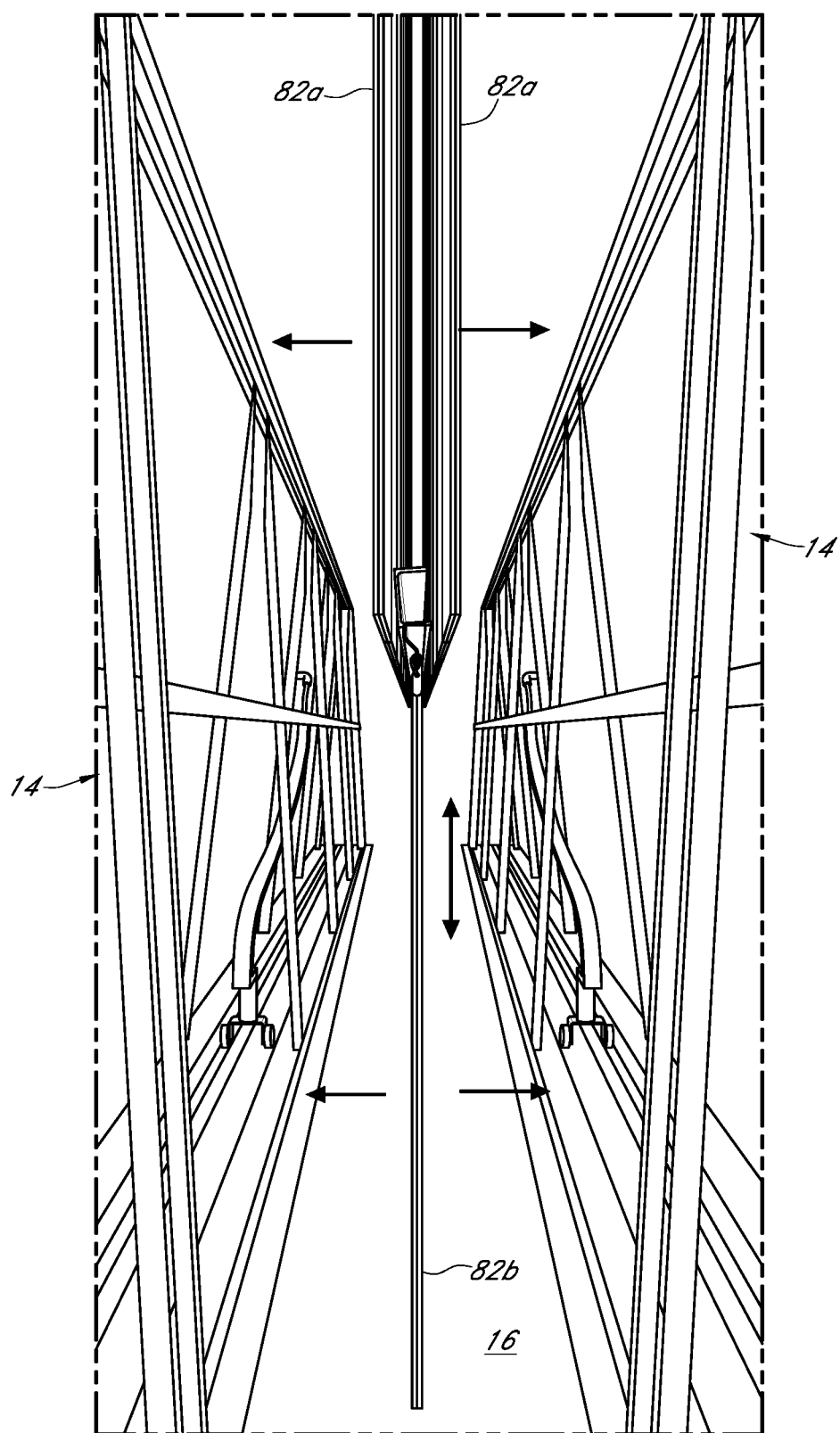
FIG. 28B is a side view of another light fixture shown in FIG. 28A.

Another embodiment of a light system 80 that may be used with a growing system 10 as disclosed herein is shown in FIGS. 28A & 28B. It is contemplated that this light system 80 may be positioned between two adjacent plant support structures 14 within an aisle 16 therebetween as previously described for other light systems 80 in detail above, but the scope of the present disclosure is not so limited unless otherwise indicated in the following claims. Additionally, it is contemplated that this embodiment of a light system 80 may be suspended from one or more light supports 60 extending from and/or engaged with one or more plant support structures 14 and/or board frames 40, which may be accomplished in a manner and/or utilizing structures identical to or similar to those shown in FIGS. 1-4 previously described above. However, any suitable mounting methods and/or structures may be used with the light system 80 without limitation unless otherwise indicated in the following claims, and other such methods and structures as described in further detail below.

Another illustrative embodiment of an LED light system 80 is shown in FIGS. 28A & 28B. In the embodiment shown in FIGS. 28A & 28B, the light system 80 may be comprised of two upper panels 82a laterally spaced apart from one another by a predetermined distance. The distance between the two upper panels 82a may be such that a lower panel 82b may be positioned in the space between the two upper panels 82a as described in further detail below. A plurality of LEDs may be positioned on the exterior surface of each upper panel 82a such that each upper panel 82a may be configured to provide light to one or more plants positioned on or engaged with the plant support structure 14 opposed to the exterior surface of the upper panel 82a. The is, the light may be emitted from each upper panel 82a as shown by the horizontal arrows in FIG. 28B.

The lower panel 82b may be configured with a plurality of LEDs on each side thereof, such that a single lower panel 82b may provide light to one or more plants positioned on or engaged with a plant support structure 14 positioned on either side of the lower panel 82b. The lower panel 82b may be suspended from the upper panel 82a such that when the upper panel 82a is moved vertically (as shown by the double-ended arrow adjacent the lower panel 82b in FIG. 28B), the lower panel 82b may move vertically by the same amount and in the same direction. However, the scope of the present disclosure is not so limited unless otherwise indicated in the following claims. The lower panel 82b may also be moveable in the vertical dimension with respect to the two upper panels 82a, such that the lower panel 82b may be retracted upward into the space between the two upper panels 82a when desired, and such that the lower panel 82b may be extended downward out of the space between the two upper panels 82a when desired (which is the position shown in FIGS. 28A & 28B). This configuration may allow for the combined height of the upper panel 82a and lower panel 82b, when the lower panel 82b is extended from the two upper panels 82a, to equal or approximate the height of the plant support structure 14 and/or board frame 40 that is populated with plants (i.e., the total height of the grow boards 12 engaged with the board frame 40). That is, the light system 80 shown in FIGS. 28A & 28B may provide light to the entire canopy of plants positioned on two opposing plant support structures 14 and/or board frames 40 when the light system 80 is positioned within an aisle 16 between those opposing plant support structures 14 and/or board frames 40.

When access to the aisle 16 is desired, the upper panels 82a may move upward and the lower panel 82b may move upward into the space between the two upper panels 82a. It is contemplated that the lower panel 82b may move upward with respect to the upper panels 82a such that the bottom edge of the lower panel 82b is approximately flush with the bottom edge of the two upper panels 82a. However, other configurations may be used with the light system 80 without limitation unless so indicated in the following claims.

Figure 29A:
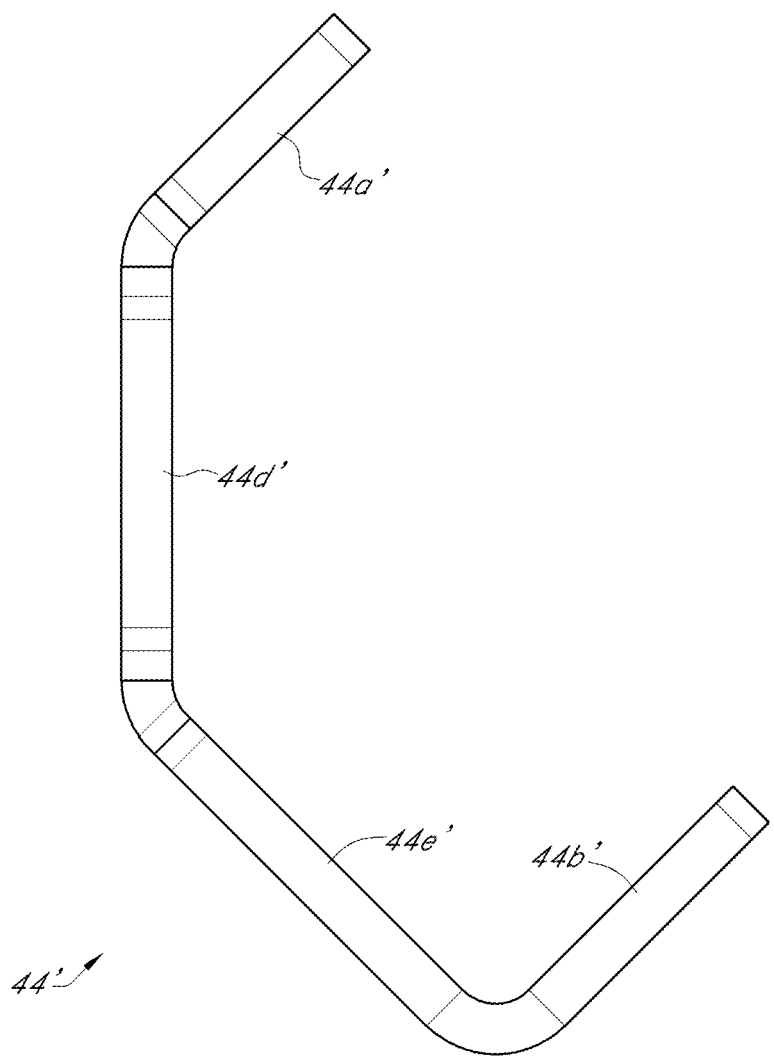
FIG. 29A is a side view of another embodiment of an intermediate rail that may be used with the present disclosure.
Figure 30:
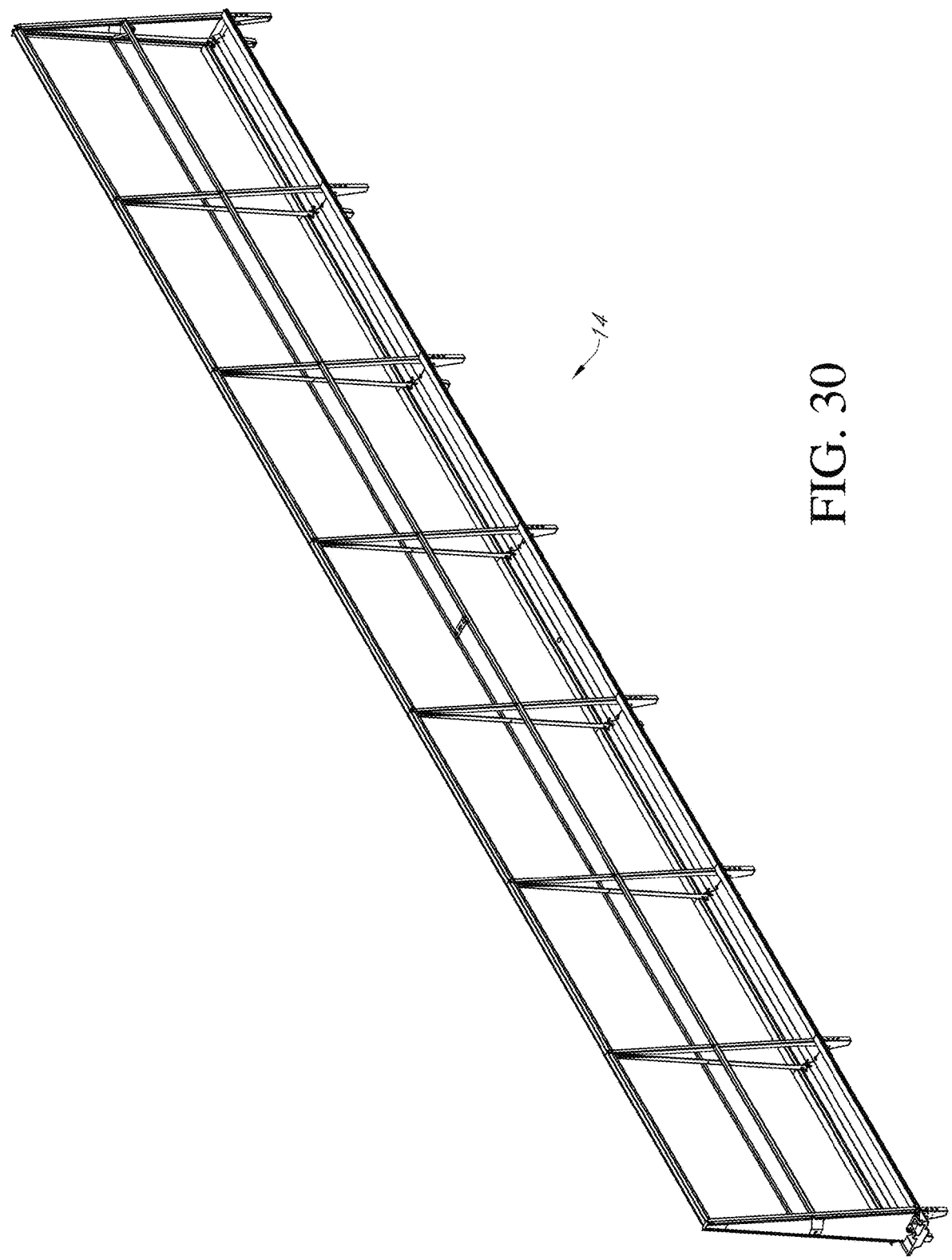
FIG. 30 is a perspective view of another illustrative embodiment of a plant support structure.

Referring now to FIGS. 29A & 29B, another embodiment of an intermediate rail 44' is therein. As shown, this embodiment of an intermediate rail 44' may generally be used in a manner identical to or similar to that as previously described for other intermediate rails 44' disclosed herein unless otherwise indicated in the following claims. The intermediate rail 44' may be formed with both an upper lip 44a' and a lower lip 44b as well as at least one drain 44c'.

The lips 44a', 44b' may be configured such that nutrient supply directed toward the interior surface of a grow board 12, 200 does not reach the exterior surface of the grow board 12, 200, or such that a reduced portion of the nutrient supply reaches the exterior surface of the grow board 12, 200. In an aspect of such a configuration, the upper lip 44a' may extend beyond the lower edge of a grow board 12, 200 positioned adjacent the upper lip 44a' and the lower lip 44b' may be configured such that a flap on the upper edge of a grow board 12, 200 positioned adjacent the lower lip 44b' fits over a portion of the lower lip 44b'. This configuration may allow the grow board 12, 200 to be at least partially supported by the lower lip 44b' via the engagement between the lower lip 44b' and the upper edge of a grow board 12, 200 (e.g., the grow board 12, 200 may hang from the lower lip 44b' and a bottom portion of the grow board 12, 200 may rest against the upper lip 44a'). However, any suitable structure and/or method designed to mitigate and/or prevent nutrient supply from passing from the interior surface of a grow board 12, 200 to the exterior surface thereof may be used with the growing system 10 without limitation unless so indicated in the following claims, as may any suitable structure and/or method designed to support one or more grow boards 12.

Referring now to FIG. 29A, which provides a scale view of one embodiment of an intermediate rail 44' showing various dimensions thereof, but which dimensions are not limiting unless otherwise indicated in the following claims, the upper lip 44a' may extend outward from a vertical portion 44d', and the vertical portion 44d' may be engaged with an angled portion 44e'. A lower lip 44b' may extend outward from the angled portion 44e' such that the upper lip 44a' and lower lip 44b' are parallel or approximately parallel.

Generally, the angled portion 44e' may allow the nutrient supply to reach areas of the grow board 12, 200 adjacent the intermediate rail 44' without restriction. Referring now to FIG. 29B, therein is shown a perspective view of a first embodiment of the intermediate rail 44 shown transparent with the second embodiment of the intermediate rail 44' superimposed thereon, wherein the intermediate rails 44, 44' are engaged with one or more uprights 41 of a board frame 40, and a grow board 12, 200 is engaged with the intermediate rails 44, 44'.

As can be seen most starkly in FIG. 29B, the angled portion 44e' of the second illustrative embodiment of the intermediate rail 44' allows for a clear path from the nutrient supply outlet 53a (not shown in FIG. 29B, but which would be generally on the left side of the drawing) to the root portion of the plant engaged with the grow board 12, 200. By contrast, the first embodiment of the intermediate rail 44 may restrict some nutrient supply because the bottom-most portion thereof may extend downward further than the bottom-most portion of the second embodiment of the intermediate rail 44', Additional Illustrative Embodiments of a Growing System Various elements and/or aspects of another growing system 10 that may be used in a controlled environment are shown in FIGS. 30-37. Generally, the growing system 10 shown in FIGS. 30-37 may be used in a manner analogous to the manner as previously described for other growing systems 10 disclosed herein without limitation unless otherwise indicated in the following claims. Additionally, features, benefits, advantages, and/or functionality from various growing systems 10 and/or components thereof may be transferred or adapted to other illustrative embodiments of growing systems 10 without limitation unless otherwise indicated in the following claims.

Another illustrative embodiment of a plant support structure 14 and a board frame 40 is shown in FIGS. 30-33B. The board frame 40 may be supported and elevated from a ground or flooring surface via a plurality of feet 20 engaged with the board frame 40 at various positions thereof along the length of the board frame 40 as shown at least in FIG. 30. The feet 20 may also be configured to support a tray 30 such that the tray 30 may be elevated from a floor surface. Those of ordinary skill in the art may appreciate the various analogous elements and structural members in the board frame 40 shown in FIGS. 30-33B to the plant support structures 14 previously described herein above.

Generally, the board frame 40 may be comprised of two uprights 41 angled with respect to one another and with respect to the vertical dimension. Generally, for many applications it may be advantageous to configure the board frame 40 such that the angle between the uprights 41 and the vertical dimension is as small as possible, and in some applications it may be 10 degrees, while in others it may be 9, 8, 7, 6, 5, 4, 3, 2, or 1 degrees without limitation unless otherwise indicated in the following claims.

Figure 31:
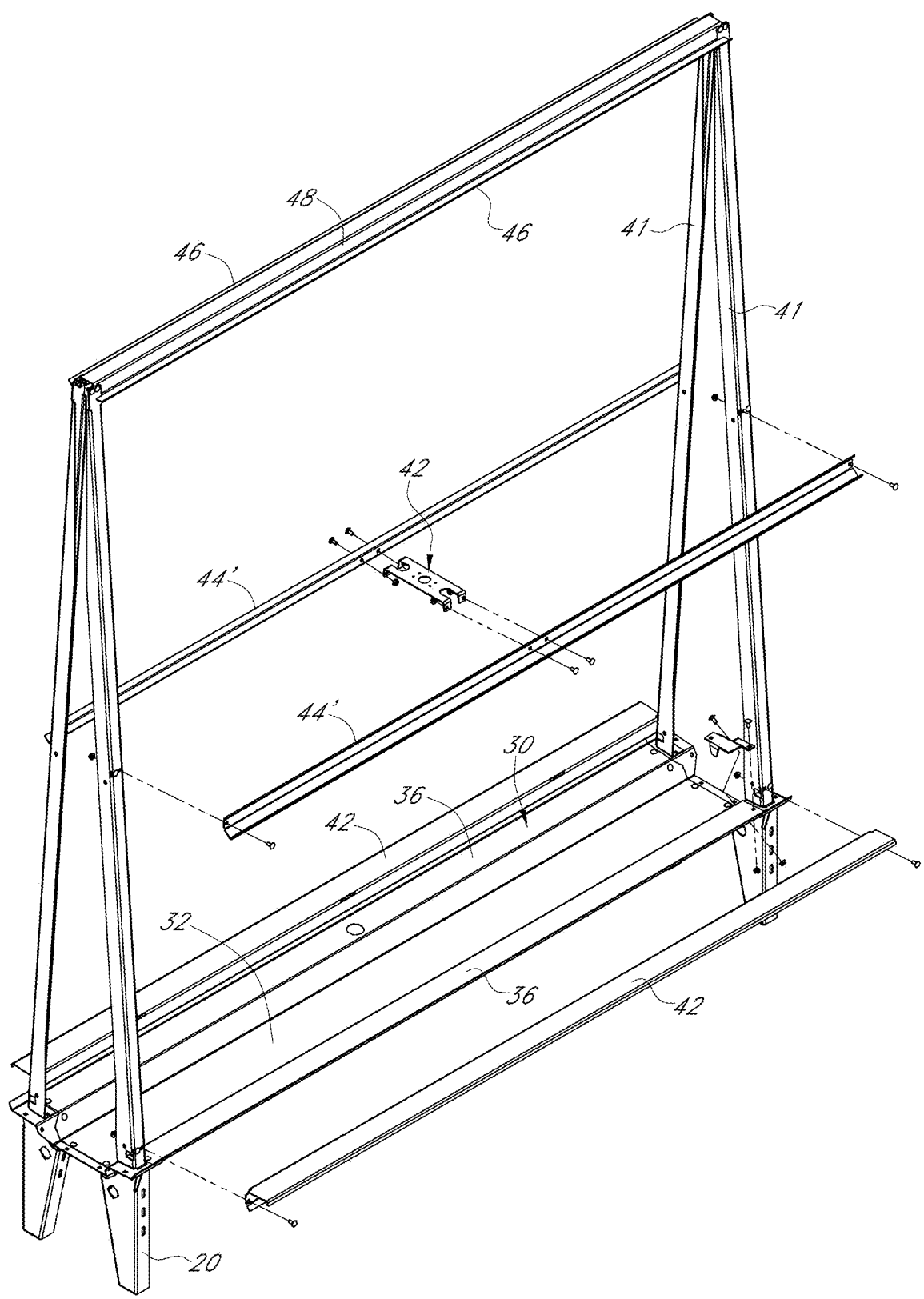
FIG. 31 is a perspective view of a portion of the plant support structure shown in FIG. 30.
Figure 32A:
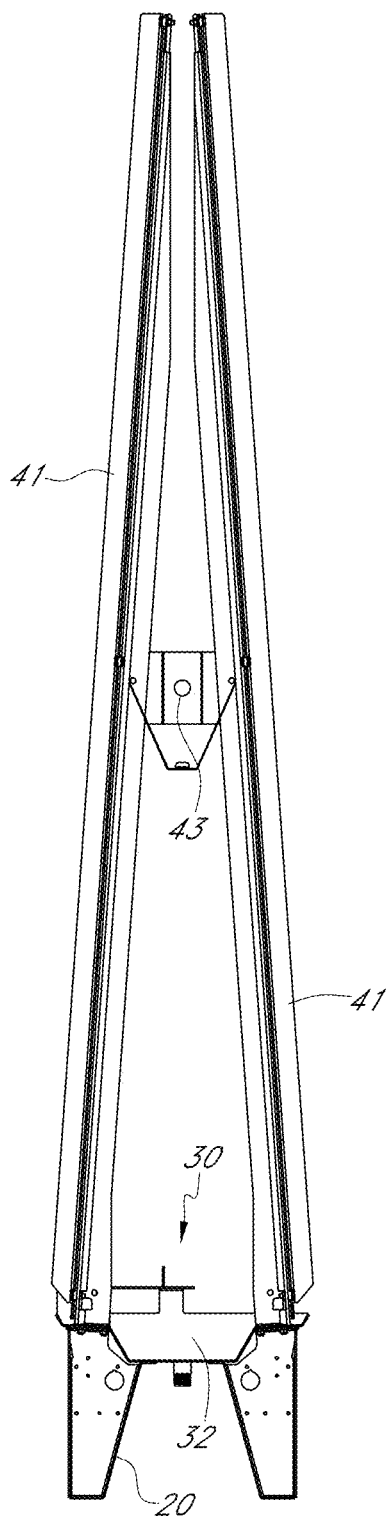
FIG. 32A is an end view of the plant support structure shown in FIGS. 30 & 31.
Figure 32B:
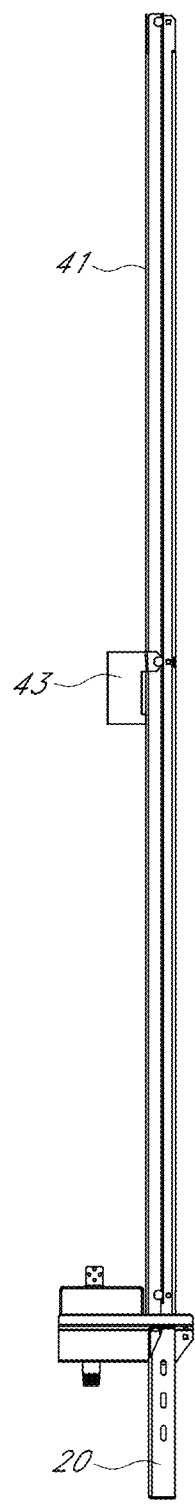
FIG. 32B is a side view of a portion of the plant support structure shown in FIGS. 30-32A FIGS. 33A & 33B provide various side views of a plant support structure having a light support.
Figure 33A:
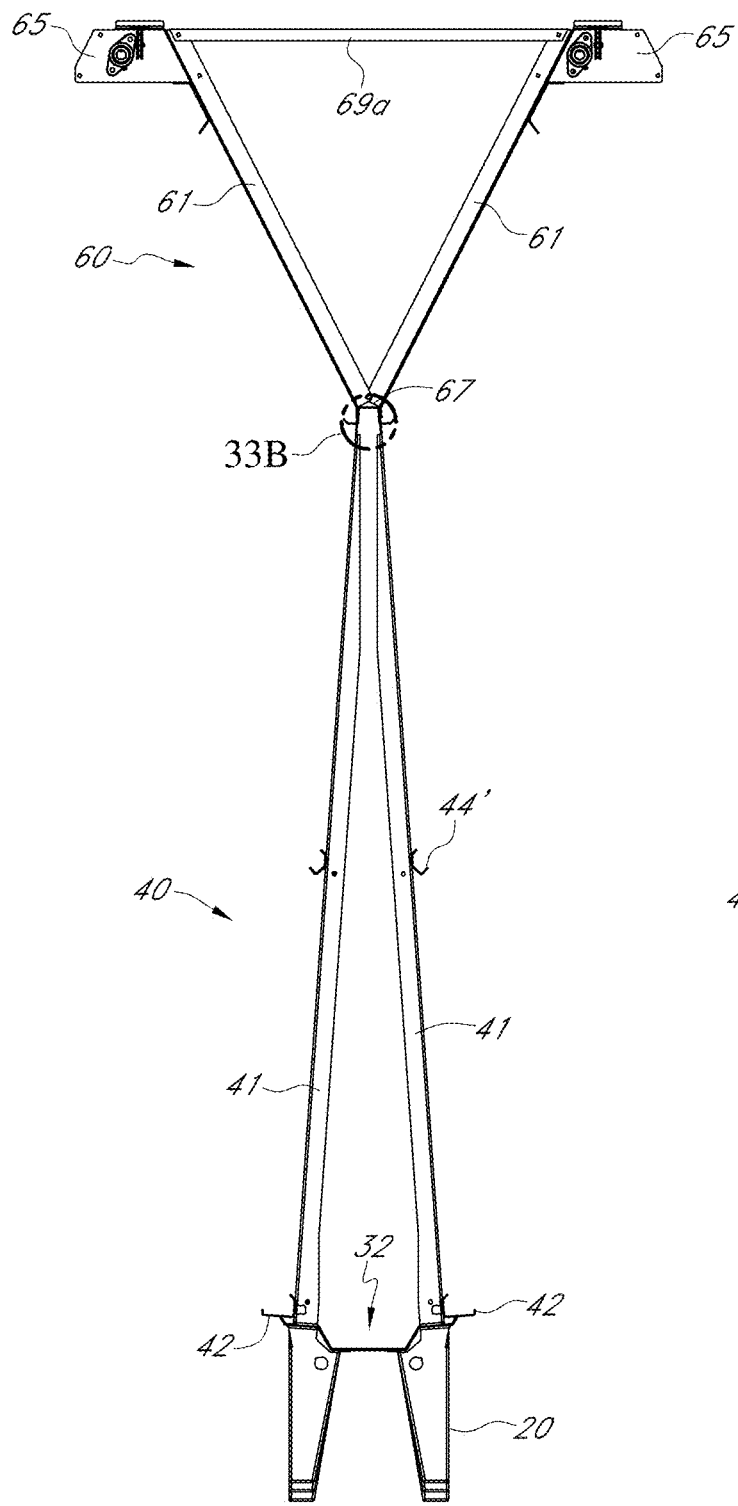
Figure 33B:
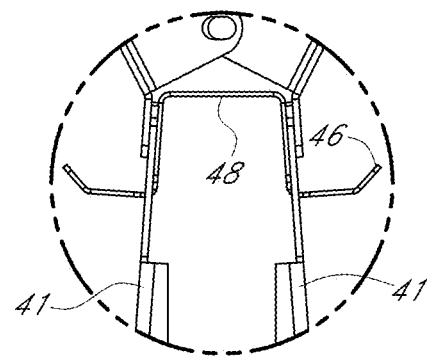

With specific reference to FIGS. 31 and 33B, which provide a perspective and detailed end view of a top portion of the board frame 40, respectively, two top rails 46 may connect an upper distal end of one upright 41 to the upper distal end of the next upright 41 along the length of the board frame 40. A cap 48 may secure the upper distal end of one upright 41 to the upper distal end of an opposing upright 41. Two bottom rails 42 may connect a lower distal end of one upright 41 to the lower distal end of the next upright 41 along the length of the board frame 40. The bottom rails 42 may also be engaged with a portion of a tray 30 (such as the side pane 36 thereof) as further discussed below. Two intermediate rails 44' may connect an intermediate portion of one upright 41 to an intermediate portion of the next upright 41 along the length of the board frame 40. A cross member 43 may connect to the two intermediate rails 44' to one another for added strength and/or rigidity.

The tray 30 may be positioned adjacent the bottom distal ends of the uprights 41 and may be configured with a trough 32 therein. A nutrient delivery system 50 (such as that shown in FIGS. 34A-34D) may be positioned within the trough 32, and the sides of the trough 32 may provide guides for the nutrient delivery system 50 so as to ensure it travels in a linear direction along the length of the trough 32. The tray 30 may be formed with a side pane 36 on either side of the trough 32, wherein the side panes 32 are elevated with respect to the trough 32. The distal edge of each side pane 36 may be angled upward with respect to the trough 32 such that water or other liquid material such as nutrient supply)) drains by gravity into the trough 32.

Figure 34A:
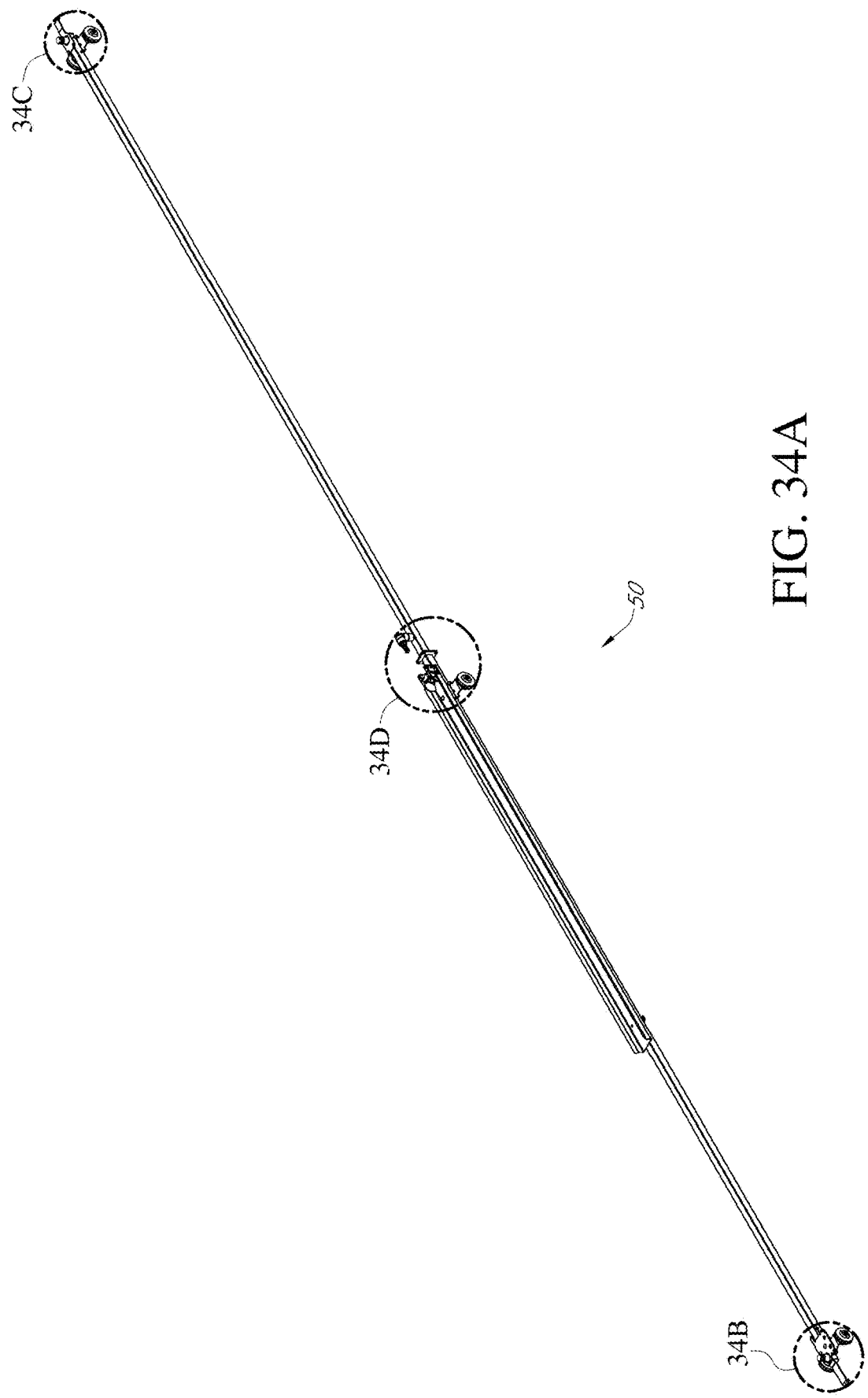
FIGS. 34A-34D provide various view of a nutrient delivery system that may be used with a plant support structure, and specifically that shown in FIGS. 31-32B.
Figure 34B:
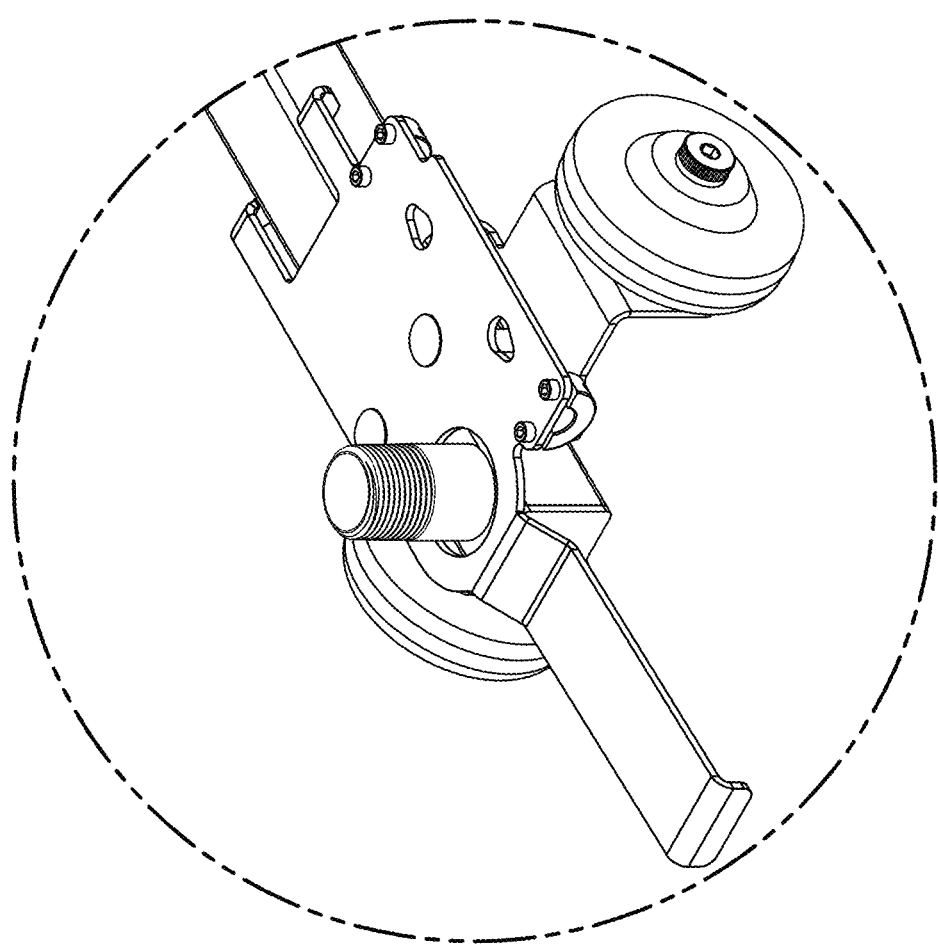
Figure 34D:
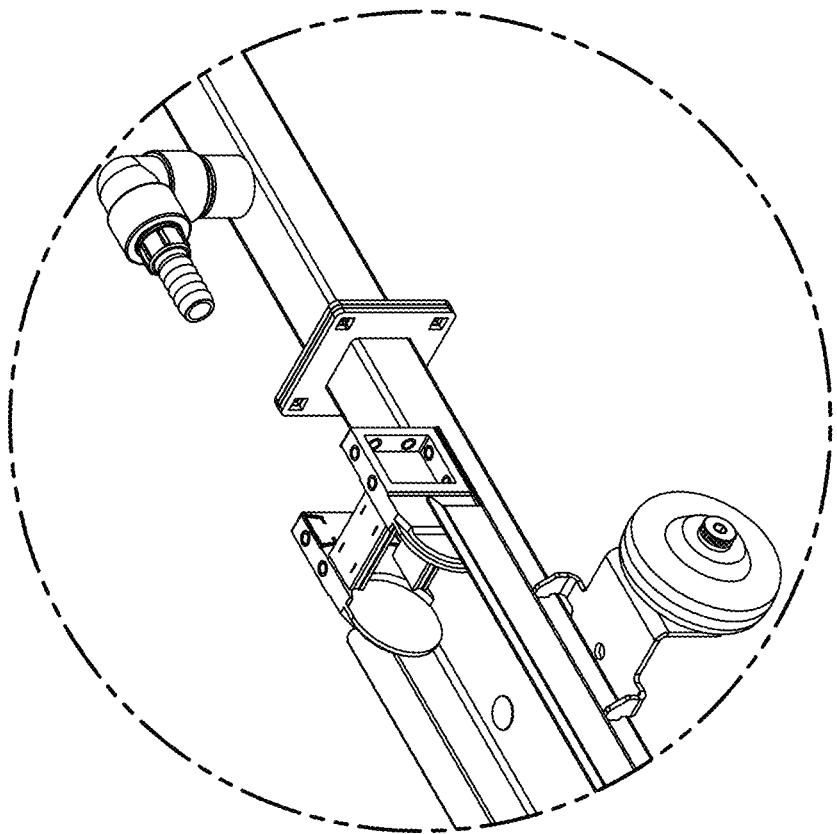
Figure 34C:
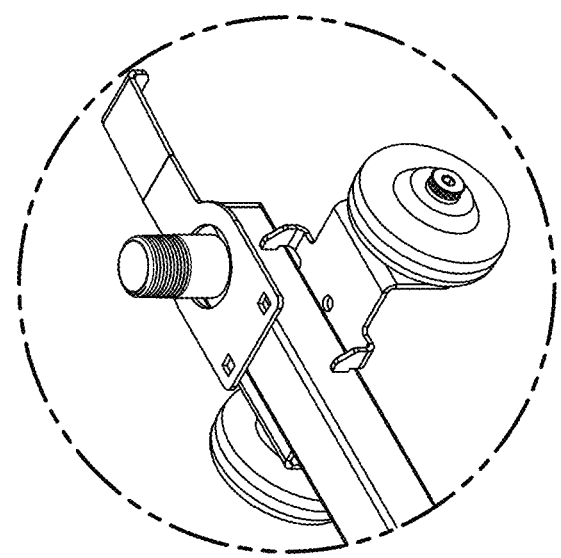

A perspective view of an illustrative embodiment of a nutrient delivery system 50 that may be positioned within the trough 32 is shown in perspective in FIG. 34A with detailed perspective views of various components of FIG. 34A further highlighted in FIGS. 34B-34D. As previously described for other illustrative embodiments of a nutrient delivery system 50, the nutrient delivery system 50 shown in FIGS. 34A-34D may be moveable with respect to the tray 30 along the length thereof in a reciprocal manner, wherein wheels may be employed to reduce friction between the nutrient delivery system 50 and the tray 30. However, other methods and/or structure for moving the nutrient delivery system with respect to the tray 30 may be used without limitation unless otherwise indicated in the following claims. The nutrient delivery system 50 may be positioned behind a grow board 12, 200 engaged with the board frame 40 such that the nutrient delivery system 50 provides water and/or other nutrients to the roots of plants on the grow board 12, 200 as previously described in detail for other illustrative embodiments of a nutrient delivery system 50. Generally, it may be advantageous to configure the board frame 40, tray 30, and various components thereof (e.g., rails 42, 44', 46, cap 48, side panes 36) to mitigate and/or eliminate the amount of water and/or other liquids (e.g., nutrient supply) that moves from the interior side of a grow board 12, 200 (i.e., the root side) engaged with the board frame 40 to the exterior side of the grow board 12, 200 (i.e., the plant side).

Referring now to FIGS. 33A & 35A-35D, wherein FIG. 33A provides an end view of an illustrative embodiment of a light support 60 engaged with a board frame 40 and FIGS. 35A-35D provide various views of an illustrative embodiment of a light support 60, a light support 60 may be positioned between and engage two adjacent plant support structures 14 adjacent a top portion of the plant support structures 14. Generally, the light support 60 may be positioned adjacent the cap 48 at the upper distal ends of two uprights 41. Referring specifically to FIG. 33A, the light support 60 may engage the top of a board frame 40 at the top of the board frame 40. Two extensions 61 that are angled with respect to one another may cooperate to form a valley 67 at the bottom distal ends thereof. Each valley 67 may be engaged with two parallel two rails 46. The upper distal ends of two cooperating extensions 61 may be configured to form an inner peak 65. A cross support 69a may engage a peak 65 positioned in one aisle 16 with the peak positioned above the adjacent aisle 16. Length supports 69b may be positioned on cooperating extensions 61 on either side of a peak 65 and extend along the length of the light support 60 to engage one or more other extensions 61 along the length of the light support as shown at least in FIG. 35A. Various other braces, tie rods, and other elements may be used to provide structural support and/or rigidity to the light support 60 and/or board frame 40 as shown in FIGS. 33A & 35A-35D and without limitation unless otherwise indicated in the following claims.

In a manner generally analogous to that previously described in regard to FIGS. 1-4 above, a light system 80 may be suspended from the light support 60 and the light system 80 may extend into an aisle 16. The light system 80 may be moveable between an upper position and a lower position. Additionally, the light system 80 may be capable of being retracted or extended with respect to the upper panels 82a and the lower panel 82b as previously described for the light system 80 shown in FIGS. 28A & 28B and described previously herein above. The light system 80 may be engaged with a connector 68 coupled to a bar 64 in a manner analogous to that described in regard to FIGS. 1-4.

Figure 35A:
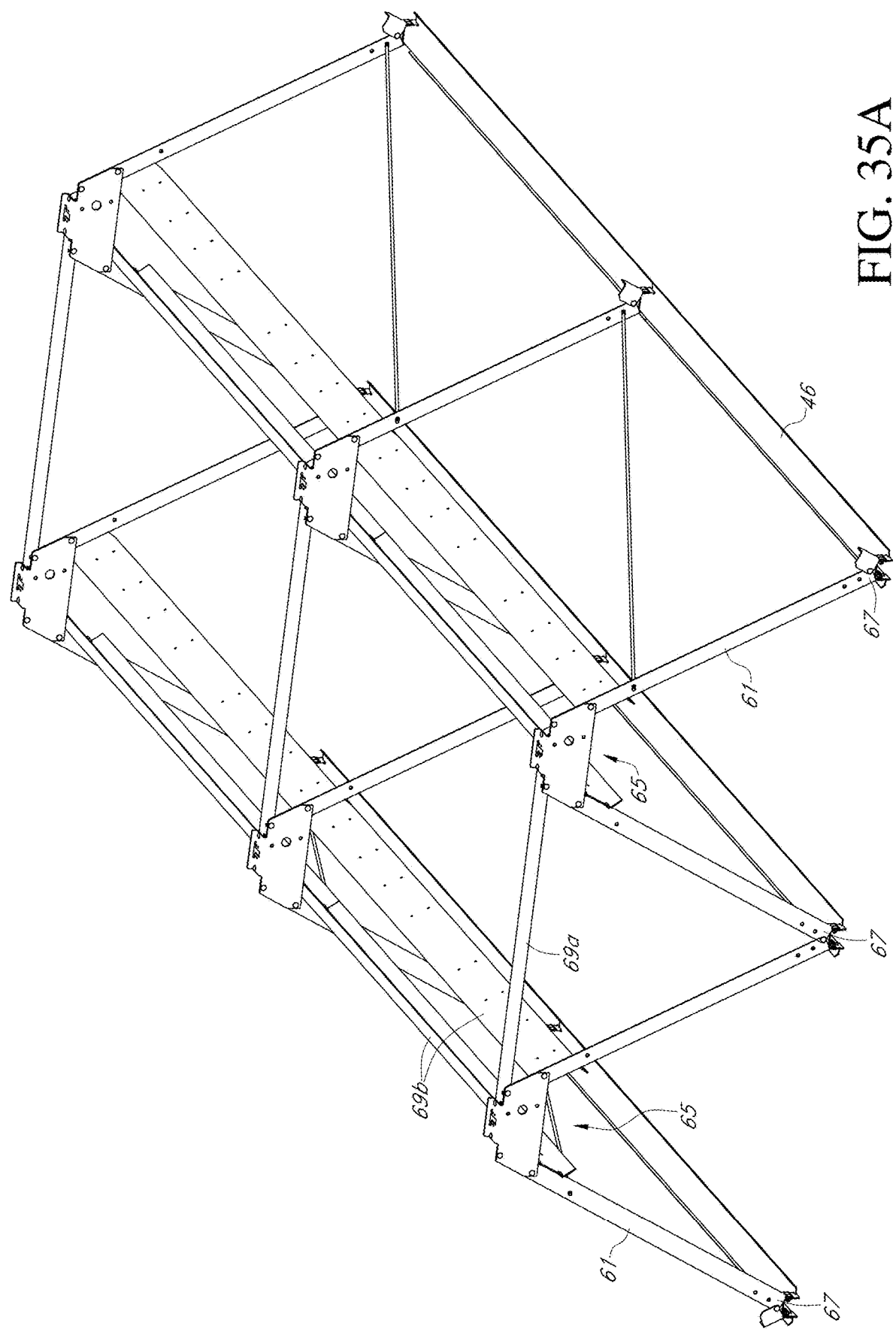
FIGS. 35A-35E provide various views of a light support that may be used with a growing system.
Figure 35B:
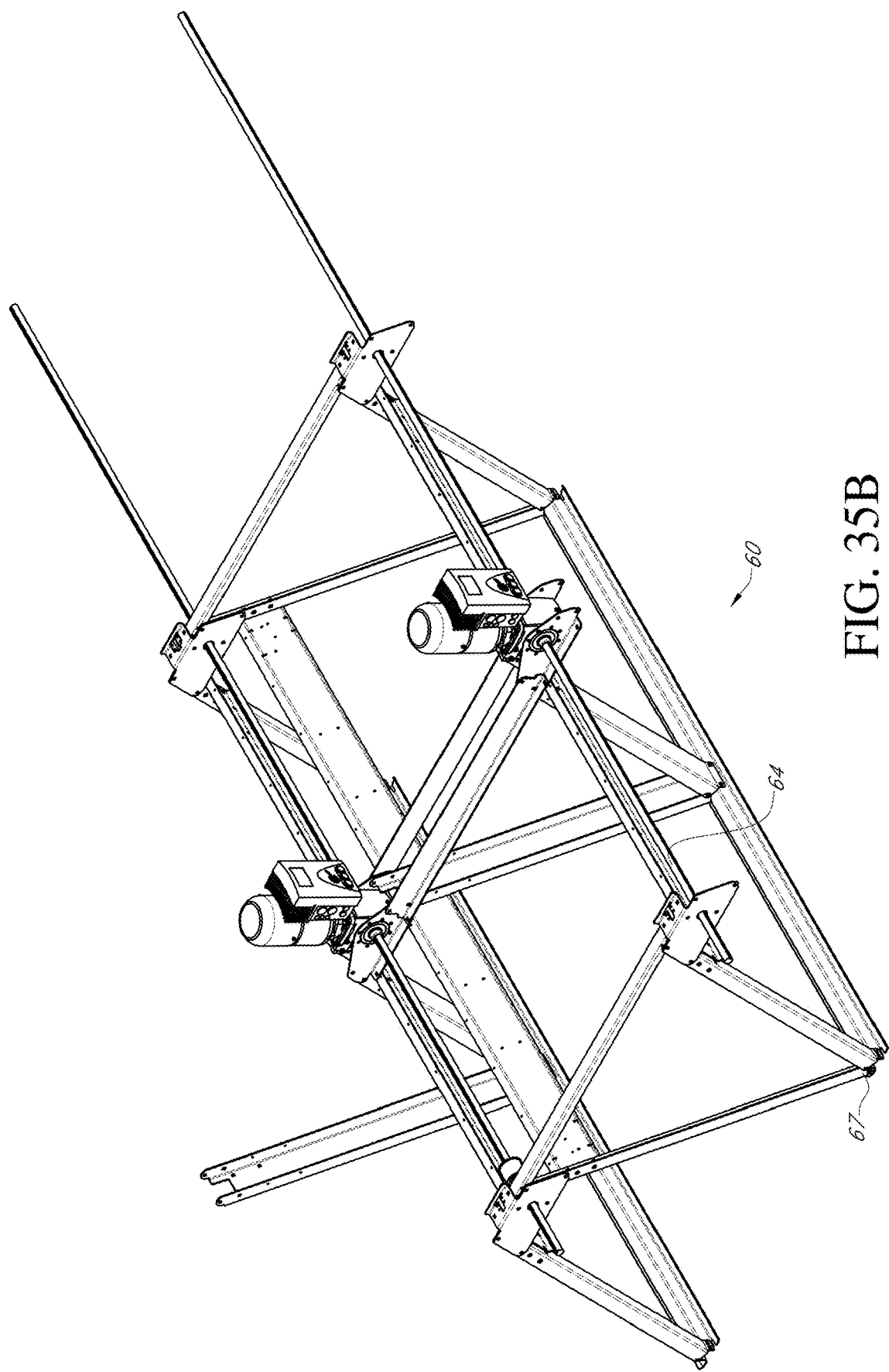
Figure 35C:
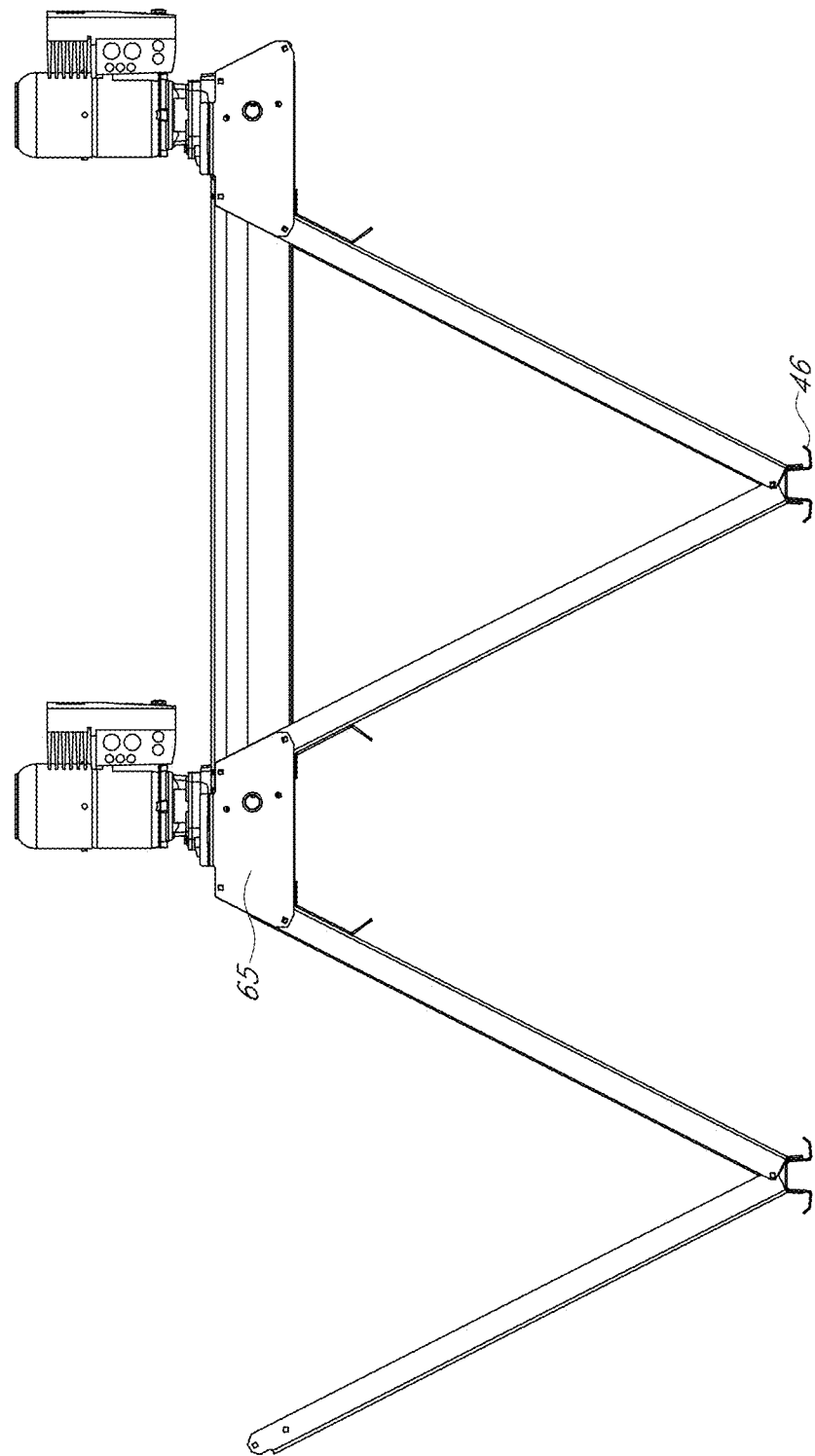
Figure 35D:
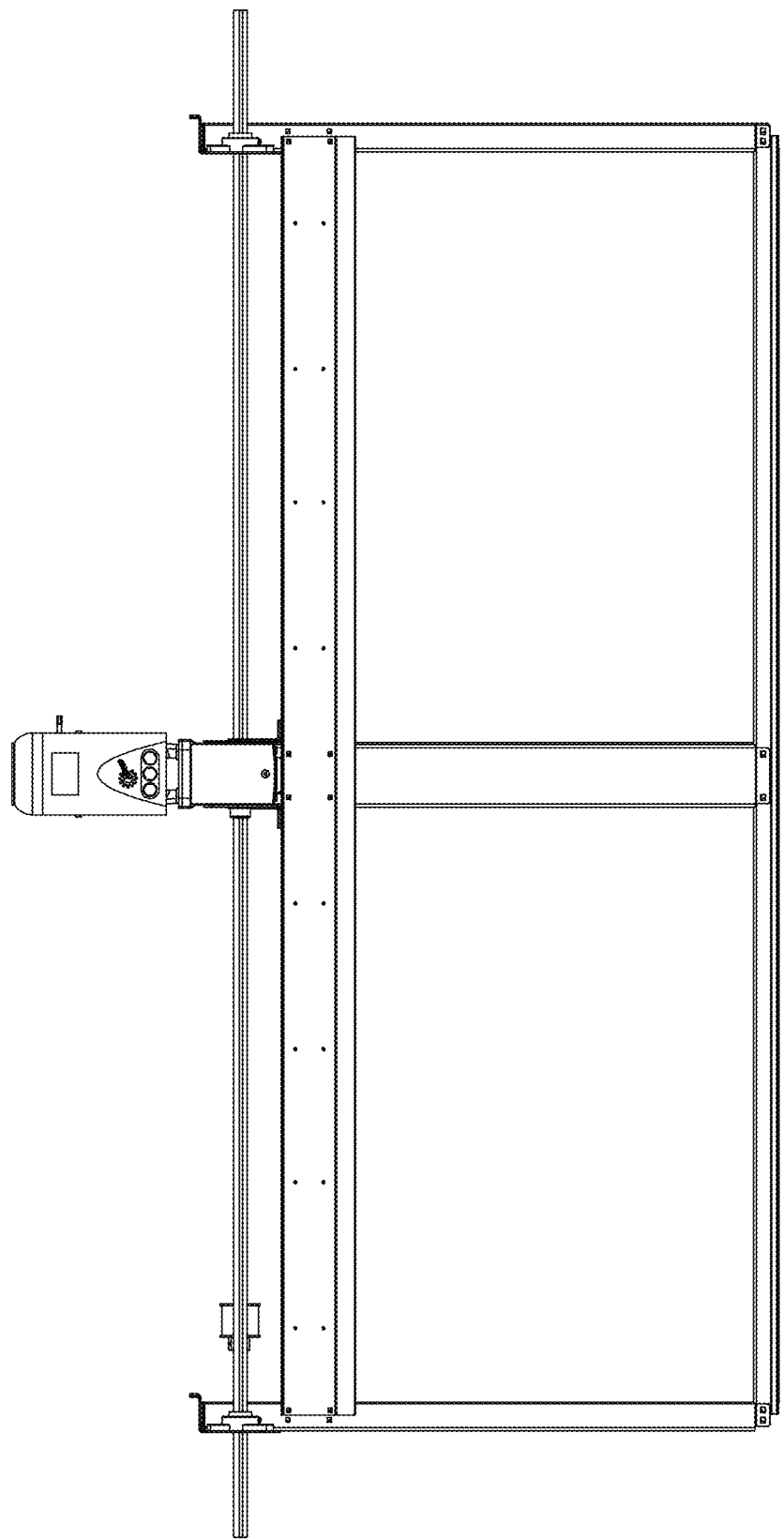
Figure 35E:
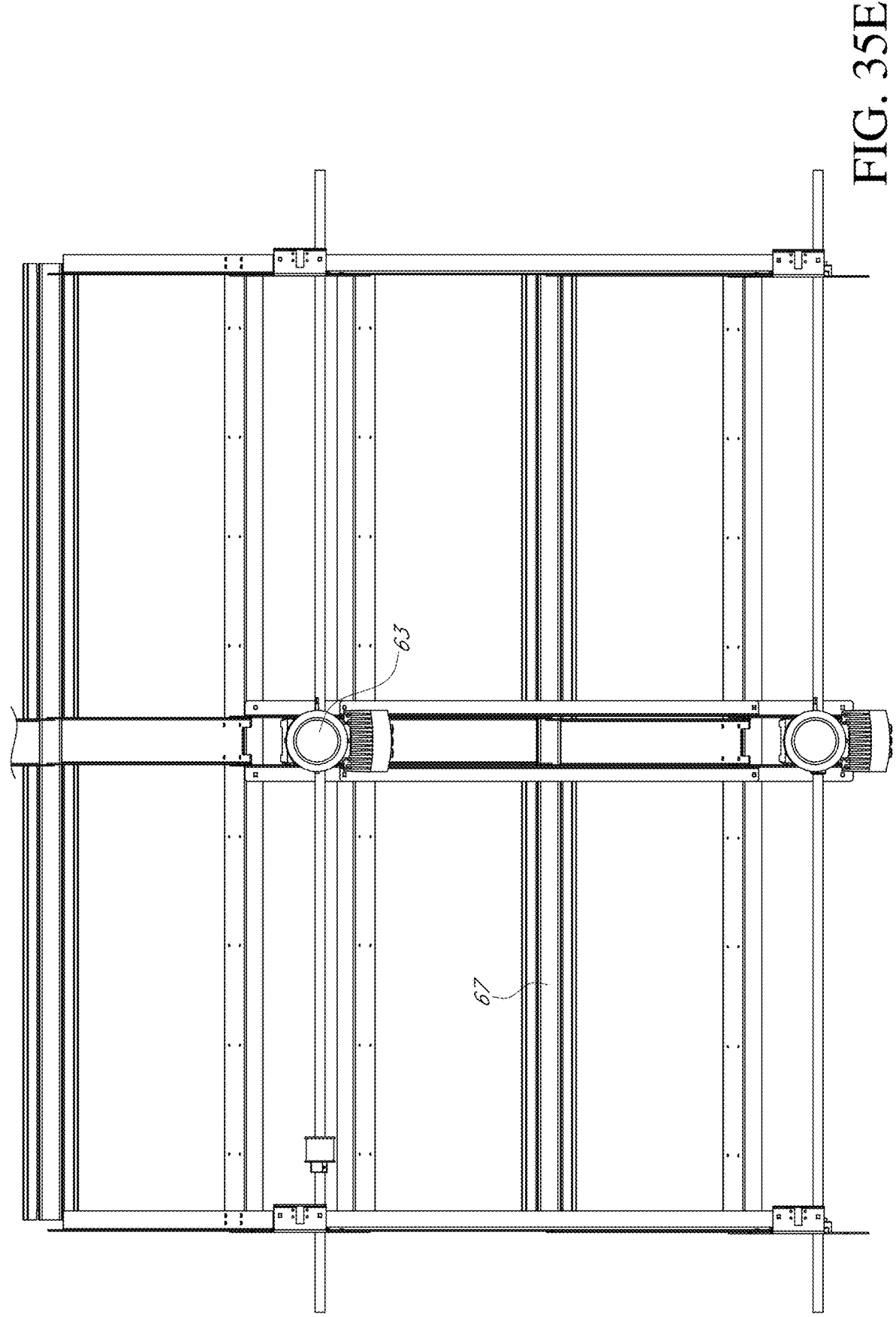

With specific reference to FIGS. 35B, 35C, and 35D, which provide a perspective and end view and top and side views of an illustrative embodiment of a light support 60, respectively, a motor 63 may be engaged with the bar 64 to provide rotational energy thereto. The bar 64 may span a portion of the length of the light support 60 and be positioned adjacent an inner peak 65. In the illustrative embodiment the light system 60 may be configured such that when the motor 63 is energized in a first direction the motor 63 may cause the bar 64 to rotate in a first direction, which in turn may cause the connector 68 to accumulate on a spool 66 (thereby raising the light system 80 and providing access to the aisle 16). When the motor 63 is energized in a second direction the motor 63 may cause the bar to rotate in a second direction, which in turn may cause the connector 68 to unwind from the spool 66 (thereby lowering the light system 80 such that it may provide light to various plants.

It is contemplated that employing a light system 80 such as that shown in FIGS. 28A & 28B and previously described above may be especially advantageous for use with the board frame 40 and/or light support 60 shown in FIGS. 30-35D without limitation unless otherwise indicated in the following claims. Additionally, various elements and/or components of the light support 60 and/or light system 80 may be supported and/or engaged with the ceiling of a structure within which the growing system 10 is positioned without limitation unless otherwise indicated in the following claims.

Figure 36:
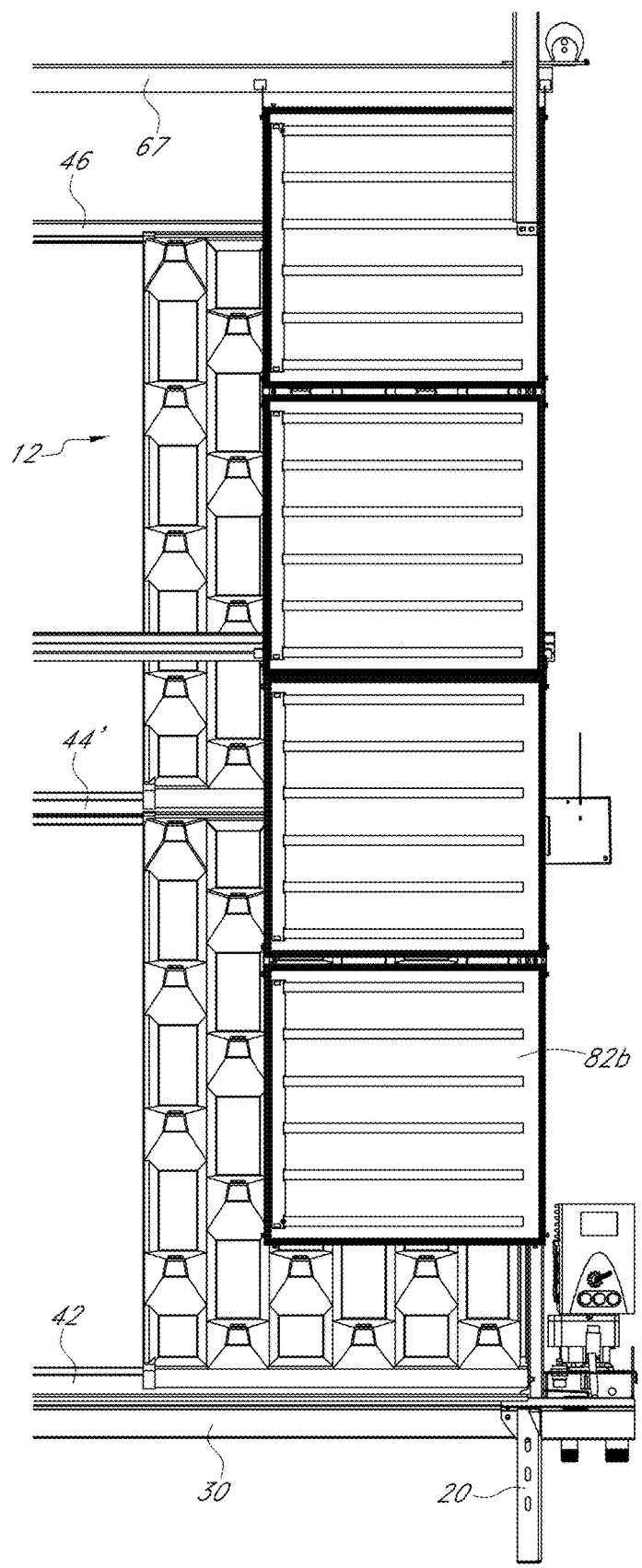
FIG. 36 provides a side view of a light system engaged with the light support shown in FIGS. 35A-35B.

One illustrative embodiment of a light system 80 positioned adjacent a plurality of grow boards 12 (which grow boards 12 may be engaged with a board frame 40 such as that shown in FIGS. 30-32B) is shown from a side view in FIG. 36. As shown, the light system 80 is in a fully extended position (but elevated slightly with respect to the grow boards 12 such that the top edge of the light system 80 is slightly higher than the top edge of the upper grow board 12, 200), wherein it is evident that the overall height of the light support 80 may be configured to be approximately equal to the overall height of the grow boards 12, such that the light support 60 and light system 80 may cooperate to provide complete or nearly complete canopy coverage to all plants on the adjacent grow boards 12. However, other configurations may be used without departing from the scope of the present disclosure unless otherwise indicated in the following claims. It is contemplated that such configurations may employ reflectors, mirrors, and/or other structures and/or methods to provide full or nearly full canopy coverage for a plurality of plants positioned on one or more grow boards 12.

In another configuration of the plant support structure 14, the light support 60 may be comprised of one or more extensions 61 that are enclosed and/or engaged with a sock, duct, or conduit (not shown) placed in the area between to adjacent extensions 61 above a valley 67 (i.e., in the triangular shaped area defined by two extensions 61 extending from a common valley 67 and the cross support 69a engaged with the upper distal ends of those extensions 61). Additionally, blowers, fans, or other air-handling devices may be engaged with the light fixture 80 or other structural component associated with the growing system 10 to provide directed airflow to blow are from, draw air into, or return air flow to air the handling systems. In one application, the fan, blower, or other air handling device may be configured to direct airflow to a plurality of rows of plants and may use one or more fluid conduits configured as socks, ducts, or other structures.

Figure 37:
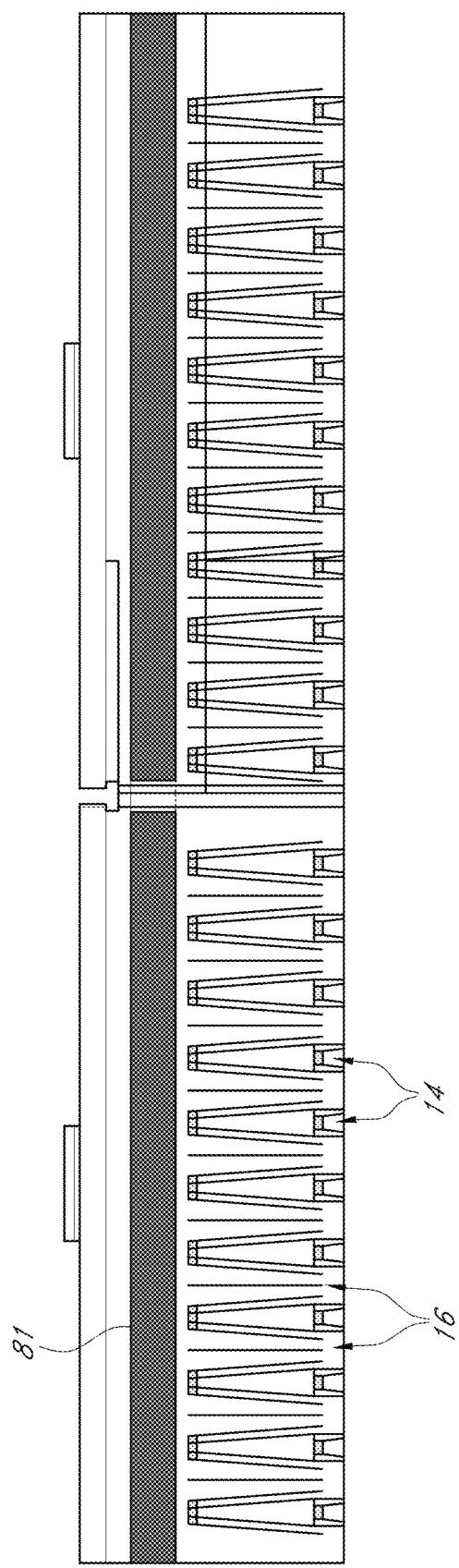
FIG. 37 provides a side view of a plurality of plant supports arranged in rows with an air conduit positioned on a first end of the rows.
Figure 38A:
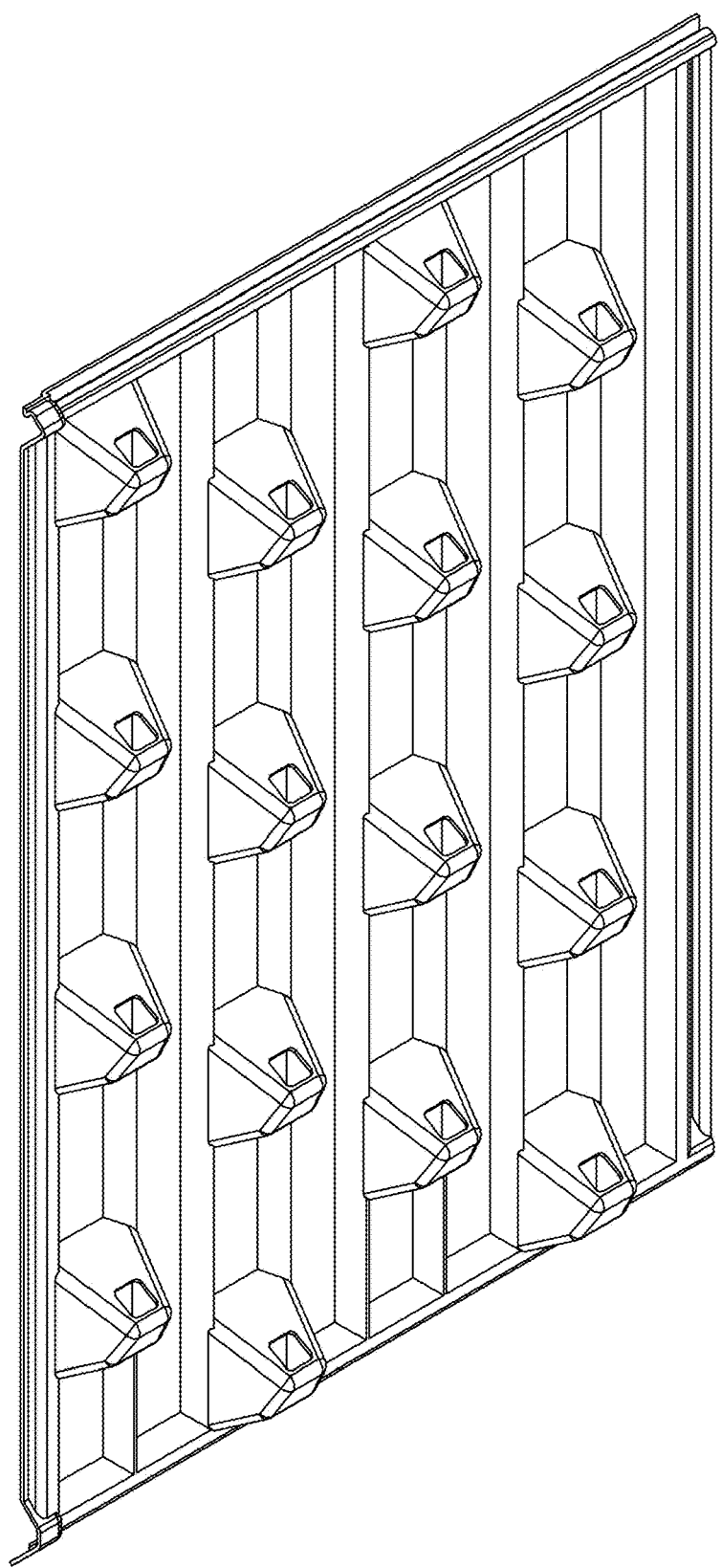
FIGS. 38A & 38B provide perspective and side views, respectively, of a grow board having sixteen apertures.
Figure 38B:
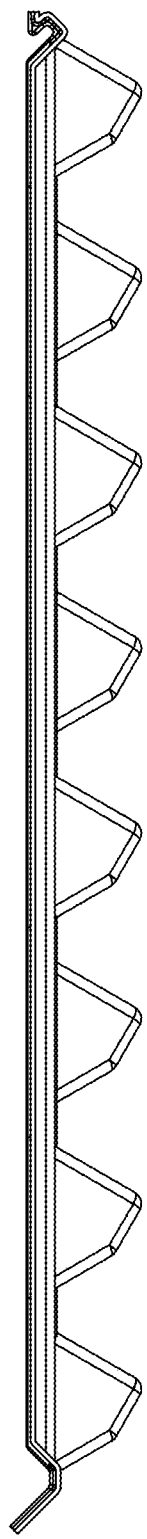
Figure 39A:
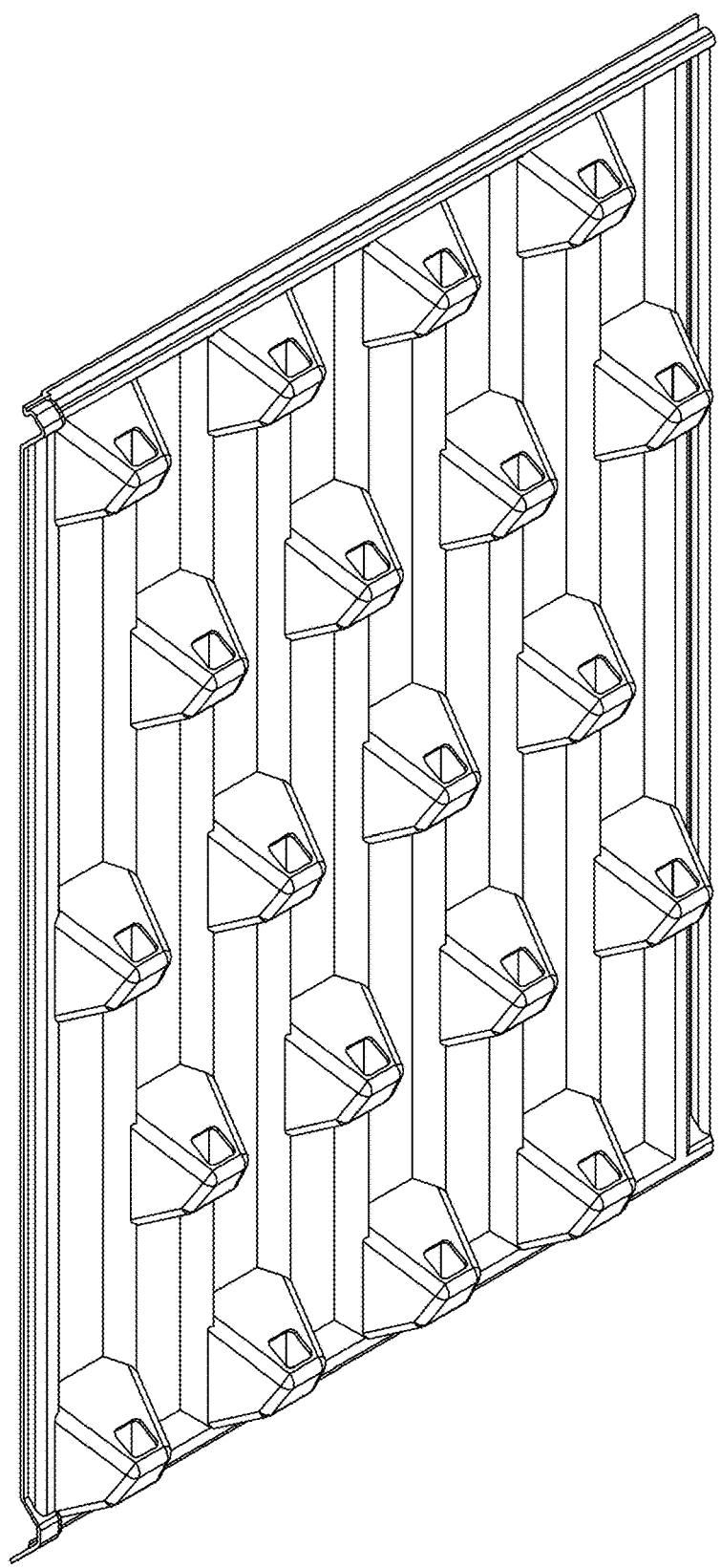
FIGS. 39A & 39B provide perspective and side views, respectively, of a grow board having twenty apertures.
Figure 39B:
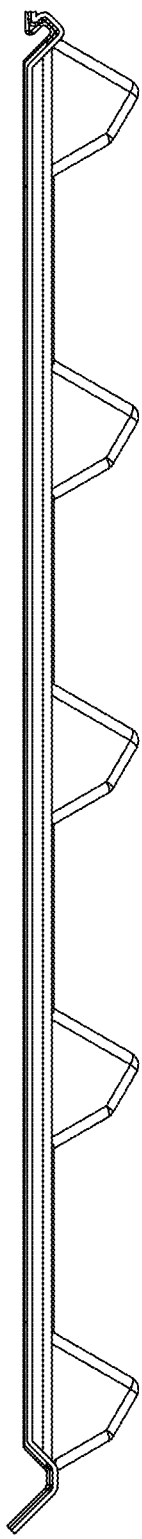
Figure 40A:
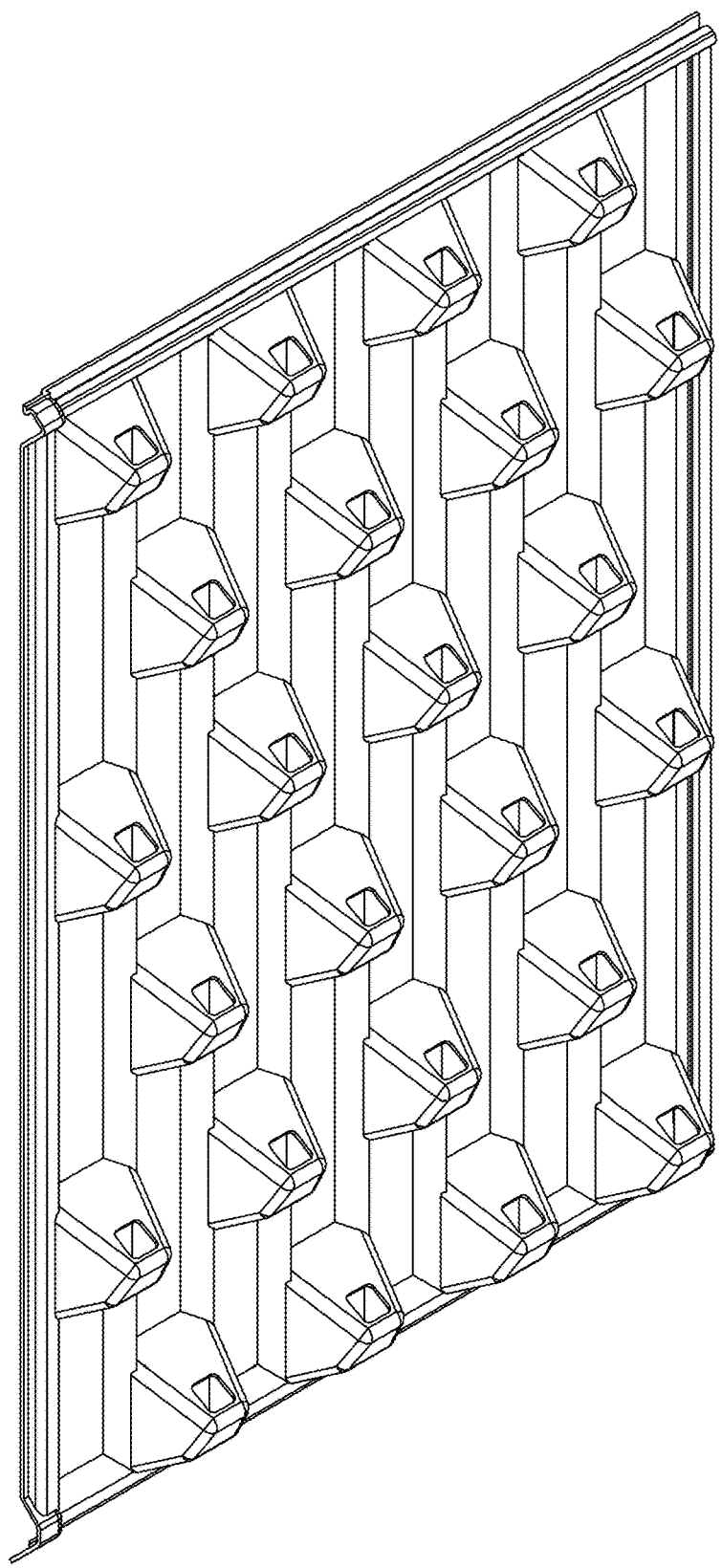
FIGS. 40A & 40B provide perspective and side views, respectively, of a grow board having twenty-four apertures.
Figure 40B:
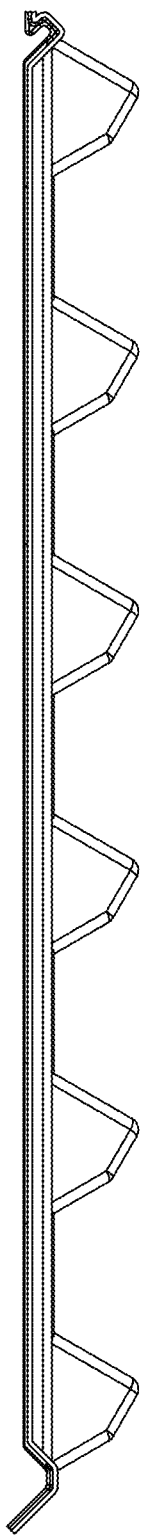
Figure 41A:
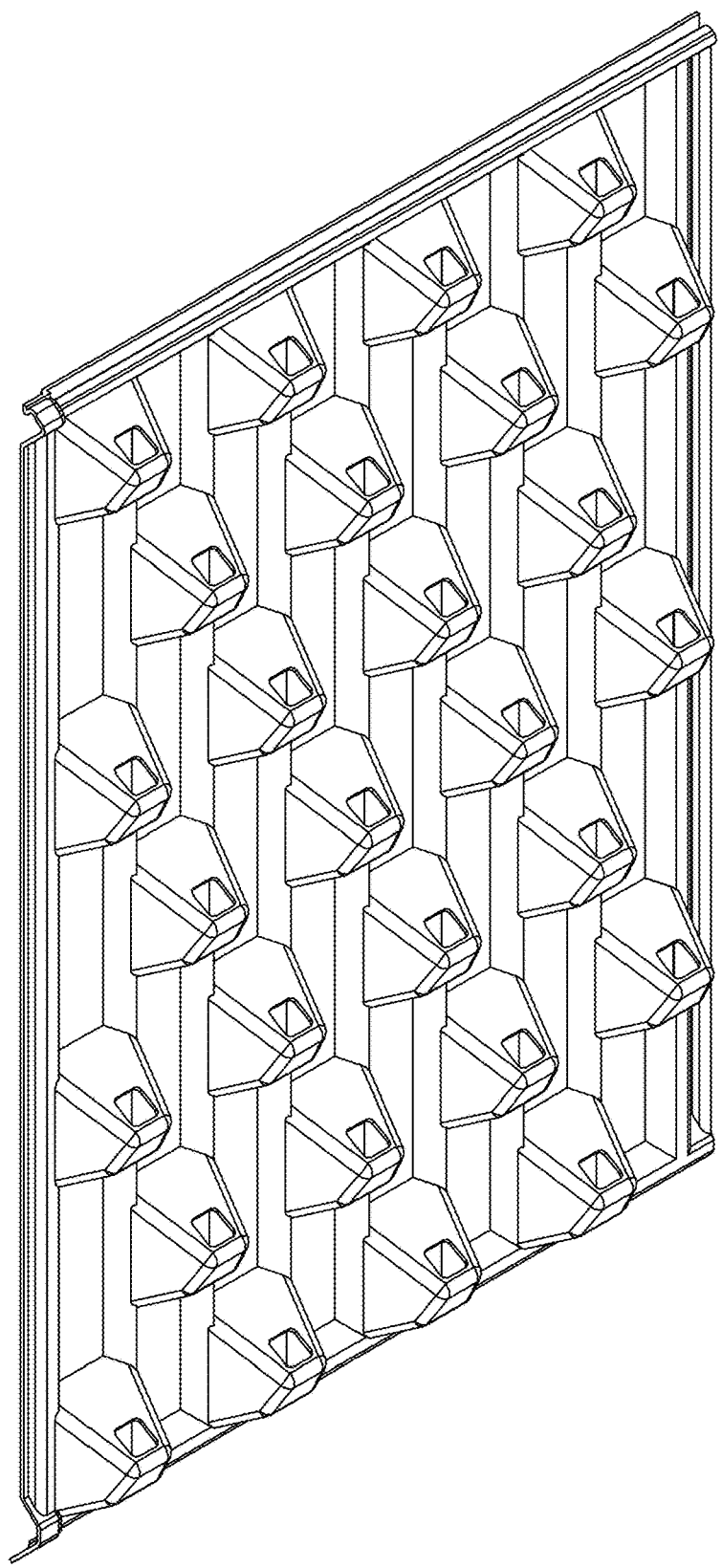
FIGS. 41A & 41B provide perspective and side views, respectively, of a grow board having twenty-eight apertures.
Figure 41B:
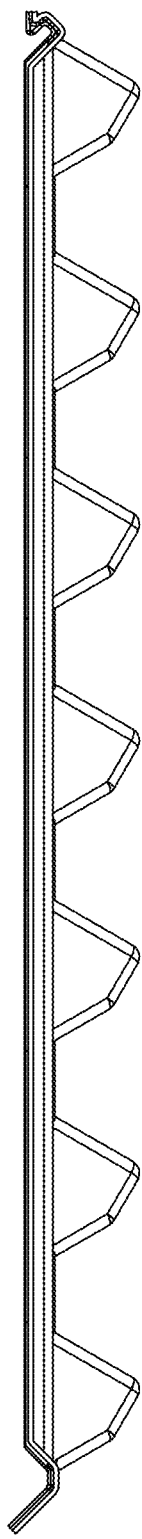
Figure 42A:
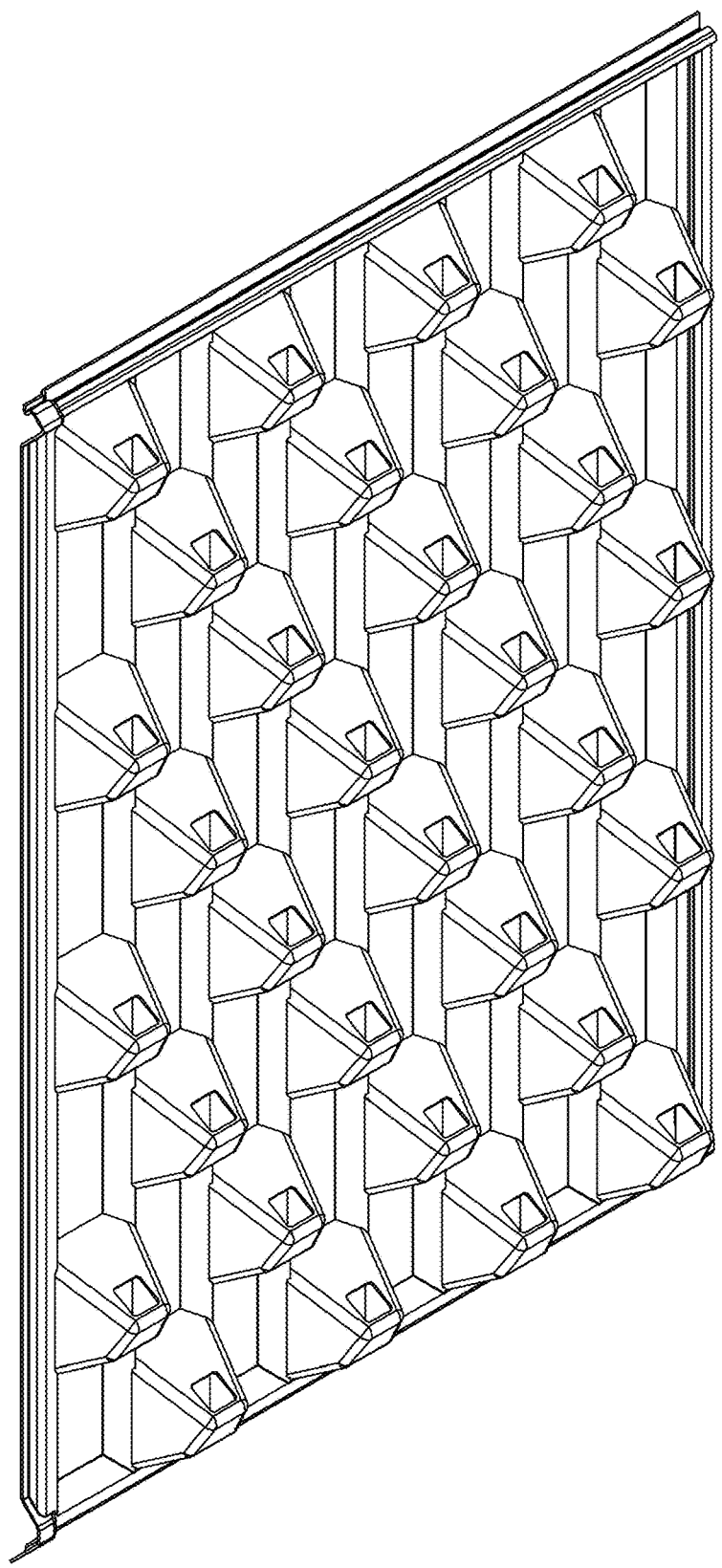
FIGS. 42A & 42B provide perspective and side views, respectively, of a grow board having thirty-two apertures.
Figure 42B:
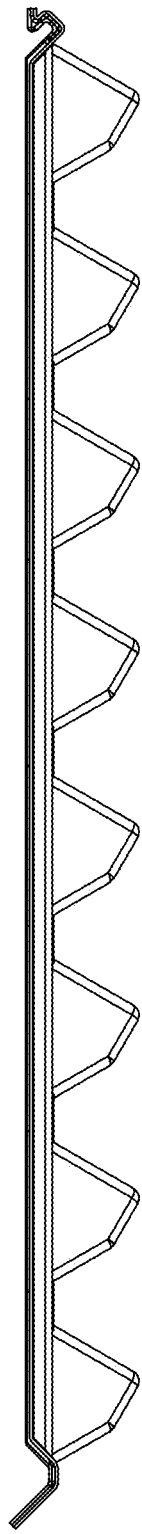

An end view of a controlled environment comprised of a plurality of plant support structures 14 arranged in rows having aisles 16 between adjacent plant support structures 14 is shown in FIG. 37. An air conduit 81 may be positioned on one end of the plurality of plant support structures 14 such that the length of the air conduit is generally perpendicular to the length of the plant support structures 14. An air intake may be positioned on the opposite end of the plurality of plant support structures 14 to create a loop for air movement through the plurality of plant support structures 14.

The air conduit 81 may be formed as a generally cylindrical tube comprised of a flexible or semi-flexible sock with a plurality of apertures therein, wherein the fluid flow characteristics within the air conduit 81 and configuration of the apertures provide relatively even and adequate airflow to all the plants positioned on the plurality of plant support structures 14 adjacent to the air conduit 81. Generally, the optimal fluid flow characteristics and/or optimal dimensions of the air conduit 81 will depend on several factors, including but not limited to the type of plants to be grow, the dimensions of the aisles 16, grow boards 12, plants, plant support structures 14, light support systems 60, light systems 80, etc., and is therefore in no way limiting to the scope of the present disclosure unless otherwise indicated in the following claims.

In another illustrative embodiment of a growing system 10, the feet 20 may be enclosed in a sock, duct, or conduit positioned below the tray 30 and to draw air from or blow air into a plurality of plants positioned above the tray 30. This sock, duct, or conduit may be engaged with one or more fans, blowers, or other air-handling devices and may be engaged with the light fixture 80 or other structural component associated with the growing system 10 to provide directed airflow. In one application, the fan, blower, or other air handling device may be configured to direct airflow to a plurality of rows of plants and may in fluid communication with one or more fluid conduits configured as socks, ducts, or other structures.

The growing system 10 shown in FIGS. 30-37 may facilitate various economic advantages compared to other growing systems 10. For example, the growing system 10 shown in FIGS. 30-37 may allow an operator to grow a plurality of plants having characteristics that allow for on-site processing of the plants. For example, a cutting and/or chopping module (not shown) may be positioned adjacent a growing room wherein a plurality of plants are grown on a plurality of plant support structures 14. Grow boards 12 having mature plants thereon may be moved from the growing room to a cutting and/or chopping room easily, such that transportation costs are minimized and shelf life of the processed product is increased due to a savings in time to transport mature plants to a processing facility. In one illustrative embodiment, a processing room and a growing room may simply be separated by a single wall having selectable access (e.g., door, curtain, etc.) therein and may be configured with a conveying mechanism between the two rooms, such as a conveyor belt upon which one or more grow boards 12 may be positioned for transport from the growing room to the processing room.

Illustrative Embodiments of a Grow Board

Referring now specifically to FIGS. 43A-45B, various other aspects of a grow board 200 are shown. It is contemplated that the grow board 200 shown in FIGS. 43A-45B may be configured with an exterior surface, generally shown in perspective in FIG. 43A, and which exterior surface may be positioned adjacent to the portion of a plant (which plant is grown using the grow board 10) that would normally constitute the upper portion of the plant (i.e., the portion of a plant other than the roots). It is further contemplated that this portion of a plant may protrude from one or more apertures 212a formed in the top surface 212 of a protrusion 210 as described in further detail below.

Figure 43A:
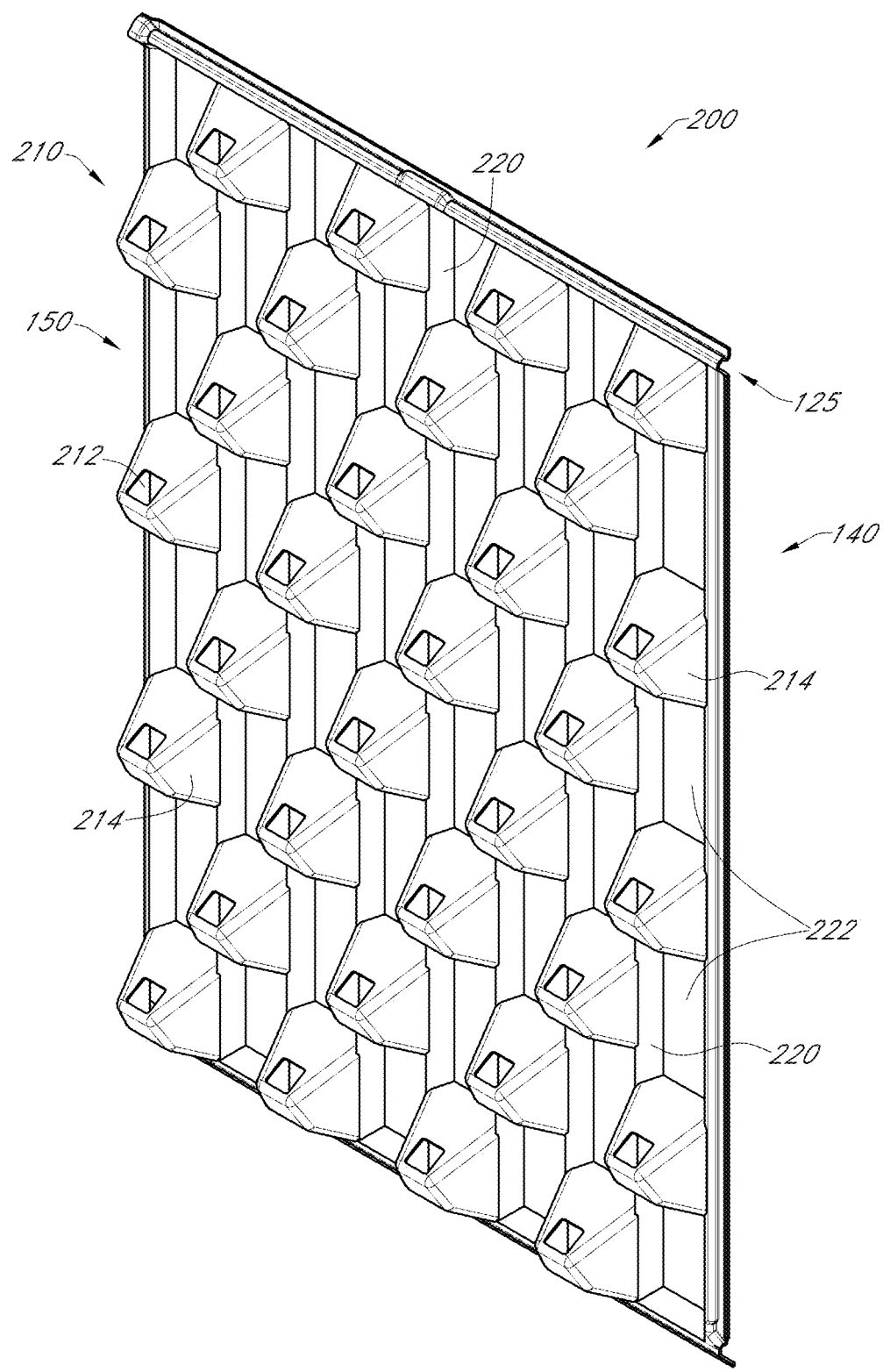
FIG. 43A provides a perspective view of an exterior surface of a grow board showing various other aspects thereof.
Figure 43B:
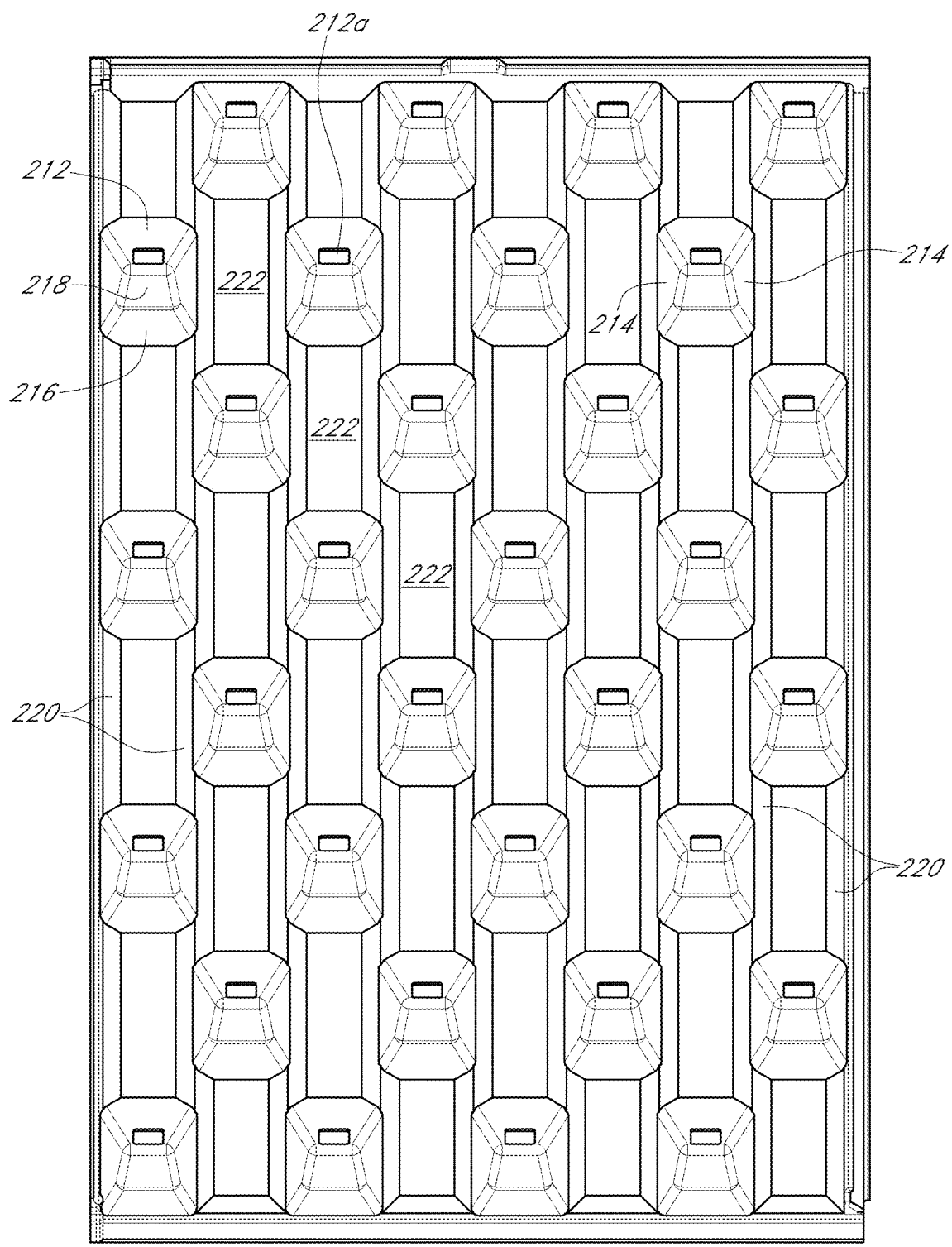
FIG. 43B provides a plane view of the exterior surface of the grow board from FIG. 43A.
Figure 43C:
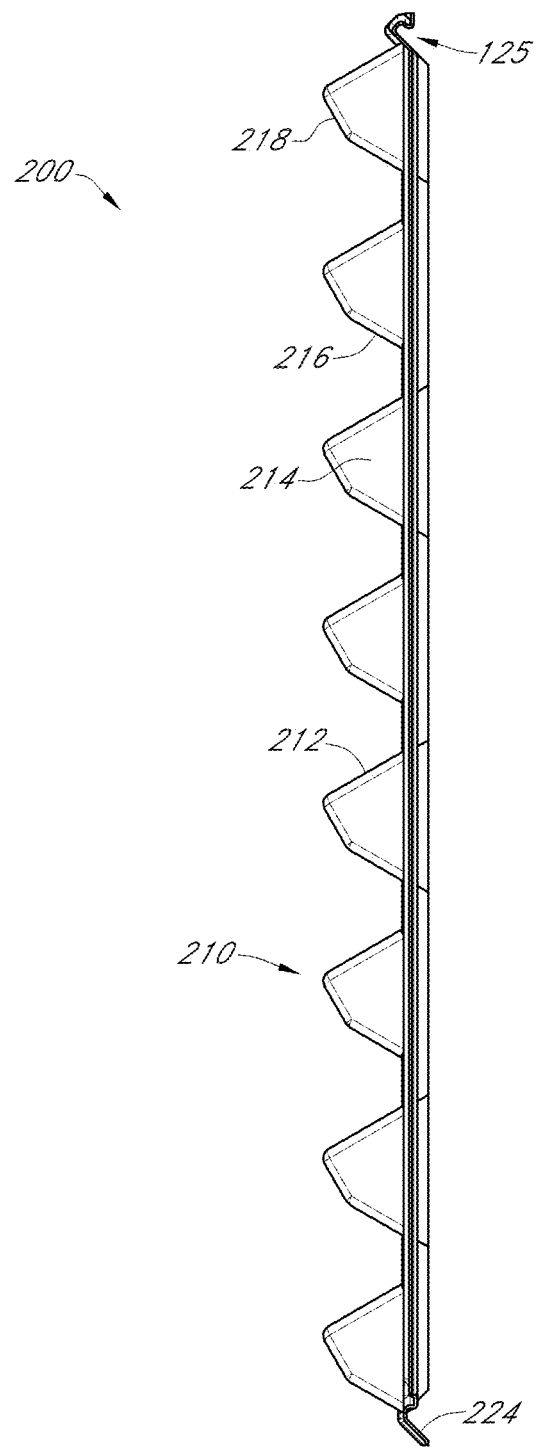
FIG. 43C provides a side view of the grow board from FIGS. 43A & 43B.
Figure 43D:
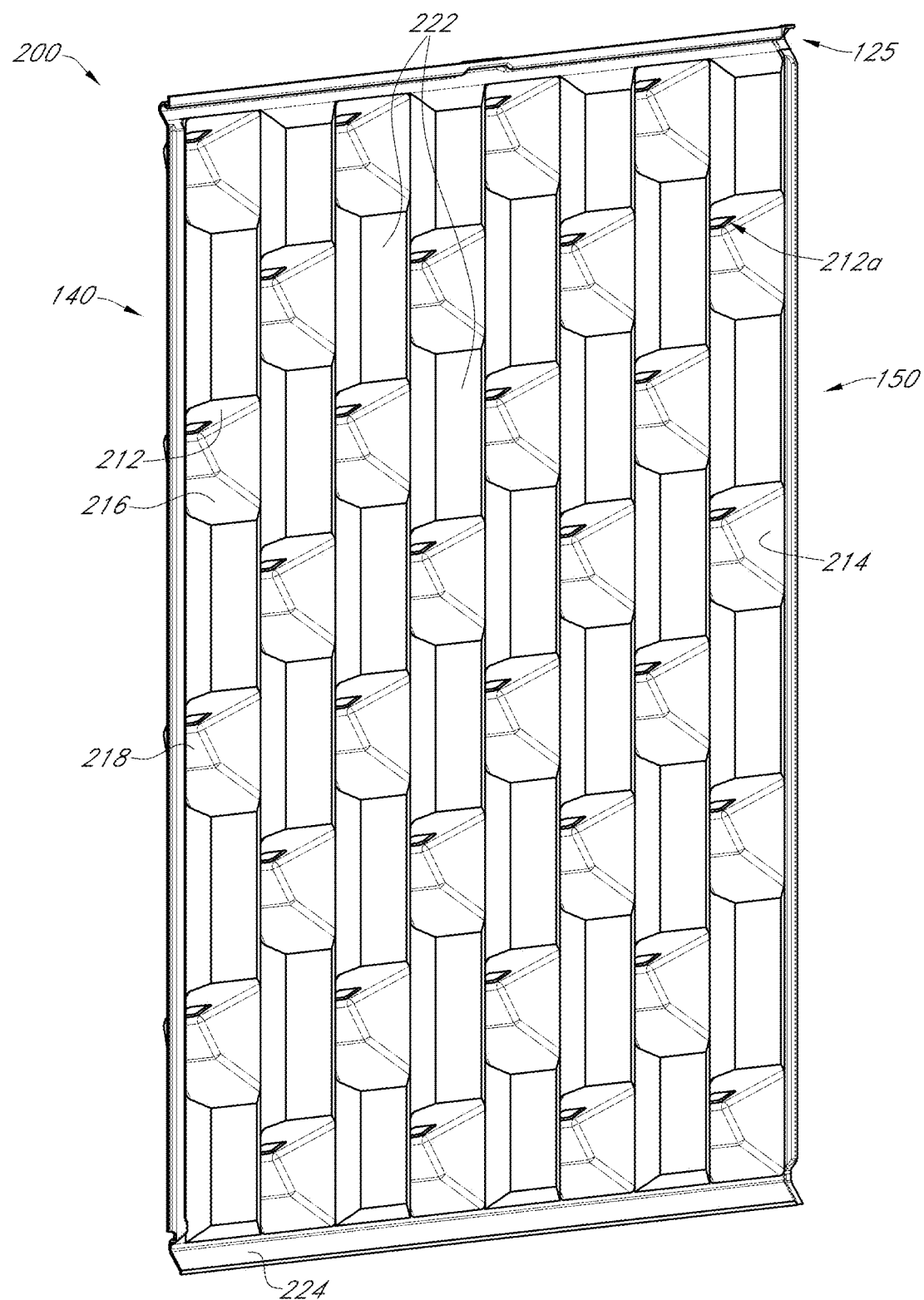
FIG. 43D provides a perspective view of an interior surface of the grow board from FIGS. 43A-43C.

Additionally, it is contemplated that the grow board 200 shown in FIGS. 43A-45B may be configured with an interior surface, generally shown in perspective in FIG. 43D, and which interior surface may be positioned adjacent the portion of a plant that would normally constitute the lower portion of the plant (i.e., the root portion). It is further contemplated that part of this portion of the plant may be engaged with grow media 16, and that all or a portion of the grow media 16 may be positioned within a protrusion 210 and such that the grow media 16 and/or portion of the plant engaged therewith may receive nutrient supply. In an aspect, the nutrient supply may be delivered directly to the grow media 16 and/or portion of the plant engaged therewith via an aeroponic nutrient supply delivery system so as to create an aeroponic chamber adjacent the interior surface of the grow board 200. However, other nutrient supply delivery systems and/or configurations thereof may be used with the present disclosure without departing from the scope of the present disclosure unless so indicated in the following claims.

In an aspect, the grow board 200 may be formed with a plurality of protrusions 210 formed therein. Each protrusion may extend outward from the exterior surface of the grow board 210 away from an aeroponic chamber. The protrusions 210 may be arranged in rows and columns, as clearly shown in at least FIG. 43B, which provides a plane view of the exterior surface of the grow board 200.

Each protrusion 210 may be configured such that it is symmetrical about a vertical plane that is generally normal to the width of the grow board 200 as arranged in FIG. 43B. A top surface 212 may be engaged with a side surface 214 on either side thereof, wherein the side surfaces 214 may extend downward from the top surface 212. The top surface 212 may be formed with an aperture 212a therein, and the aperture 212a may be formed adjacent an intermediate surface 218 that extends downward from the top surface and that engages both side surfaces 214. Finally, a bottom surface may engage the intermediate surface 218 and both side surfaces 214. The side surfaces 214 may be angled inward toward the intermediate surface 218.

Still referring generally to FIG. 43B, the protrusions 210 may be arranged so as to optimize the volume of space above each aperture 212a to allow the upper portion of a plant protruding from the aperture 212a to grow freely. Accordingly, the protrusions 210 in a first row may be offset with respect to the protrusions 210 in an adjacent row by an amount approximately equal to the width of a protrusion 210.

Ridges 220 may extend outward from the interior surface of a grow board 200. Each ridge 220 may be positioned between adjacent columns of protrusions 210. Additionally, a ridge 220 may be positioned on either terminal side (e.g., right side 140 or left side 150) of the grow board 200. The grow board 200 may be configured with a planar surface 222 between adjacent ridges 220 and adjacent protrusions 210 in a given column of protrusions 210. Each planar surface 222 may be set back from the distal end of the adjacent ridges 220 to provide a predetermined distance between the planar surface 222 and the aperture 212a. This distance, in conjunction with the angled sides of each ridge 220, the inward angle of the side surfaces 214, the angle of the bottom surface 216, and the angle of the intermediate surface 214 (along with the general spacing of protrusions 210 with respect to one another) may be manipulated to provide the optimal volume around the aperture 212a on the exterior surface of the grow board 200. The optimal volume will vary from one application of the grow board 200 to the next, and may be dependent at least upon the type of plant for which the grow board 200 is designed, and therefore is in no way limiting to the scope of the present disclosure unless so indicated in the following claims.

Additionally, referring generally to FIG. 43D, each protrusion 210 may be configured to ensure that the roots of a plant receive adequate nutrient supply on the interior surface of the grow board 200. Accordingly, the size, shape, and/or angles of the top surface 212, side surfaces 214, bottom surface 216, and/or intermediate surface 218 may be optimized for the roots of a specific plant and/or the specific flow characteristics of a nutrient supply adjacent the interior surface of the grow board.

Figure 44A:
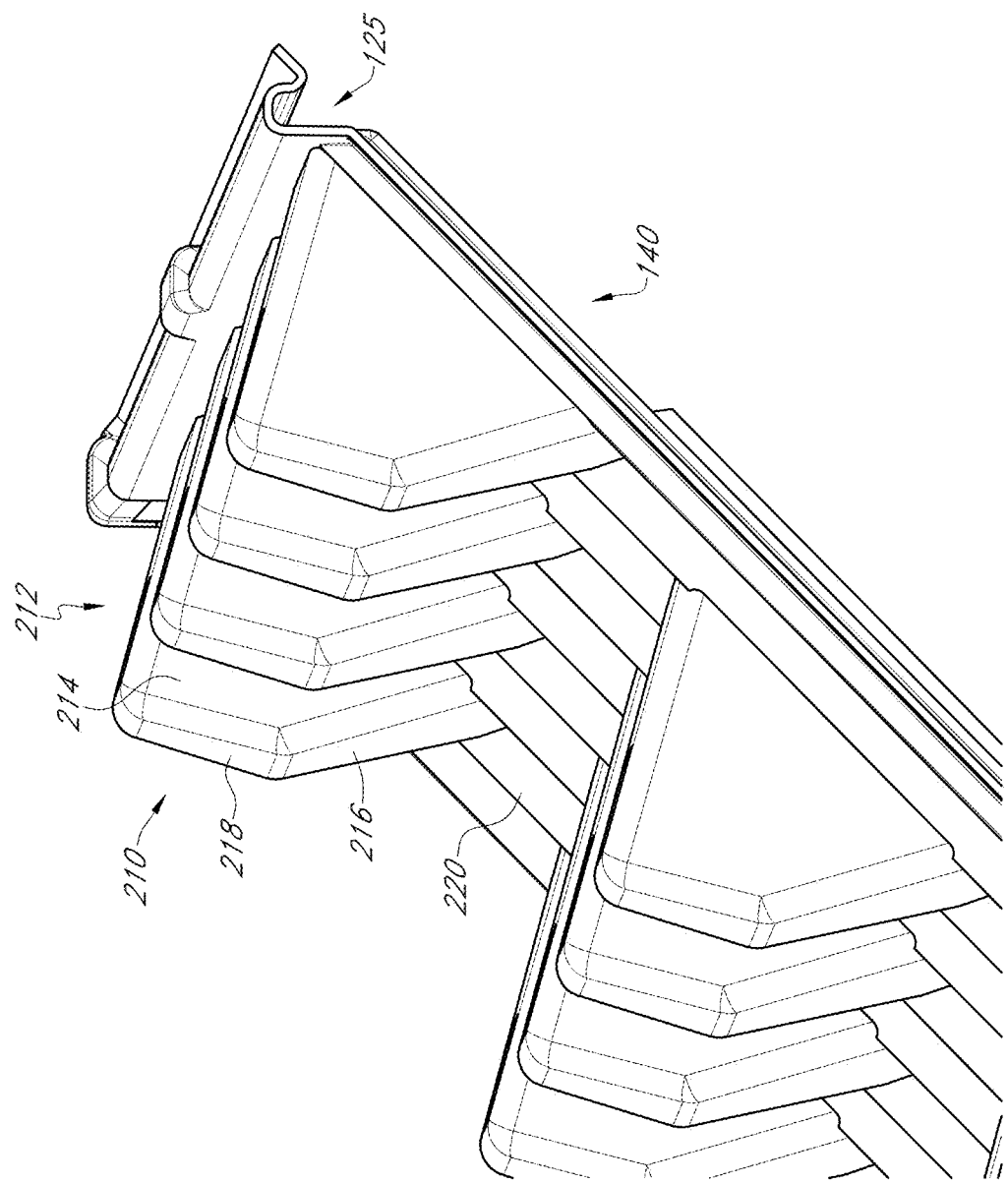
FIG. 44A provides a detailed view of a right side of a top portion of the grow board shown in FIGS. 43A-43D.
Figure 44C:
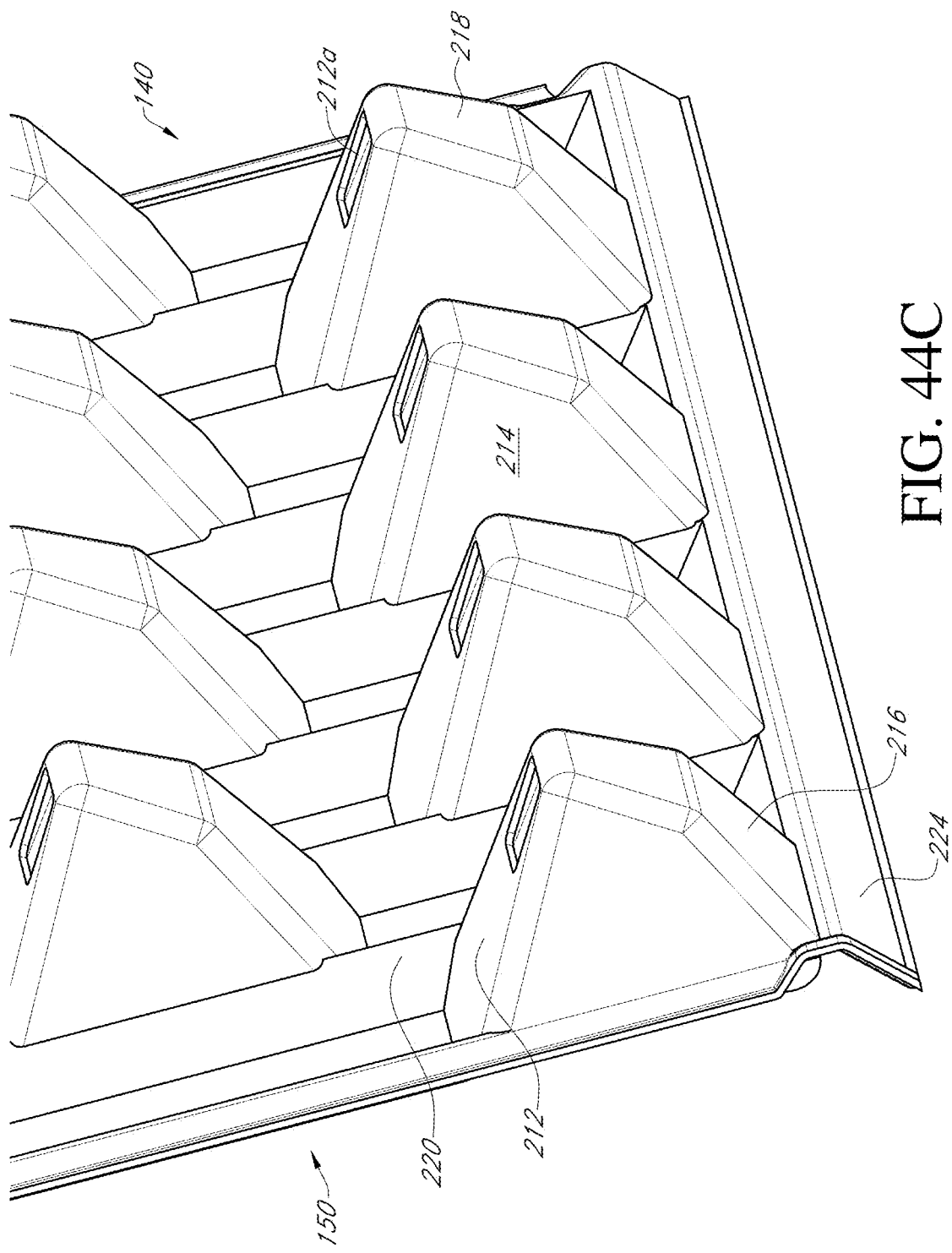
FIG. 44C provides a detailed view of a bottom portion of the grow board shown in FIGS. 43A-44B.
Figure 45A:
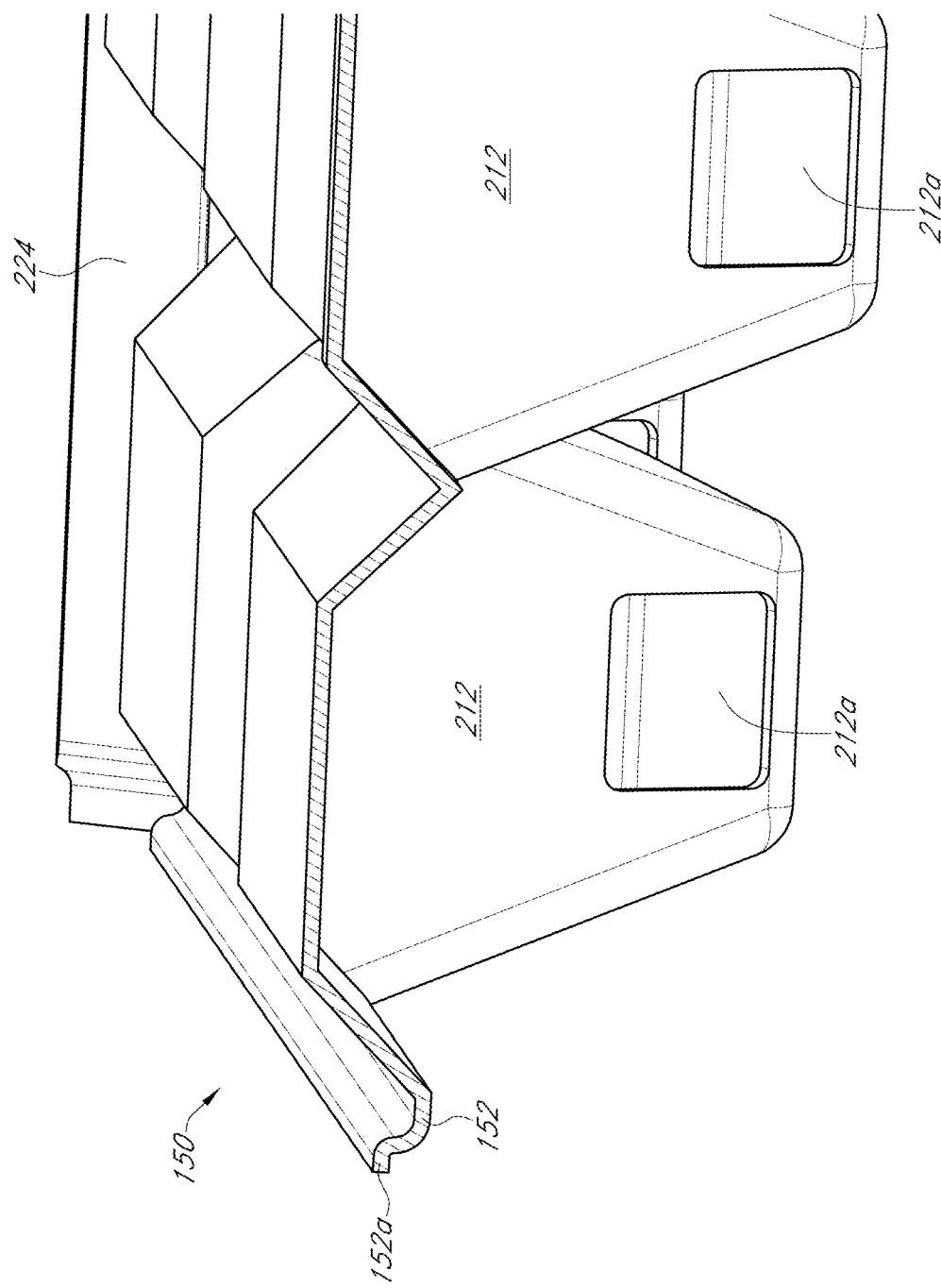
FIG. 45A provides a perspective, cross-sectional view adjacent a left side of the grow board shown in FIGS. 43A-44C.
Figure 45B:
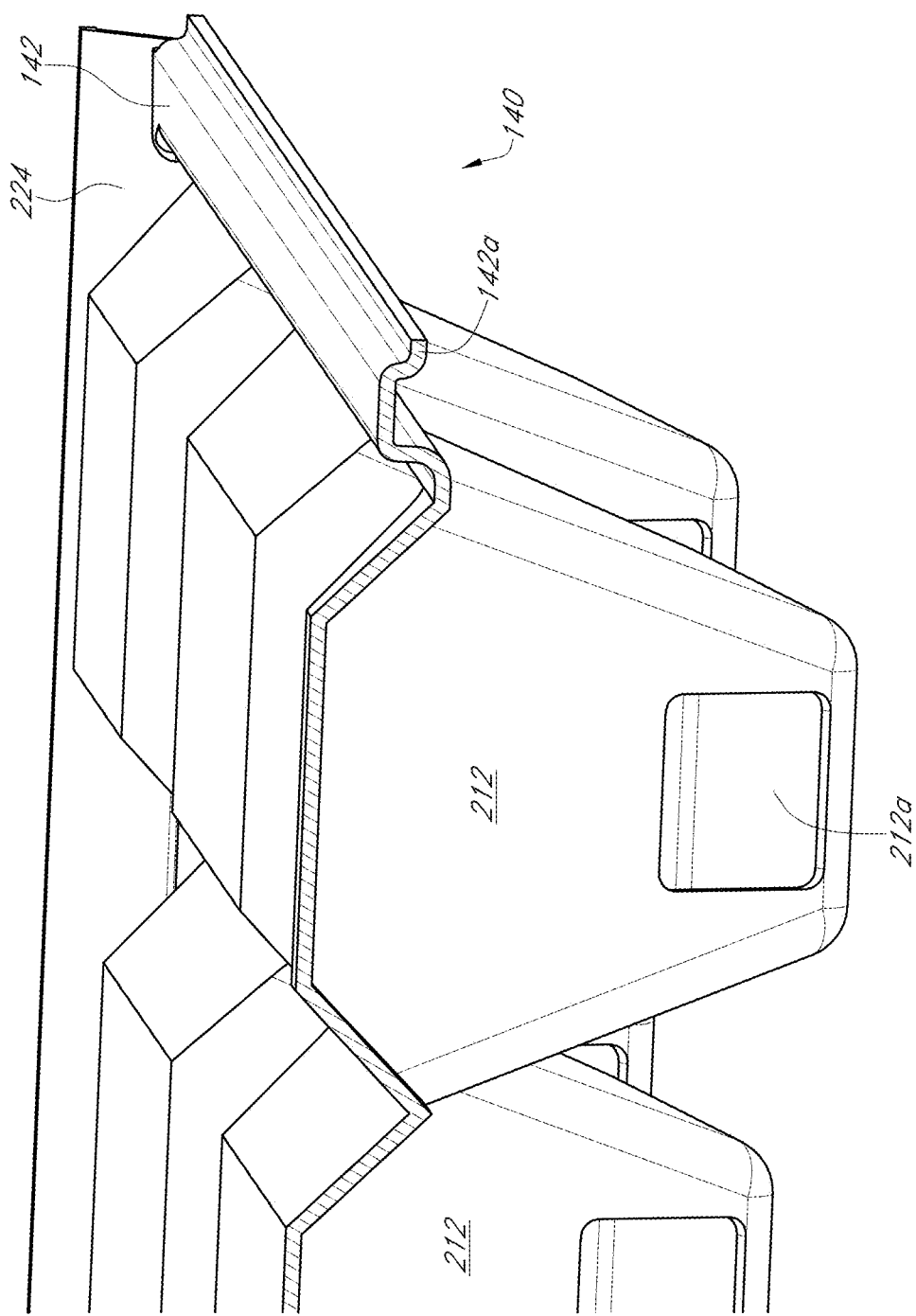
FIG. 45B provides a perspective, cross-sectional view adjacent a right side of the grow board shown in FIGS. 43A-45A.

The grow board 200 shown in FIGS. 43A-45B may be configured with an indent 125 along a top edge thereof, as clearly shown at least in FIGS. 44A and 44B. One or more peripheral walls may be configured with a indent 125, which indent 125 may be configured to provide an engagement area between the grow board 200 and an upper rail 46 or intermediate rail 44'. In an aspect, the indent 125 may extend along the length of a peripheral wall on one full side of the grow board 200 and may facilitate an aspect of the modularity of the growing system 10 for adaptation of other plants. The indent 125 may be configured with sufficient depth such that a portion of the rail 44', 46 may adequately engage the grow board 200 via the indent 125 such that certain unwanted movements (e.g., downward and/or lateral movement of the grow board 200 in a direction other than that parallel to the length of the rail 44', 46) of the grow board 200 are prevented and/or mitigated through engagement between the grow board 200 and the rail 44', 46 at the indent 125.

It is contemplated that the rail 44', 46 may be engaged optimally with the grow board 200 at the top edge of the grow board 200 (e.g., adjacent an indent 125), such that the grow board 200 may hang down from the rail 44', 46, and such that another portion of the grow board 200 positioned below the rail 44', 46 may rest upon another structure (e.g., a portion of the board frame 40 and/or plant support structure 14) such that the grow board 200 may be angled with respect to the vertical dimension.

As shown, the grow board 200 shown in FIGS. 43A-45B (and referring specifically to FIGS. 44A and 44B) may be configured with a right side 140 and a left side 150, wherein the left side 150 overlaps with the right side 140 of two adjacent grow boards 200 in a manner that mitigates and/or prevents leakage of nutrient supply from the interior surfaces of the grow boards 200 to the exterior surfaces thereof. Accordingly, the left side 150 may be formed with a left flange 152, which left flange 152 may be formed with a lip 152a extending therefrom. The right side 140 may be formed with a right flange 142 having a trough 142b formed therein and a right lip 142c extending therefrom. When positioned adjacent one another, the lip 152a of the left flange 152 of a first grow board 200 be positioned within the trough 142b of the right flange 142 of a second grow board 200. Additionally, the right lip 142c of the second grow board 200 may engage and/or interlock with a portion of the left flange 152 of the first grow board 200 to create a circuitous path from the interior surfaces of the grow boards 200 to the exterior surfaces thereof along the intersection between the right side 140 of one grow board 200 and the left side 150 of an adjacent grow board 200. However, any suitable structure and/or method may be used to mitigate and/or prevent leakage of nutrient supply from the interior surfaces of the grow boards 200 to the exterior surfaces thereof without departing from the spirit and scope of the present disclosure unless so indicated in the following claims.

Figure 46:
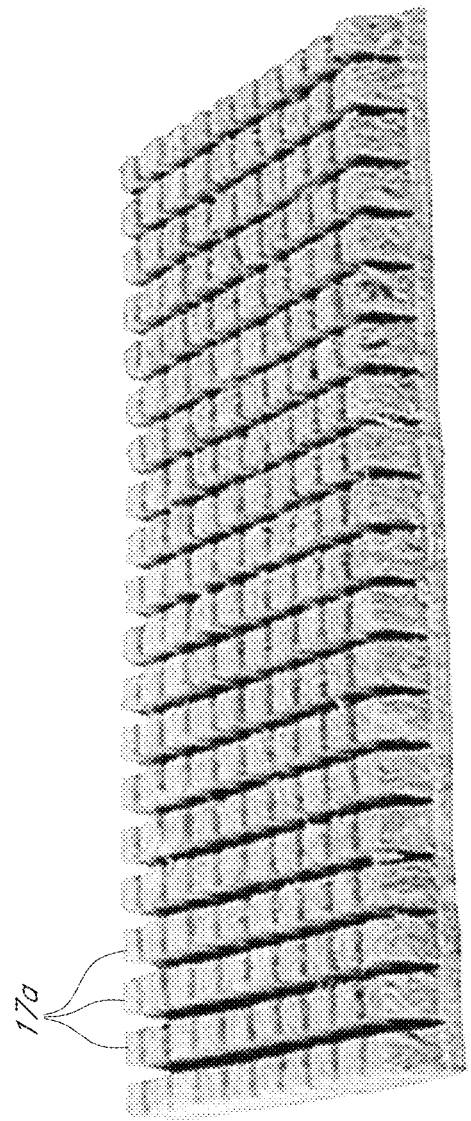
FIG. 46 provides a perspective view of one type of grow media.

In an aspect, it is contemplated that the grow board 200 shown in FIGS. 43A-45B may be especially useful with a plug-type grow media, such as a grow media made of rock wool or a similar fibrous material. For example, using the type of grow media shown in FIG. 46, which may be comprised of rock wool (which is generally commercially available as a commodity), the seed of a plant may be positioned on an interior portion of each grow media plug 17a. The seed may then be allowed to germinate until it has reached a certain size and/or maturity (in one aspect, approximately one week), after which time rows of grow media plugs 17a may be positioned in a grow board 12, 200. In aspect it is contemplated that the configuration, size, dimensions, etc. of the grow board 10, apertures 212a, and/or other components thereof may be dictated by the configuration, size, dimensions, etc. of the grow media plug 17a.

The plants may be allowed to grow until they have reached a certain size and/or maturity (in one aspect, approximately three to four weeks), after which time an individual grow media plug 17a may be positioned in an aperture 212a of the grow board 200 like that or similar to that shown in FIGS. 43A-45B. In aspect it is contemplated that the configuration, size, dimensions, etc. of the grow board 200, protrusions 210, and/or apertures 212a, and/or other components of the grow board 200 may be dictated by the configuration, size, dimensions, etc. of the grow media plug 17a and/or by the type of plant for which the grow board 200 is used.

After the plants have reached the desired level of maturity in a grow board 200 like that or similar to that shown in FIGS. 43A-45B, the plants may be harvested via cutting and/or otherwise removing the upper portion of the plants from the grow media plug 17a. After the plants have been harvested, the grow media plugs 17a may be removed from the grow board 200 and discarded so that the grow board 200 may be reused. However, the scope of the present disclosure is in no way limited by the method of using the grow boards 10, 200 and/or components thereof unless so indicated in the following claims.

As shown in FIGS. 38A-42B, the grow board 200 may be configured with a variety of patterns for a specific number of plants on a given grow board 200. It is contemplated that the optimal configuration for a given grow board 200 (e.g., spacing and number of apertures 212a) will depend at least upon the type of plant to be grow on a specific grow board 200. Accordingly, grow boards 200 configured for 16, 20, 24, 28, and 32 plants are shown in FIGS. 38A-42B, respectively, but other grow boards 200 may have other arrangements of apertures 212a for other numbers of plants without limitation unless otherwise indicated in the following claims.

Any shape, dimensions, and/or configuration of grow boards 12, 200, plant support structures 14, feet 20, trays 30, board frames 40, uprights 41, intermediate rails 44, pans 47, nutrient delivery systems 50, light supports 60, light systems 80, collection members 90, and/or trolleys 100 and/or components of any of the foregoing may be used within the scope of the present disclosure without limitation unless so indicated in the following claims.

In the foregoing detailed description, various features are grouped together in a single embodiment for purposes of streamlining the disclosure. This method of disclosure is not to be interpreted as reflecting an intention that the present disclosure requires more features than are expressly recited in each claim. Rather, as the following claims reflect, inventive aspects lie in less than all features of a single foregoing disclosed embodiment. Thus, the following claims are hereby incorporated into this detailed description, with each claim standing on its own as a separate embodiment.

The materials used to construct the growing system 10 and various elements and/or components thereof will vary depending on the specific application thereof, but it is contemplated that polymers, metals, metal alloys, natural materials, fibrous materials, and/or combinations thereof may be especially useful for the growing system 10 in some applications. Accordingly, the above-referenced elements may be constructed of any material known to those skilled in the art or later developed, which material is appropriate for the specific application of the present disclosure without departing from the spirit and scope of the present disclosure unless so indicated in the following claims. It is contemplated that for certain applications it may be especially advantageous to construct the foot 20, board frame 40, and/or trolley 100 from metal and/or metallic alloys, and the trays 30, intermediate rails 44, pans 47, and/or other elements from plastic, polymers, and/or other synthetic materials. However, any suitable materials may be used to construct any element of the present disclosure without limitation unless so indicated in the following claims.

Having described the preferred embodiments of the various methods and apparatuses, other features of the present disclosure will undoubtedly occur to those versed in the art, as will numerous modifications and alterations in the various aspects as illustrated herein, all of which may be achieved without departing from the spirit and scope of the present disclosure. Accordingly, the methods and embodiments pictured and described herein are for illustrative purposes only, and the scope of the present disclosure extends to all method and/or structures for providing the various benefits and/or features of the present disclosure unless so indicated in the following claims. Furthermore, the methods and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the growing system 10, plant support structure 14, board frame 40, and/or light system 80 and/or components thereof are not limited to the specific embodiments pictured and described herein, but are intended to apply to all similar apparatuses and methods that function in a similar matter and/or provide similar benefits. Modifications and alterations from the described embodiments will occur to those skilled in the art without departure from the spirit and scope of the present disclosure.

Any of the various features for the grow boards 12, plant support structures 14, feet 20, trays 30, board frames 40, uprights 41, intermediate rails 44, pans 47, nutrient delivery systems 50, light supports 60, light systems 80, collection members 90, and/or trolleys 100 and/or components of any of the foregoing may be used alone or in combination with one another (depending on the compatibility of the features) from one embodiment and/or aspect of the growing system 10 to the next. Accordingly, an infinite number of variations of the growing system 10 exists. All of these different combinations constitute various alternative aspects of the growing system 10. The embodiments described herein explain the best modes known for practicing the growing system 10 and will enable others skilled in the art to utilize the same. The claims are to be construed to include alternative embodiments to the extent permitted by the prior art. Modifications and/or substitutions of one feature for another in no way limit the scope of the growing system 10 and/or component thereof unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

It should be noted that the present disclosure is not limited to the specific embodiments pictured and described herein, but are intended to apply to all similar apparatuses and methods for arranging, growing, and/or harvesting plants, and/or otherwise providing any of the features and/or advantages of any aspect of the present disclosure. Modifications and alterations from the described embodiments will occur to those skilled in the art without departure from the spirit and scope of the present disclosure.

The invention claimed is:

1. A plant support structure comprising:
   a. a foot engaged with a floor surface;
   b. a tray engaged with a top surface of said foot, wherein said foot elevates said tray from said floor surface, wherein said tray comprises:
      i. a trough formed in said tray along a length thereof in a center of said tray;
      ii. a first side pane formed on a first side of said trough, wherein said first side pane extends along said length of said tray, wherein said first side pane is elevated with respect to said trough;
      iii. a second side pane formed on a second side of said trough, wherein said second side pane extends along said length of said tray, wherein said second side pane is elevated with respect to said trough;
   c. a nutrient delivery system positioned in said trough;
   d. a board frame engaged with said foot, said board frame comprising:
      i. a first upright having a lower distal end and an upper distal end, wherein said first upright is angled with respect to a vertical dimension, and wherein said lower distal end is positioned adjacent said first side pane;
      ii. a second upright having a lower distal end and an upper distal end, wherein said second upright is angled with respect to said vertical dimension, wherein said lower distal end is positioned adjacent said second side pane, and wherein said upper distal end of said first upright and said upper distal end of said second upright are positioned adjacent one another;
      iii. a third upright having a lower distal end and an upper distal end, wherein said third upright is angled with respect to said vertical dimension, wherein said lower distal end is positioned adjacent said first side pane, and wherein said third upright is separated from said first upright along said length of said tray;
      iv. a fourth upright having a lower distal end and an upper distal end, wherein said fourth upright is angled with respect to said vertical dimension, wherein said lower distal end is positioned adjacent said second side pane, wherein said fourth upright is separated from said second upright along said length of said tray, and wherein said upper distal end of said third upright and said upper distal end of said fourth upright are positioned adjacent one another;
      v. a first lower rail having a first end and a second end, wherein said first lower rail first end is engaged with said first upright adjacent said first upright lower distal end, and wherein said first lower rail second end is engaged with said third upright adjacent said third upright lower distal end;
      vi. a second lower rail having a first end and a second end, wherein said second lower rail first end is engaged with said second upright adjacent said second upright lower distal end, and wherein said second lower rail second end is engaged with said fourth upright adjacent said fourth upright lower distal end;
      vii. a first intermediate rail having a first end and a second end, wherein said first intermediate rail first end is engaged with said first upright between said first upright lower and upper distal ends, and wherein said first intermediate rail second end is engaged with said third upright between said third upright lower and distal ends;

viii. a second intermediate rail having a first end and a second end, wherein said second intermediate rail first end is engaged with said second upright between said second upright lower distal ends, and wherein said second intermediate rail second end is engaged with said fourth upright between said fourth upright upper and lower distal ends e. a light support, wherein said light support comprising:
i. a first extension extending upward from said upper distal end of said first upright; ii. a second extension extending upward from said upper distal end of said second upright, wherein a lower end of said first extension and a lower end of said second extension cooperate to form a first valley;
iii. a third extension extending upward from said upper distal end of said third upright;
iv. a fourth extension extending upward from said upper distal end of said fourth upright, wherein a lower end of said first extension and a lower end of said second extension cooperate to form a second valley, wherein said second valley is spaced apart from said first valley along said length of said tray, and wherein said light system is further defined as being suspended from said first and third extensions;

f. a first light system suspended from said second and fourth extensions, said first light system comprising:
i. a first upper panel having an interior surface and an exterior surface, wherein a first light source is positioned on said exterior surface;
ii. a second upper panel having an interior surface and an exterior surface, wherein a second light source is positioned on said exterior surface, wherein said interior surface of said first upper panel is opposed to said interior surface of said second upper panel, and wherein said first upper panel and said second upper panel are spaced apart from one another; and,
iii. a lower panel positioned between said first and second upper panels, wherein said lower panel has a first surface and a second surface, wherein a third light source is positioned on said first surface, and wherein a fourth light source is positioned on said second surface.

2. The plant support structure according to claim 1 wherein said board frame further comprises:
a. a first upper rail having a first end and a second end, wherein said first upper rail first end is engaged with said first upright adjacent said first upright upper distal end, and wherein said first upper rail second end is engaged with said third upright adjacent said third upright upper distal end; and,
b. a second upper rail having a first end and a second end, wherein said second upper rail first end is engaged with said second upright adjacent said second upright upper distal end, and wherein said second upper rail second end is engaged with said fourth upright adjacent said fourth upright upper distal end.

3. The plant support structure according to claim 2 further comprising:
a. a first grow board engaged with said first upper rail and said first intermediate rail; and,
b. a second grow board engaged with said first intermediate rail and said first lower rail, wherein said second grow board is positioned directly below said first grow board.

4. The plant support structure according to claim 3 further comprising:
a. a third grow board engaged with said first upper rail and said first intermediate rail, wherein said third grow board is positioned laterally adjacent to said first grow board;
and,
b. a fourth grow board engaged with said first intermediate rail and said first lower rail, wherein said fourth grow board is positioned laterally adjacent to said second grow board, and wherein said fourth grow board is positioned directly below said third grow board.

5. The plant support structure according to claim 1 wherein said lower panel is moveable with respect to said first and second upper panels in a vertical dimension.

6. The plant support structure according to claim 5 wherein said first light system is further defined as being moveable between a first position and a second position, wherein said first position is defined such that no portion of said lower panel is positioned in a space between said first and second upper panels, and wherein said second position is defined such that a portion of said lower panel is positioned in said space between said first and second upper panels.

7. The plant support structure according to claim 6 wherein said first and second upper panels and said lower panel are moveable in a vertical dimension with respect to said board frame.

8. The plant support structure according to claim 1 wherein said first intermediate rail is further defined as comprising:
a. a vertical portion oriented in a generally vertical dimension;
b. an upper lip extending outward from a first end of said vertical portion, wherein said upper lip is angled with respect to said vertical portion;
c. an angled portion extending outward from a second end of said vertical portion, wherein said angled portion is angled with respect to said vertical portion; and,
d. a lower lip extending outward from said angled portion, wherein said lower lip is angled with respect to said angled portion.

9. The plant support structure according to claim 8 wherein said first intermediate rail is further defined such that said upper lip and said lower lip are parallel.

10. A method of growing a plant, said method comprising the steps of:
a. positioning a first plant support structure in a controlled environment; wherein said first plant support structure comprises:
i. a nutrient delivery system;
ii. a foot engaged with a floor surface;
iii. a tray engaged with a top surface of said foot, wherein said foot elevates said tray from said floor surface, wherein said tray comprises a trough formed in said tray along a length thereof in a center of said tray;
iv. a nutrient delivery system positioned in said trough; and,
v. a board frame engaged with said foot, said board frame comprising a first upright and a second upright configured to support said grow board, wherein said light support is engaged with a upper distal end of said first upright and an upper distal end of said second upright b. positioning a second plant support structure in said controlled environment, wherein said second plant support structure comprises a nutrient delivery system, wherein said first plant support structure is laterally spaced from said second plant support structure to define an aisle therebetween;
c. positioning a light support above said aisle, wherein said light support is engaged with an upper end of said first plant support and an upper end of said second plant support;
d. suspending a light system from said light support, wherein said light system is moveable between a first and second position, wherein said first position is defined as extending down to a lower portion of said first and second plant support structures, and wherein a second position is defined as being raised so as to allow access to said aisle, wherein said first light system comprises:
   i. a first upper panel having an interior surface and an exterior surface, wherein a first light source is positioned on said exterior surface;
   ii. a second upper panel having an interior surface and an exterior surface, wherein a second light source is positioned on said exterior surface, wherein said interior surface of said first upper panel is opposed to said interior surface of said second upper panel, and wherein said first upper panel and said second upper panel are spaced apart from one another; and,
   iii. a lower panel positioned between said first and second upper panels, wherein said lower panel has a first surface and a second surface, wherein a third light source is positioned on said first surface, and wherein a fourth light source is positioned on said second surface;
e. retracting said light system to said second position;
f. positioning a grow board on said first plant support structure, wherein said plant is positioned on said grow board;
g. extending said light system to said first position;
h. illuminating said plant with light from said light system;
i. providing nutrients to said plant with said nutrient delivery system of said first plant support structure;
j. allowing said plant to grow to a level of maturity;
k. retracting said light system, for a second time, to said second position; and,
l. removing said grow board from said first plant support structure.

* * * * *